United States Patent
Toma et al.

(10) Patent No.: US 7,843,994 B2
(45) Date of Patent: Nov. 30, 2010

(54) MOVING PICTURE STREAM GENERATION APPARATUS, MOVING PICTURE CODING APPARATUS, MOVING PICTURE MULTIPLEXING APPARATUS AND MOVING PICTURE DECODING APPARATUS

(75) Inventors: Tadamasa Toma, Toyonaka (JP); Shinya Kadono, Nishinomiya (JP); Tomoyuki Okada, Nara (JP); Hiroshi Yahata, Kadoma (JP)

(73) Assignee: Panasonic Corporation, Osaka (JP)

( * ) Notice: Subject to any disclaimer, the term of this patent is extended or adjusted under 35 U.S.C. 154(b) by 800 days.

(21) Appl. No.: 10/586,442

(22) PCT Filed: Apr. 25, 2005

(86) PCT No.: PCT/JP2005/008319

§ 371 (c)(1),
(2), (4) Date: Jul. 18, 2006

(87) PCT Pub. No.: WO2005/106875

PCT Pub. Date: Nov. 10, 2005

(65) Prior Publication Data

US 2008/0219393 A1 Sep. 11, 2008

(30) Foreign Application Priority Data

Apr. 28, 2004 (JP) ............................. 2004-134212
Jun. 2, 2004 (JP) ............................. 2004-165005
Aug. 31, 2004 (JP) ............................. 2004-251871

(51) Int. Cl.
*H04N 7/18* (2006.01)

(52) U.S. Cl. ............................. 375/240.12; 375/240.13; 375/240.15

(58) Field of Classification Search ............................. 375/240.11–240.27
See application file for complete search history.

(56) References Cited

U.S. PATENT DOCUMENTS

| 6,075,920 A | 6/2000 | Kawamura et al. |
| 6,442,334 B1 | 8/2002 | Kawamura et al. |
| 6,480,665 B1 | 11/2002 | Hamada |
| 7,526,031 B2 * | 4/2009 | Toma et al. ............ 375/240.26 |
| 2002/0146239 A1 | 10/2002 | Hamasaka et al. |
| 2005/0147375 A1 * | 7/2005 | Kadono ........................ 386/4 |

(Continued)

FOREIGN PATENT DOCUMENTS

EP 0 756 281 1/1997

(Continued)

*Primary Examiner*—Andy S Rao
(74) *Attorney, Agent, or Firm*—Wenderoth, Lind & Ponack, L.L.P.

(57) ABSTRACT

To provide a moving picture stream generation apparatus and the like that generates a moving picture stream that can be played back in trick-play such as variable-speed playback and reverse playback even in a Coding format such as the MPEG-4 AVC in which flexible prediction structures are allowed. A moving picture stream generation apparatus includes: a trick-play information generation unit TricPlay for generating supplemental information on a random access unit basis, the supplemental information being referred to at the time of playback of each random access Unit and each random access unit including one or more pictures; and a variable length coding unit VLC for generating a stream including the generated supplemental information and the one or more pictures by adding the supplemental information to each corresponding random access unit.

6 Claims, 40 Drawing Sheets

U.S. PATENT DOCUMENTS

2005/0175098 A1* 8/2005 Narasimhan et al. ... 375/240.12
2008/0002946 A1* 1/2008 Ikeda et al. ................... 386/95

FOREIGN PATENT DOCUMENTS

| | | |
|---|---|---|
| JP | 8-223530 | 8/1996 |
| JP | 8-280009 | 10/1996 |
| JP | 09-046712 | 2/1997 |
| JP | 10-271455 | 10/1998 |
| JP | 2003-9085 | 1/2003 |
| JP | 2003-018549 | 1/2003 |
| WO | WO95/23411 | 8/1995 |
| WO | 99/11063 | 3/1999 |
| WO | 01/26374 | 4/2001 |
| WO | 03/038814 | 5/2003 |
| WO | 2004/066635 | 8/2004 |

* cited by examiner

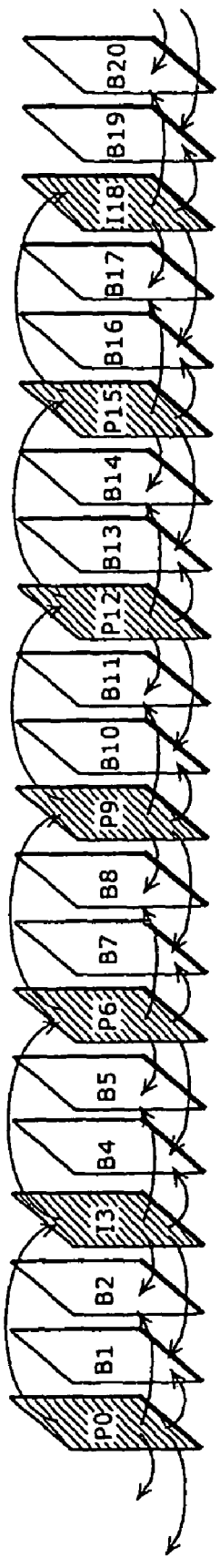
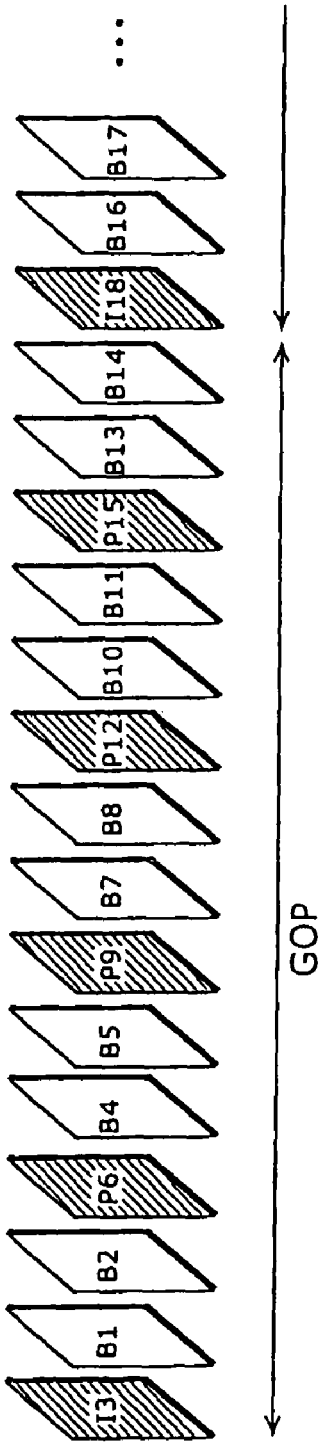
FIG. 2A
FIG. 2B

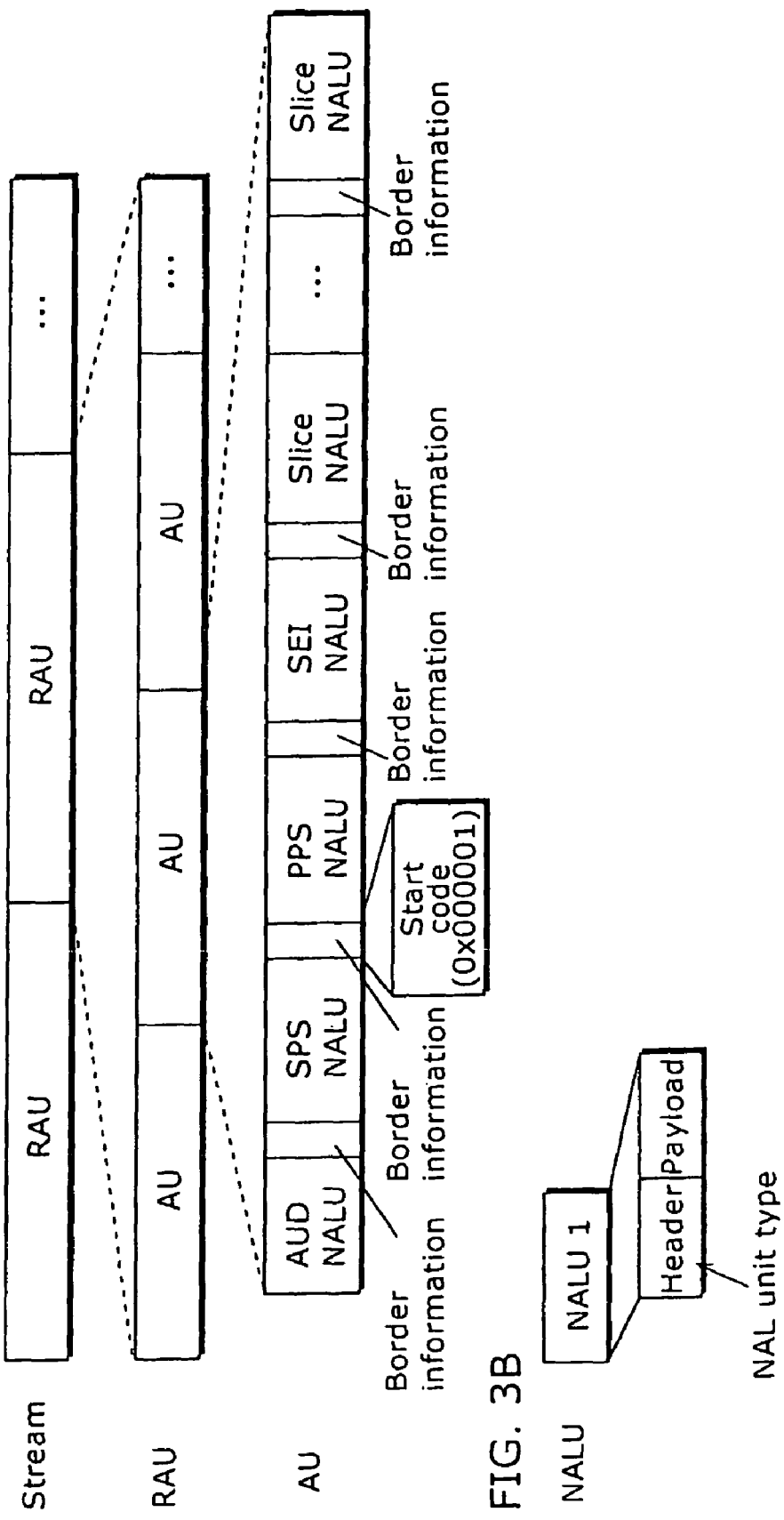

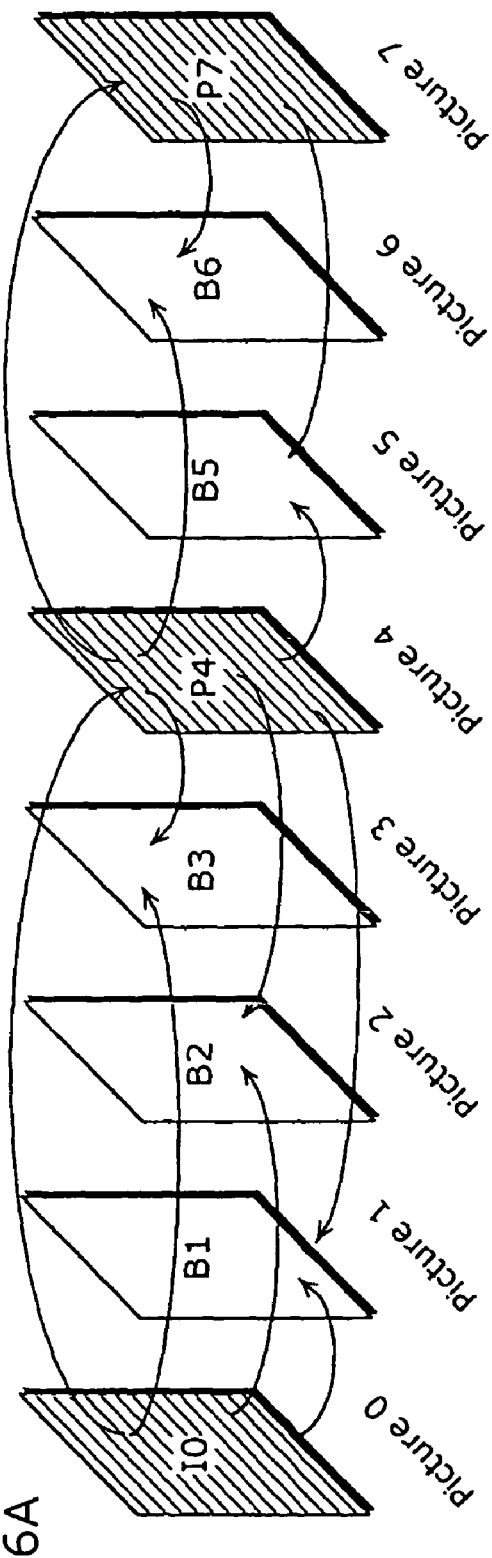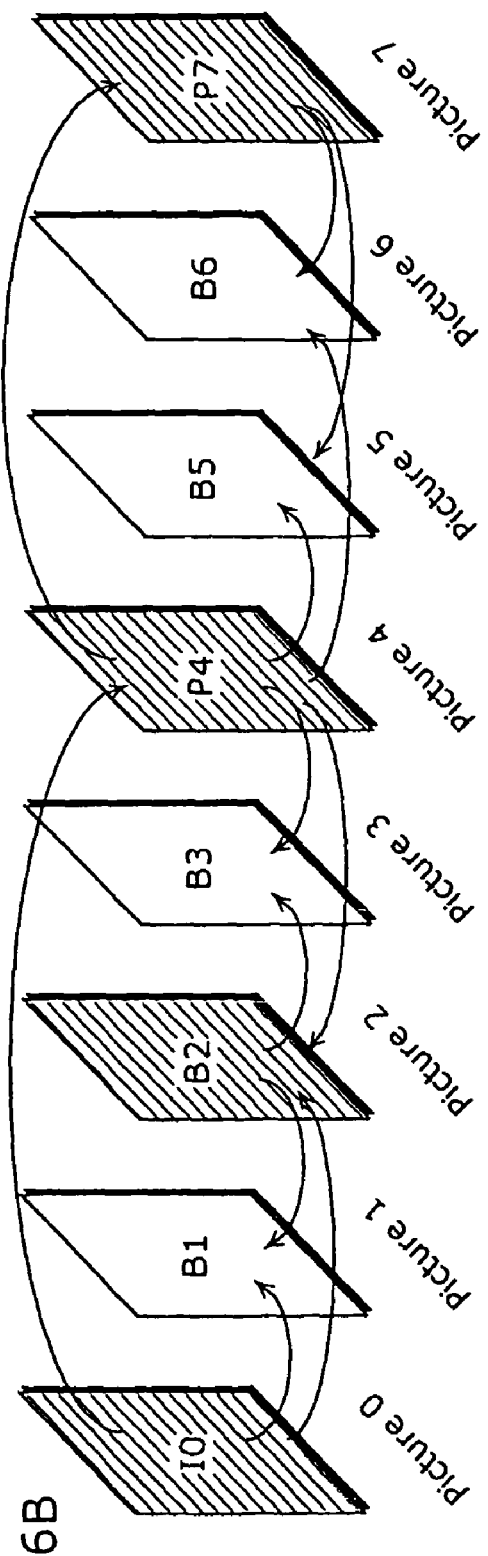
FIG. 6A
FIG. 6B

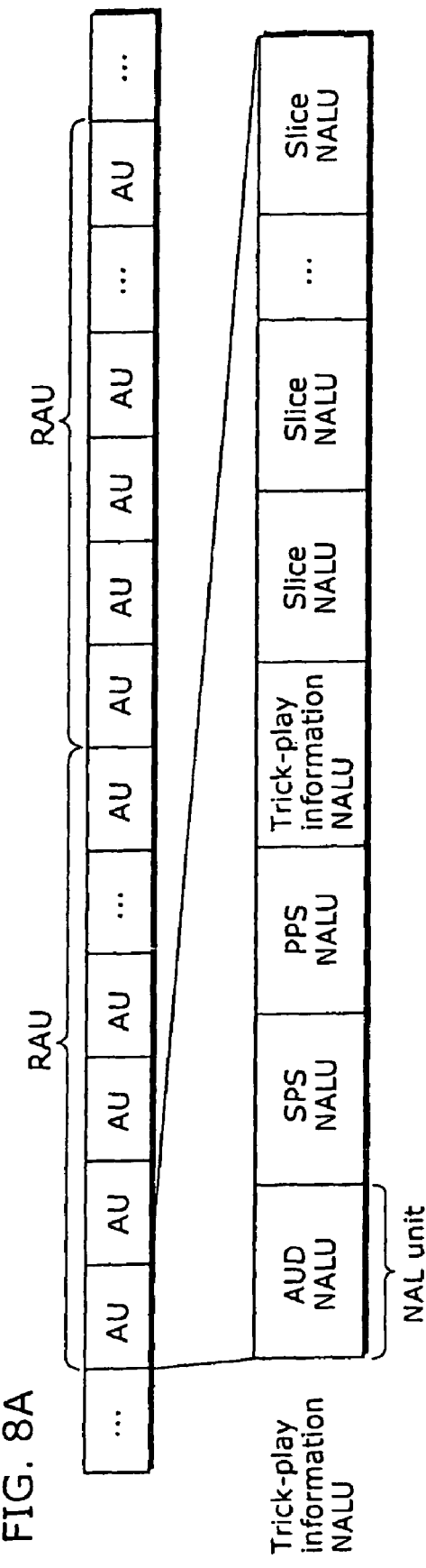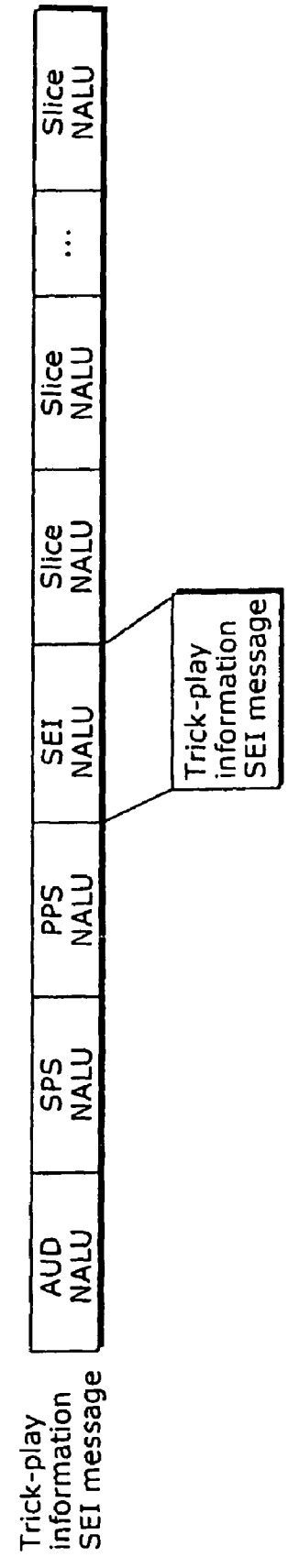

Display order

Decoding order

Double-speed

Quadruple-speed

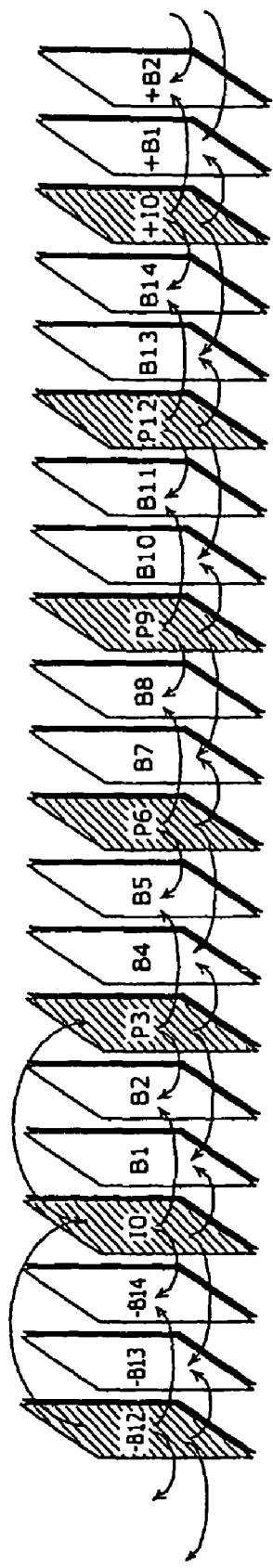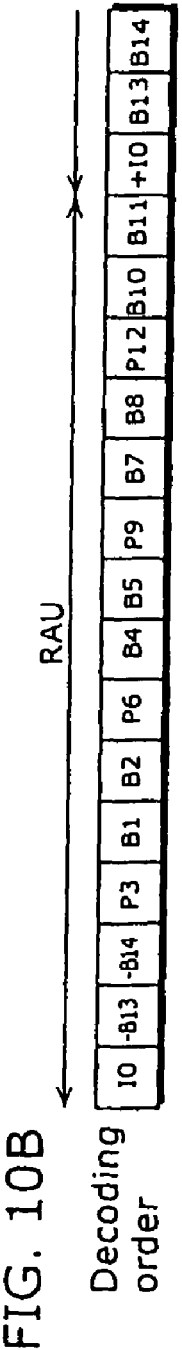

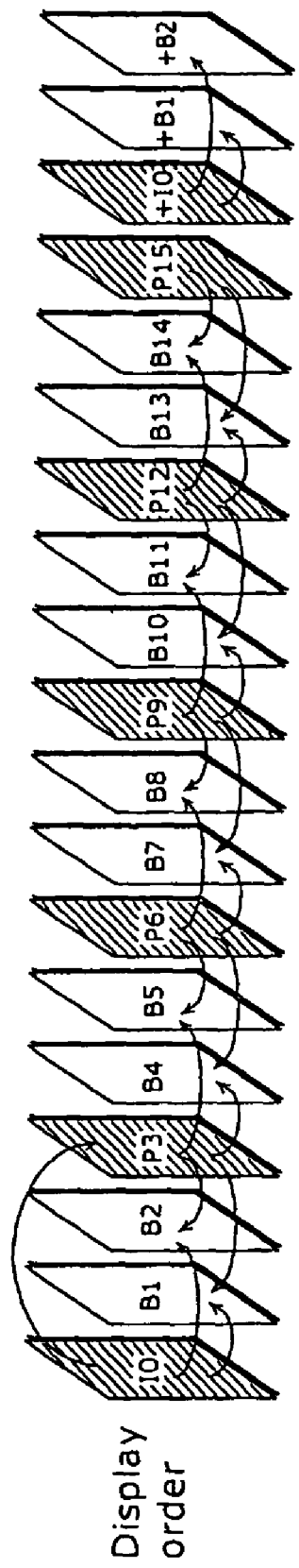
FIG. 11A Display order
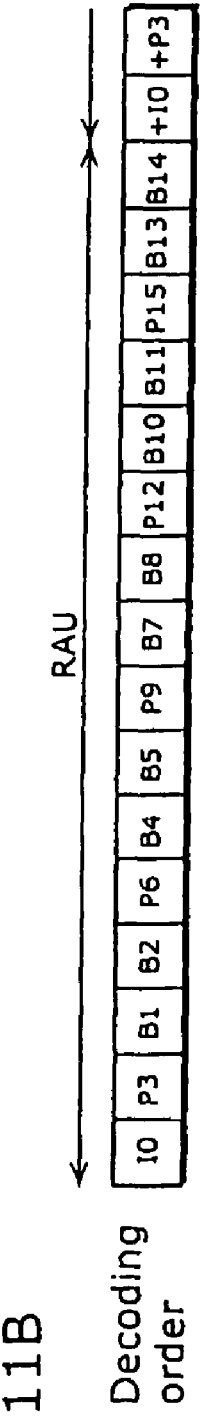
FIG. 11B Decoding order
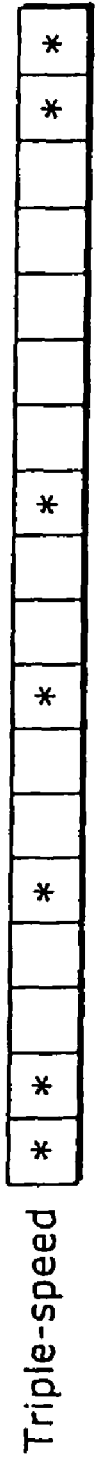
FIG. 11C Triple-speed

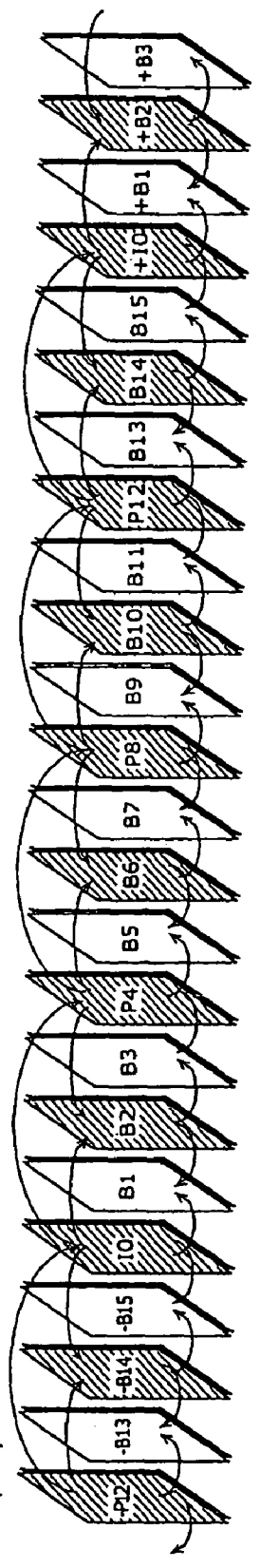

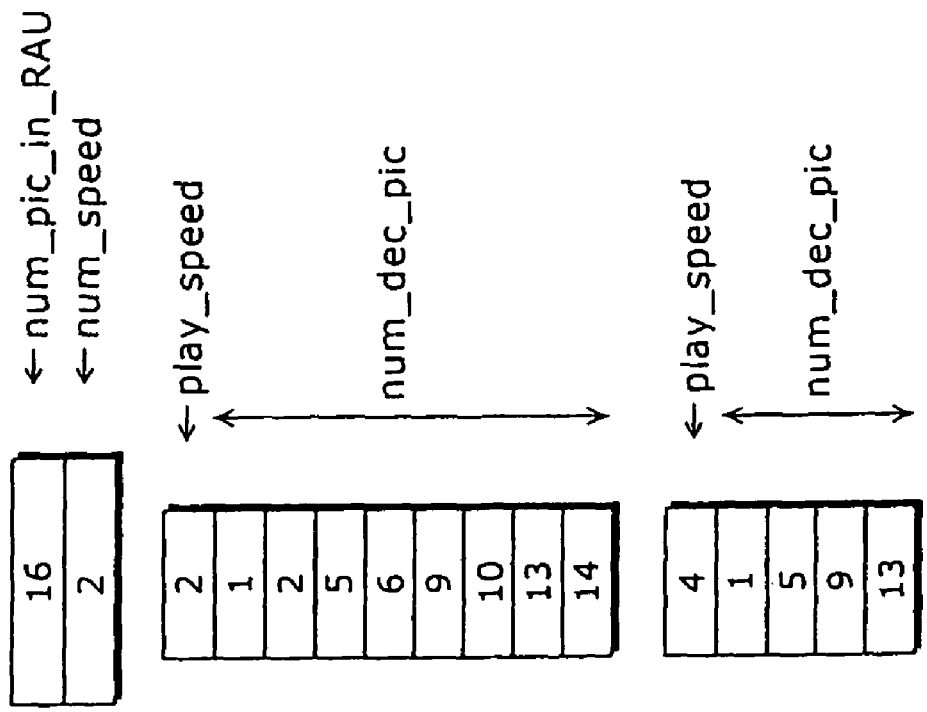
FIG. 13A Syntax example
FIG. 13B Data storage unit

FIG. 14

```
Variable Speed Play {
   num_pic_in_RAU;
   num_speed;
   for (i=0; i < num_speed; i++) {
      play_speed;
      num_dec_pic;
      pts_dts_flag;
      for (j=0; j < num_dec_pic; j++) {
         dec_pic;
         if (pts_dts_flag) diplay_order;
      }
   }
}
```

FIG. 15A  Display order

FIG. 15B  Decoding order

I0 P3 B1 B2 P6 B4 B5 P9 B7 B8 P12 B10 B11 P15 B13 B14 +I0 +P3

RAU

FIG. 15C  IP list

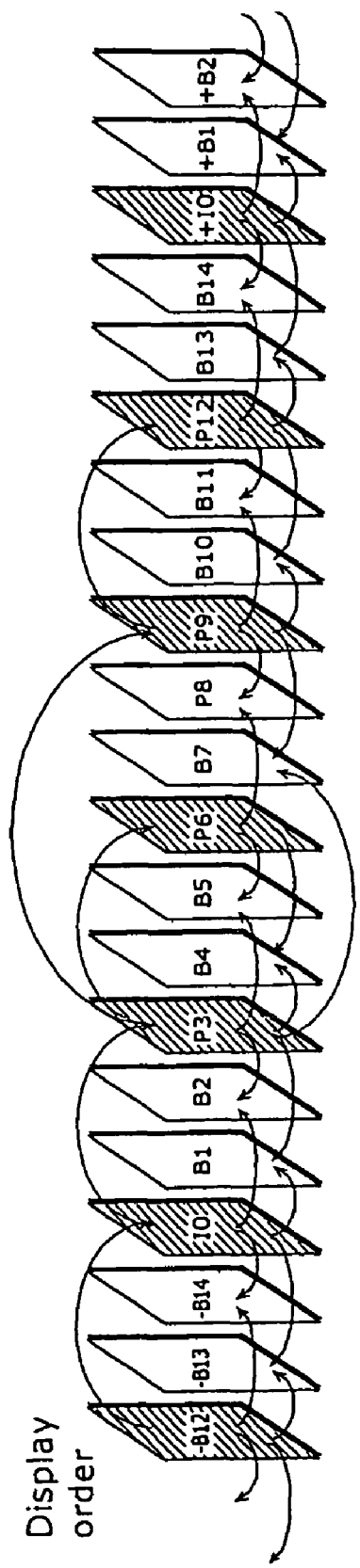

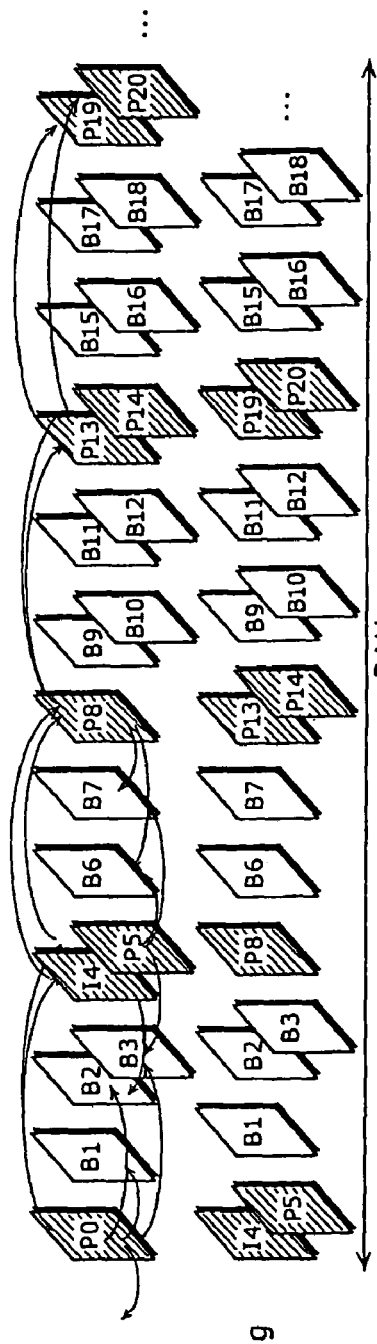

FIG. 18A

```
RAU map {
        num_AU_in_RAU;
        for (i=0; i < num_AU_in_RAU; i++) {
                        picture_structure;
                        picture_type;
        }
}
```

FIG. 18B picture_structure:   Field
                  or  Frame
                      .
                      .
                      .

FIG. 18C picture_type:    I picture
            or   Reference B picture
            or   Non-reference B picture
            or   P picture
                 .
                 .
                 .

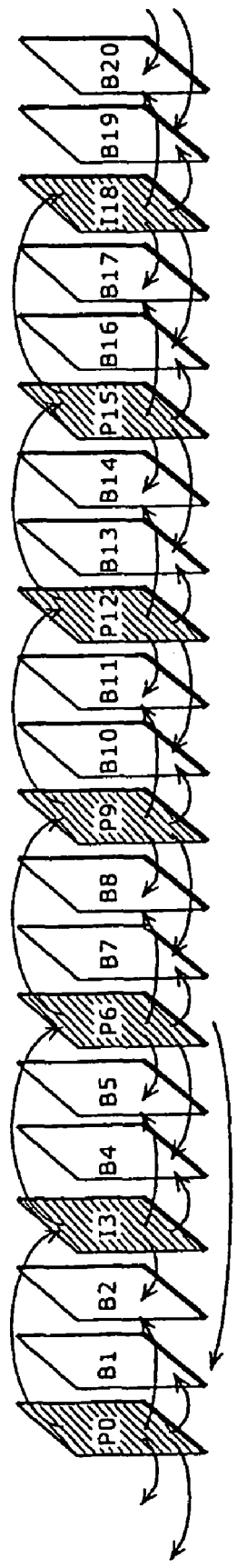
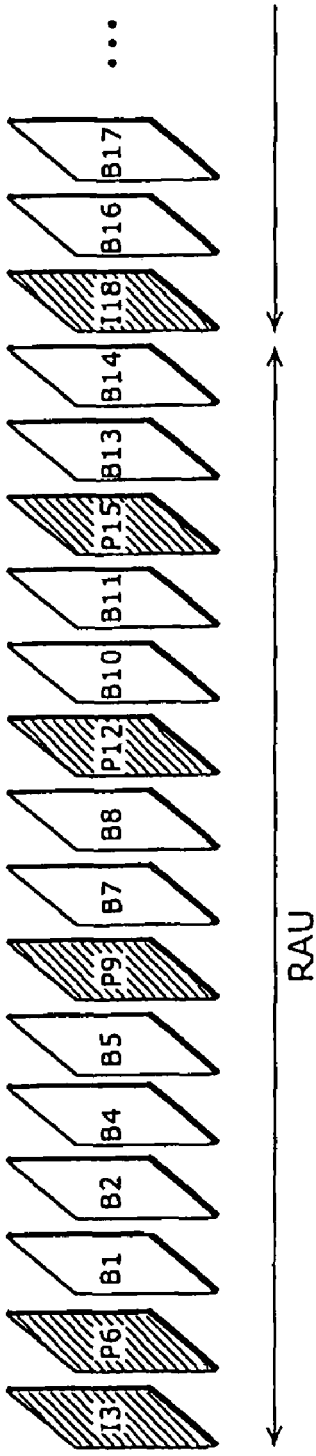
FIG. 20A
FIG. 20B

MOVING PICTURE STREAM GENERATION APPARATUS, MOVING PICTURE CODING APPARATUS, MOVING PICTURE MULTIPLEXING APPARATUS AND MOVING PICTURE DECODING APPARATUS

TECHNICAL FIELD

The present invention relates to an apparatus and the like that generates a coded moving picture stream, especially to an apparatus and the like that generates a stream on which trick-play such as jump-in playback, variable-speed playback, reverse playback and the like can be performed.

BACKGROUND ART

Recently, the multi-media era has come in which sound, pictures and other pixel values are integrated into one media, and conventional information media as communication tools like newspapers, magazines, TV, radio and telephone are regarded as the targets of multi-media. Generally, multi-media is a form of simultaneous representation of not only characters but also graphics, sound, and especially pictures. In order to handle the above-described conventional information media as multi-media, it is a requisite to represent the information digitally.

However, it is unrealistic to directly process a huge amount of information digitally using the above-described conventional information media because, when calculating the data amount of each information medium described above as digital data amount, data amount per character is 1 to 2 bytes while that of sound per second is not less than 64 Kbits (telephone speech quality) and that of moving pictures per second is not less than 100 Mbits (present TV receiving quality). For example, a TV telephone has already become commercially practical thanks to Integrated Services Digital Network (ISDN) with a transmission speed of 64 kbps to 1.5 Mbps, but it is impossible to transmit moving pictures of TV camera as they are using ISDN.

That is why information compression technique is necessary. For example, a moving picture compression technique standard of H.261 or H.263 that is recommended by the International Telecommunication Union-Telecommunication Standardization Sector (ITU-T) is used for TV telephones. Also, with the information compression technique of the MPEG-1 standard, it becomes possible to store image information, together with sound information, in a normal CD (Compact disc) for music.

Here, Moving Picture Experts Group (MPEG) is an international standard to digitally compress moving picture signals, and has been standardized by the ISO/IEC (the International Standardization Organization/International Engineering Consortium). MPEG-1 is the standard to compress moving picture signals down to 1.5 Mbps, that is, to compress TV signal information to about one hundredth. Also, the quality that satisfies the MPEG-1 standard is medium level that can be realized at a transmission rate of about 1.5 Mbps. MPEG-2 is thus standardized in order to satisfy the need for higher picture quality, and it compresses moving picture signals to 2 to 15 Mbps. At present, the work group (ISO/IEC JTC1/SC29/WG11), which standardized MPEG-1 and MPEG-2, has standardized MPEG-4 with a higher compression rate. The MPEG-4 standard (i) achieves a compression rate higher than those of MPEG-1 standard and MPEG-2 standard, (ii) enables coding, decoding and performing operations on an object-by-object basis, and (iii) realizes new functions necessary in this multimedia era. The initial object of MPEG-4 standard is to standardize a coding method of pictures with low bit rates, but the object is extended to a general purpose coding method of interlace pictures with high bit rates. After that, ISO/IEC and ITU-T, in combination, has standardized MPEG-4 AVC (Advanced Video Coding) as a next generation picture coding method of pictures with a high compression rate. This is expected to be used for next generation optical disc related apparatuses or in broadcasting for mobile terminals.

Generally, in coding moving pictures, information amount is compressed by reducing temporal and spatial redundancies. In the inter picture prediction coding aiming to reduce temporal redundancies, motion estimation and prediction picture generation are performed on a block-by-block basis with reference to a forward picture or a backward picture, and coding is performed on the differential value between the obtained prediction picture and the picture to be coded. Here, "Picture" used here is a term representing one picture. In a progressive picture, a picture means a frame, but in an interlace picture, it means a frame or a field. An "interlace picture" described here means a frame composed of two fields with a slight time lag. In the coding and decoding processes of interlace pictures, it is possible to process a frame as it is, as two fields, or on a frame-by-frame or on a field-by-field of each block in a frame.

The picture for performing intra prediction coding without referring to any reference picture is called Intra Coded Picture (I picture). Also, the picture for performing inter prediction coding referring to only a picture is called Predictive Coded Picture (P picture). Also, the picture for performing inter prediction coding referring to two reference pictures simultaneously is called Bi-predictive Coded Picture (B picture). A B picture can refer to two pictures selected as an arbitrary combination of a forward picture and a backward picture in display time. Such two reference pictures can be specified on a block-by-block basis, the block being a basic unit of coding and decoding. Those reference pictures are distinguished from each other as follows: the reference picture described earlier in the coded bit stream is called first reference picture, and the other reference picture described later is called second reference picture. Note that such reference pictures must have already been coded or decoded in order to code or decode P pictures and B pictures.

Motion compensation inter prediction coding is used for coding of P pictures and B pictures. Motion compensation intra prediction coding is an intra prediction coding method in which motion compensation is applied. Motion compensation is a method for improving prediction precision and reducing data amount by estimating motion amount (called motion vector hereafter) of each block of a picture and by performing prediction coding considering the motion vector. For example, data amount is reduced by estimating motion vectors of pictures to be coded and by coding each prediction residual between each prediction value that is shifted by the amount of each motion vector and each current picture to be coded. In the case of this method, since motion vector information is needed in decoding, motion vectors are also coded, and recorded or transmitted.

Motion vectors are estimated on a macro block by macro block basis. To be more specifically, motion vectors are estimated by fixing the macro block of a picture to be coded, moving the macro block of a reference picture within the search range, and finding the location of the reference block that is closest to the standard block.

FIGS. 1A and 1B are structural diagrams of conventional MPEG-2 streams respectively. As shown in FIG. 1B, an MPEG-2 stream has a hierarchical structure like will be described below. A stream is composed of a Group of Pictures (called GOP hereafter). The use of a GOP as a basic unit in coding processing enables editing a moving picture or performing a random access. A GOP is made up of I pictures, P pictures and B pictures. A stream, a GOP and a picture further includes a synchronous signal (sync) indicating a border of units and a header indicating the data common in the units, the units here being a stream, a GOP and a picture respectively.

FIGS. 2A and 2B respectively show examples indicating how to perform inter picture prediction coding that is used in MPEG-2. The diagonally-shaded pictures in the figure are those pictures to be referred to by other pictures. As shown in FIG. 2A, in prediction coding in MPEG-2, P pictures (P0, P6, P9, P12 and P15) can refer to only a single picture selected as an immediately forward I picture or P picture in display time. Also, B pictures (B1, B2, B4, B5, B7, B8, B10, B11, B13, B14, B16, B17, B19, and B20) can refer to two pictures selected as a combination of an immediately forward I picture or P picture and an immediately backward I picture or P picture. Further, the order of pictures to be placed in a stream is determined. I pictures and a P picture are placed in the order of display time, and each B picture is placed immediately after an I picture to be displayed immediately after the B picture or immediately after a P picture. As a structural example of a GOP, as shown in FIG. 2B, pictures from I3 to B14 are grouped into a single GOP.

FIG. 3A is a structural diagram of an MPEG-4 AVC stream. There is no concept equivalent to a GOP in the MPEG-4 AVC. However, since it is possible to construct a randomly-accessible unit equivalent to a GOP by segmenting data on the basis of a special picture that can be decoded without depending on other pictures, the unit will be called RAU (Random Access Unit) hereafter. In other words, a random access unit RAU is a coded picture group starting with an intra coded picture that can be decoded without depending on any picture.

Next, the access unit that is a basic unit in handling a stream (simply called AU hereafter) will be described below. An AU is the unit for storing coded data equivalent to one picture, and includes a parameter set PS, slice data and the like. There are two types of parameter set PSs. One of them is a picture parameter set PPS (simply called PPS hereafter) which is data equivalent to the header of each picture. The other is a sequence parameter set SPS (simply called SPS hereafter) which is equivalent to the header included in a unit of a GOP or more in MPEG-2. An SPS includes the maximum number of reference pictures, a picture size and the like. On the other hand, a PPS includes a variable length coding type, an initial value of the quantization step, the number of reference pictures and the like. Each picture is assigned an identifier indicating which of the above-described PPS and SPS is referred to. Also, a frame number FN that is the identification number for identifying a picture included in slice data. Note that a sequence starts with a special picture at which all the statuses needed for decoding are reset as will be described below, and it is made up of a group of pictures that starts with a special picture and ends with a picture that is placed immediately before the next special picture.

There are two types of I pictures in MPEG-4 AVC. They are an Instantaneous Decoder Refresh (IDR) and the rest. An IDR picture is the I picture that can decode all the pictures placed after the IDR picture in a decoding order, without referring to pictures placed before the IDR picture in the decoding order, in other words, it is the I picture at which statuses needed for decoding are reset. An IDR picture corresponds to the top I picture of an MPEG-2 closed GOP. A sequence in MPEG-4 AVC starts with an IDR picture. In the case of an I picture that is not an IDR picture, a picture placed after the I picture in the decoding order may refer to a picture placed before the I picture in the decoding order. The respective picture types will be defined below. An IDR picture and an I picture are the pictures that are composed of only I slices. A P picture is the picture that may be composed of P slices and I slices. A B picture is the picture that may be composed of B slices, P slices and I slices. Note that the slices of an IDR picture are stored in a NAL unit whose type is different from that of the NAL unit where the slices of a non-IDR picture are stored. Here, a NAL unit is a sub-picture unit.

In an AU in MPEG-4 AVC, not only the data necessary for decoding but also supplemental information and border information of the AU can be included. Such supplemental information is called Supplemental Enhancement Information (SEI), and it is unnecessary for decoding of slice data. All the data such as a parameter set PS, slice data, a SEI are stored in a Network Abstraction Layer (NAL) unit, that is, NALU. A NAL unit is composed of a header and a payload. A header includes a field indicating data type to be stored (called NAL unit type hereafter). The values of NAL unit types are defined respectively for the types of data such as a slice or a SEI. Referring to such a value of a NAL unit type enables identifying the type of data to be stored in the NAL unit. The header of a NAL unit includes a field called nal_ref_idc. It is defined that a nal_ref_idc field is a 2-bit-field and takes a value of 0, 1 or more depending on the types of NAL units. For example, The NAL unit of an SPS or a PPS takes 1 or more. In the case of the NAL unit of a slice, a slice to be referred to by other slices takes 1 or more, while the slice not to be referred to takes 0. Also, the NAL unit of a SEI always takes 0.

One or more SEI messages can be stored in the NAL unit of a SEI. A SEI message is composed of a header and a payload, and the type of information to be stored in the payload is identified by the type of a SEI message indicated in the header. Decoding an AU means decoding the slice data in an AU, and displaying an AU means displaying the decoding result of the slice data in the AU hereafter.

Here, since a NAL unit does not include information for identifying a NAL unit border, it is possible to add border information to the top of each NAL unit at the time of storing a NAL unit as an AU. In handling an MPEG-4 AVC stream in an MPEG-2 Transport Stream (TS) or an MPEG-2 Program Stream (PS), a start code prefix shown as 3 bytes of 0x00000 is added to the top of a NAL unit. Also, it is defined that a NAL unit indicating an AU border must be inserted into the top of an AU in an MPEG-2 TS or PS, such an AU being called Access Unit Delimiter.

Conventionally, various kinds of technique related to moving picture coding like this have been proposed (For example, refer to Patent Document 1).

Patent Document 1: Japanese Laid-Open Patent No. 2003-18549 publication.

FIG. 4 is a block diagram of a conventional moving picture coding apparatus.

The moving picture coding apparatus 1 is an apparatus that outputs a coded stream Str obtained by converting, through compression coding, an input video signal Vin to be inputted into a bit stream of a variable length coded stream or the like. The moving picture coding apparatus includes a prediction structure determination unit PTYPE, a motion vector estimation unit ME, a motion compensation unit MC, a subtraction unit Sub, an orthogonal transform unit T, a quantization unit Q, an inverse quantization unit IQ, an inverse orthogonal transform unit IT, an addition unit Add, a picture memory PicMem, a switch and a variable length coding unit VLC.

The input video signal Vin is inputted into the subtraction unit Sub and the motion vector estimation unit ME. The subtraction unit Sub calculates the differential value between the inputted input video signal Vin and the prediction picture, and outputs it to the orthogonal transform unit. The orthogonal transform unit T converts the differential value into a frequency coefficient, and outputs it to the quantization unit Q. The quantization unit Q performs quantization on the inputted frequency coefficient, and outputs a quantization value Qcoef to the variable length coding unit.

The inverse quantization unit IQ performs inverse quantization on the quantization value Qcoef to reconstruct the frequency coefficient, and outputs it to the inverse orthogonal transform unit IT. The inverse orthogonal transform unit IT performs inverse frequency transform to transform the frequency coefficient into a pixel differential value, and outputs it to the addition unit Add. The addition unit Add adds the pixel differential value to the prediction picture to be outputted from the motion compensation unit MC to make a decoded picture. The switch SW is turned ON when storage of the decoded picture is instructed, and the decoded picture is stored in the picture memory PicMem.

On the other hand, the motion vector estimation unit ME, in which an input video signal Vin is inputted on a macro block by macro block basis, searches the decoded picture stored in the picture memory PicMem, and estimates the picture area that is closest to the input picture signal, and consequently determines the motion vector MV indicating the position. Motion vector estimation is performed on a block-by-block basis, the block being a segmented part of a macro block. Since plural pictures can be used as reference pictures at this time, identification numbers for specifying pictures to be referred to (relative indexes) are needed on a block-by-block basis. It becomes possible to specify reference pictures by calculating the picture numbers indicated by the relative indexes, such picture numbers being assigned to the respective pictures in a picture memory PicMem.

The motion compensation unit MC selects the picture area that is optimum as a prediction picture from the decoded pictures stored in the picture memory PicMem.

The prediction structure determination unit PTYPE instructs the motion vector estimation unit ME and the motion compensation unit MC to perform intra picture coding on the target picture as a randomly-accessible special picture using its picture type Ptype, in the case where a random access unit start picture RAUin indicates that the random access unit RAU starts with the current picture, and instructs the variable length coding unit VLC to code the picture type Ptype.

The variable length coding unit VLC performs variable length coding on the quantization value Qcoef, the relative index Index, the picture type Ptype and the motion vector MV to make a coded stream Str.

FIG. 5 is a block diagram of a conventional moving picture decoding apparatus 2. This moving picture decoding apparatus 2 includes a variable length decoding unit VLD, a picture memory PicMem, a motion compensation unit MC, an addition unit Add, an inverse orthogonal transform unit IT and an inverse quantization unit IQ. Note that, in the figure, these processing units that perform the same operations as those processing units in a conventional moving picture coding apparatus as shown in the block diagram of FIG. 4 are assigned the same reference numbers, and the descriptions on them will be omitted.

The variable length decoding unit VLD decodes a coded stream Str, and outputs the quantization value Qcoef, the relative index Index, the picture type Ptype and the motion vector MV. The quantization value Qcoef, the relative index Index and the motion vector MV are inputted into the picture memory PicMem, the motion compensation unit MC and the inverse quantization unit IQ respectively, and then decoding processing on them is performed. Such operations of a conventional moving picture coding apparatus have already been described using the block diagram of FIG. 4.

A random access unit RAU shows that decoding can be performed starting with the top AU in the random access unit. However, as a conventional MPEG-4 AVC stream allows very flexible prediction structures, a storage apparatus having an optical disc or a hard disc cannot obtain information for determining the AUs to be decoded or displayed at the time of variable-speed playback or reverse playback.

FIGS. 6A and 6B are examples of the prediction structures of AUs. Here, a picture is stored in each AU. FIG. 6A is the prediction structure of AUs used in an MPEG-2 stream. The diagonally-shaded pictures in the figure are pictures to be referred to by other AUs. In the MPEG-2, the AUs of P pictures (P4 and P7) can perform prediction coding only referring to a single AU selected as the AU of an immediately forward I picture or P picture in display time. Also, the AUs of B pictures (B1, B2, B3, B5 and B6) can perform prediction coding only referring to two AUs selected as a combination of AUs of an immediately forward I picture or P picture and an immediately backward I picture or P picture in display time. Further, the order of pictures to be placed in a stream is predetermined as follows: the AUs of an I picture and P pictures are placed in the order of display time; and each of the AUs of B pictures are placed immediately after the AUs of the I picture or one of the P pictures that is placed immediately after the AU of each B picture. Consequently, decoding can be performed in the following three ways: (1) all the pictures are decoded; (2) only the AUs of an I picture and P pictures are decoded and displayed; and (3) only the AU of an I picture is decoded and displayed. Therefore, the following three types of playback can easily be performed using: (1) normal playback, (2) medium-speed playback, and (3) high-speed playback.

In the MPEG-4 AVC, prediction where the AU of a B picture refers to the AU of a B picture can be performed. FIG. 6B is an example of prediction structure in an MPEG-4 AVC stream, and the AUs of B pictures (B1 and B3) refer to the AU (B2) of the B picture. In this example, the following four types of decoding or display can be realized: (1) all the pictures are decoded; (2) only AUs, of an I picture, P pictures and B pictures, which are referred to are decoded and displayed; (3) only AUs of an I picture and P pictures are decoded and displayed; (4) only the AU of an I picture is decoded and displayed.

In addition, in the MPEG-4 AVC, the AU of a P picture can refer to the AU of a B picture. As shown in FIG. 7, the AU of a P picture (P7) can refer to the AU of a B picture (B2). In this case, the AU of a P picture (P7) can be decoded only after the AU of a B picture (B2) is decoded. Therefore, the following three types of decoding or display can be realized: (1) all the pictures are decoded; (2) only AUs, of an I picture, P pictures and B pictures, which are referred to are decoded and displayed; (3) only the AU of an I picture is decoded and displayed.

In this way, as various prediction structures are allowed in the MPEG-4 AVC, analysis of slice data and judgment of the prediction structure must be made in order to know the reference relationship between AUs. This entails a problem that AUs to be decoded or displayed cannot be determined based on a rule that is predetermined depending on a playback speed at the time of performing jump-in playback, variable-speed playback and reverse playback, unlike in the case of the MPEG-2.

DISCLOSURE OF INVENTION

An object of the present invention is to provide (i) a moving picture stream generation apparatus, a moving picture coding apparatus and a moving picture multiplexing apparatus that generate a moving picture stream that can perform trick-play such as jump-in playback, variable-speed playback and reverse playback even in the case of a coding method like the MPEG-4 AVC that allows flexible prediction structures, and (ii) a moving picture decoding apparatus and the like that decodes such a moving picture stream.

In order to achieve the above-described object, the moving picture stream generation apparatus, of the present invention, generates a stream including pictures that constitute a moving picture. The apparatus includes: a supplemental information generation unit for generating, on a random access unit basis, supplemental information to be referred to at the time of playback of each random access unit, each random access unit including one or more pictures; and a stream generation unit for generating a stream including the generated supplemental information and the pictures by adding the supplemental information to each corresponding random access unit. At a top of each random access unit, an intra coded picture that can be decoded without depending on any picture is placed, and the supplemental information includes information for specifying pictures to be decoded at the time when the pictures included in each random access unit are played back in trick-play. In this way, each random access unit RAU includes the information for specifying pictures to be decoded in the case where trick-play is performed on the pictures included in the random access unit. Referring to supplemental information at the time of playback makes it possible to determine the pictures needed for trick-play instantly, without analyzing a complex prediction structure. Therefore, it becomes possible to perform trick-play such as variable-speed playback and reverse playback even in the case of a coding method like the MPEG-4 AVC in which various prediction structures are allowed.

Here, in a first aspect of the present invention, in the moving picture stream generation apparatus, the trick-play includes at least one of: jump-in playback; variable-speed playback; and reverse playback. Also, in a second aspect of the present invention, in the moving picture stream generation apparatus, each of the pictures is composed of sub-picture units, and the stream generation unit for storing the supplemental information into a first sub-picture unit different from a second sub-picture unit for storing a pixel value of each of the pictures. At this time, in a third aspect of the present invention, it is preferable that, in the moving picture stream generation apparatus, each random access unit is one or more pictures, and the stream generation unit stores the supplemental information into a top picture included in each random access unit.

Note that, in a fourth aspect of the present invention, in the moving picture stream generation apparatus, the supplemental information may include information for specifying pictures to be decoded at the time of playback of each random access unit at a specific speed. In the fourth aspect of the present invention, in the moving picture stream generation apparatus, the supplemental information may include information indicating picture priorities based on which each random access unit is played back. In the fourth aspect of the present invention, in the moving picture stream generation apparatus, the supplemental information may include pieces of information indicating picture types of all the pictures included in each random access unit, the pieces of information being placed in an order that corresponds to a decoding order of the pictures. Here, in a seventh aspect of the present invention, in the moving picture stream generation apparatus, the picture types include: an I picture on which intra coding is performed; a P picture on which inter coding is performed with reference to one picture per block, the block being a basic unit in coding; a reference B picture on which inter coding is performed with reference to two pictures per block, the block being a basic unit in coding, and the reference B picture being a picture that is referred to by another picture; and a non-reference B picture on which inter coding is performed with reference to two pictures per block, the block being a basic unit in coding, and the non-reference B picture being a picture that is not referred to by another picture.

Also, in the fourth aspect of the present invention, in the moving picture stream generation apparatus, the supplemental information may include pieces of information indicating picture structure types of all the pictures included in each random access unit, the pieces of information being placed in an order that corresponds to a decoding order of the pictures. Here, at least a field structure and a frame structure are included in each picture structure. Otherwise, in the case where a picture has a frame structure, information indicating whether the picture has a display field equivalent to two pictures or the picture has a display field equivalent to three pictures may be included in each of the picture structure types.

Also, in a tenth aspect of the present invention, in the moving picture stream generation apparatus, the picture structure types may further include a frame structure with information indicating whether a picture has a display field equivalent to two pictures or the picture has a display field equivalent to three pictures, in the case where the picture has a frame structure. More specifically, in the first aspect of the present invention, the moving picture stream generation apparatus may further include a sequence parameter set addition unit for adding, to each random access unit, a sequence parameter set that is a group of parameters concerning one or more pictures, in the apparatus, the sequence starts with a special picture at which all statuses needed for decoding are reset and ends with a picture that is placed immediately before the next special picture. In this way a sequence parameter set not only can show sequence information but also can be used as border information of a random access unit. Here, a sequence starts with a special picture at which all the statuses needed for decoding are reset, and it is made up of pictures that starts with a special picture and ends with a picture that is placed immediately before the next special picture.

Note that the present invention not only can be realized as a moving picture stream generation apparatus described above, but also can be realized as a moving picture coding apparatus having a coding unit in addition to these units, as a moving picture multiplexing apparatus that packetizes a coded stream and multiplexes the coded stream together with supplemental information, and as a moving picture decoding apparatus that decodes such a coded stream and performs trick-play of the coded stream. Further, the present invention can also be realized as a method including steps respectively corresponding to the processing units in each of the above-described apparatuses, as a program to be executed by a computer, as a data stream generated by the moving picture stream generation apparatus, as a recording medium such as a computer-readable CD-ROM, and further, as a semiconductor IC such as an LSI.

As described up to this point, with the present invention, AUs to be decoded at the time of trick-play such as variable-speed playback and reverse playback can be determined by referring to a specific NAL unit in the top AU of a random access unit RAU. Therefore, a moving picture decoding apparatus with an excellent trick-play function can be realized easily, and thus the present invention is highly practical.

FURTHER INFORMATION ABOUT TECHNICAL BACKGROUND TO THIS APPLICATION

The disclosure of Japanese Patent Application No. 2004-134212 filed on Apr. 28, 2004 including specification, drawings and claims is incorporated herein by reference in its entirety.

The disclosure of Japanese Patent Application No. 2004-165005 filed on Jun. 2, 2004 including specification, drawings and claims is incorporated herein by reference in its entirety.

The disclosure of Japanese Patent Application No. 2004-251871 filed on Aug. 31, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIGS. 2A and 2B are diagrams showing MPEG-2 GOP structures respectively in a background art;

FIGS. 3A and 3B are diagrams showing MPEG-4 stream structures respectively in a background art;

FIGS. 6A and 6B are diagrams respectively showing examples of the prediction structure in a conventional MPEG-4 AVC stream;

FIGS. 8A and 8B are diagrams showing structures of MPEG-4 AVC streams of the present invention respectively;

FIGS. 10A to 10D are diagrams of a second example showing AUs to be decoded in a random access unit RAU;

FIGS. 11A to 11C are diagrams of a third example showing AUs to be decoded in a random access unit RAU;

FIGS. 12A to 12F are diagrams of an example showing the method for specifying AUs to be decoded in a random access unit RAU;

FIG. 13A is a diagram showing a syntax example of a table indicating variable-speed playback information, and FIG. 13B is a diagram showing a data storage unit;

FIG. 14 is a diagram of an extension example of a table indicating variable-speed playback information;

FIGS. 15A to 15C are diagrams of an example showing the AUs of the I picture and P pictures in a random access unit RAU as variable-speed playback information;

FIGS. 16A to 16C are diagrams of an example where buffer detention time is used as indicators of priorities at the time of using the priorities of AUs as variable-speed playback information;

FIGS. 17A and 17B are diagrams respectively showing examples where frame structure AUs and field structure AUs coexist in the respective RAUs; FIG. 17C is a diagram showing the syntax example of the first map (RAU_map1) showing the structure of each AU in the RAU; FIG. 17D is a diagram showing RAU_map1 of the RAU of FIG. 17B; FIG. 17E is a diagram showing RAU_map as to the random access unit RAU of FIG. 17B; FIG. 17F is a diagram showing the syntax example of the second map (RAU_map2) showing the coding type of each frame or each pictures of a field pair;

FIG. 18A to FIG. 18C are diagrams showing another example map as playback information;

FIG. 20A and FIG. 20B are diagrams showing examples of prediction structures of pictures in a random access unit RAU;

BEST MODE FOR CARRYING OUT THE INVENTION

Figure 1A:
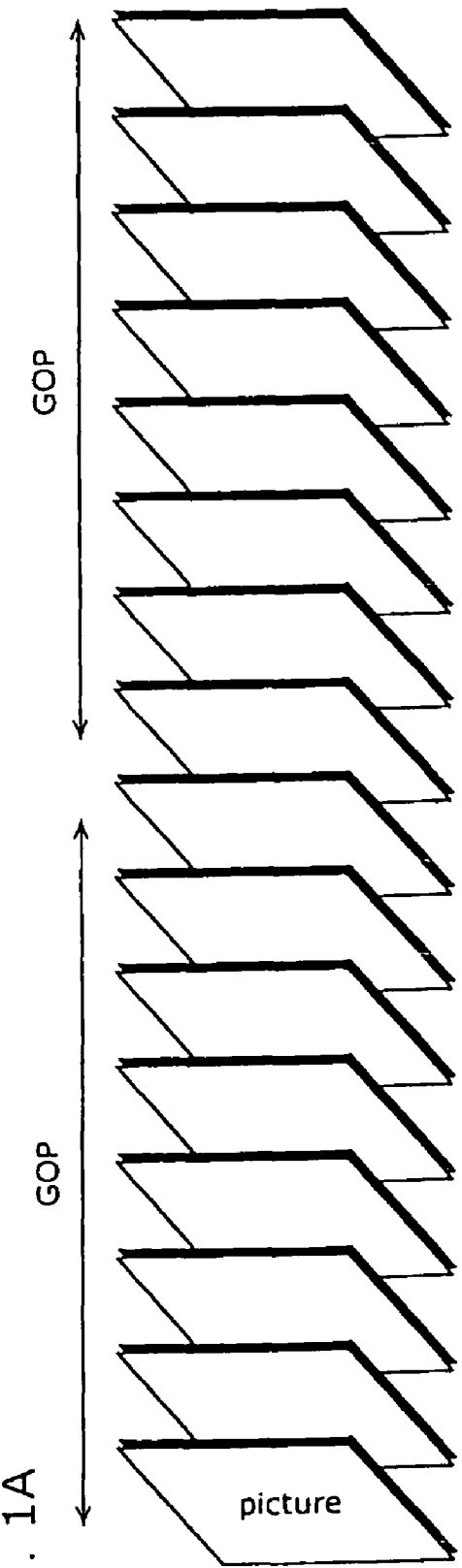
FIGS. 1A and 1B are diagrams showing MPEG-2 stream structures respectively in a background art.
Figure 1B:
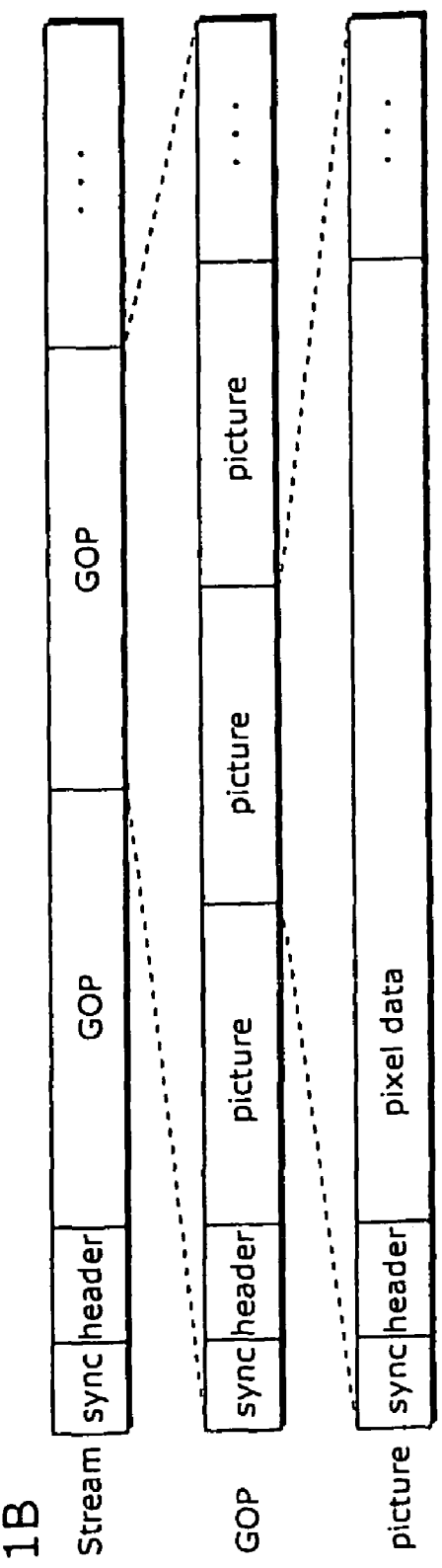

An embodiment of the present invention will be described below with reference to figures.

(Structure of an AVC Stream)

First, the structure of an AVC stream to be generated by a moving picture stream generation apparatus, a moving picture coding apparatus and a moving picture multiplexing apparatus of the present invention, in other words, an AVC stream to be inputted in a moving picture decoding apparatus of the present invention will be described.

FIG. 8A and FIG. 8B respectively show the structures of AVC streams of the present invention. Note that the border information to be added to the top of a NAL unit is not shown in the figure. The AVC stream differs from a conventional AVC stream in that trick-play information is added, the trick-play information indicating AUs to be decoded at the time of trick-play such as jump-in playback, variable-speed playback and reverse playback. The trick-play information is stored in a NAL unit for storing playback information (FIG. 8A). In the MPEG-4 AVC, the relationship between information to be stored and the NAL unit type of a specific NAL unit can be set by application. More specifically, values of 0 and 24 to 31 can be used, and these NAL unit types are called as user settable NAL unit types. Consequently, trick-play information is stored in the NAL unit having such user-settable NAL unit types. Here, in the case where specific NAL unit types are reserved in order to store the information other than the trick-play information, NAL unit types that are different from the NAL unit types are assigned to the trick-play information. The NAL units of the trick-play information are stored in the top AU of a random access unit RAU. Such a NAL unit is placed immediately after a PPS NAL unit, if it is present, in an AU, but it may be placed in another position as long as the order satisfies the requirement of the MPEG-4 AVC or another standard. Also, in the case where it is impossible to interpret the NAL unit of trick-play information, the data of the NAL unit can be skipped and restart decoding from the top of the next NAL unit. Therefore, even a terminal that cannot interpret the NAL unit of trick-play information can perform decoding processing without failure.

Note that such a NAL unit of trick-play information may be included not in the top AU of a random access unit RAU but in another AU such as the last AU. Also, such a NAL unit of trick-play information may be included in each AU that constitutes a random access unit RAU.

FIG. 9 to FIG. 11 show examples of AUs to be decoded at the time of variable-speed playback. FIG. 9A shows the display order of AUs. Here, the diagonally-shaded AUs are those AUs to be referred to by other AUs, and arrows show pictures that referred to. Minus reference numbers are assigned to AUs to be displayed before I0, and plus reference numbers are assigned to AUs to be displayed after B15. FIG. 9B shows the decoding order of AUs shown in FIG. 9A, and I0 to B11 constitute a random access unit RAU. At this time, I0, -B14, P4, B2, P8, P6, P12 and B10 are decoded in order to perform double-speed playback (FIG. 9C), while I0, P4, P8 and P12 are decoded in order to perform quadruple-speed playback (FIG. 9D). FIGS. 9C and 9D show that AUs with a * sign are to be decoded at the time of double-speed playback and quadruple-speed playback, and these pieces of information are stored in the NAL unit of trick-play information. In the example of FIG. 10A to FIG. 10D, pictures from I0 to B11 in the decoding order constitute a random access unit RAU. Here, I0, -B13, P3, B1, P6, B4, P9, B7, P12 and B10 are decoded in order to perform 1.5 times-speed playback, while I0, P3, P6, P9 and P12 are decoded in order to perform triple-speed playback. Also, in the example of FIG. 11A to 11C, I0, P3, P6, P9 and P12 are decoded in order to perform triple-speed playback.

Here, the playback speeds need not to be exact because they are described as guidelines of playback speeds. For example, in the example of FIG. 11C, in the case where all the AUs shown as the AUs to be decoded at the time of triple-speed playback are decoded, the speed is 3.2 times-speed obtained from the expression: 16÷5, in other words, it is not exactly triple-speed. Also, at the time of playback at M times-speed, in the case where the smallest value over M is N among the playback speeds shown as trick-play information, it is possible to decode AUs need to be decoded at the time of N times-speed playback and to determine how the rest of AUs should be decoded depending on the implementation of the decoding apparatus. Also, it is possible to place high priorities on the AUs need to be decoded in the case where the playback speed is fast, and to determine the AUs to be decoded based on the priorities.

Note that some AUs, among AUs to be decoded at the time of variable-speed playback, may not to be displayed. For example, $N^{th}$ AU is displayed at the time of double-speed playback, but $M^{th}$ AU is not displayed. At this time, in the case where there is a need to decode the $M^{th}$ AU in order to decode the $N^{th}$ AU, the $M^{th}$ AU is decoded but is not displayed at the time of double-speed playback.

Next, the method for specifying the AUs to be decoded at the time of variable-speed playback will be described with reference to FIGS. 12A to 12F. FIGS. 12A to 12F show the examples of specifying AUs to be decoded in the same random access unit RAU as that of FIG. 9. As shown in FIG. 12D, I0, -B14, P4, B2, P8, P6, P12, B10 are decoded at the time of double-speed playback. These AUs are the first, second, fifth, sixth, ninth, tenth, thirteenth and fourteenth AUs when counting AUs starting with the top AU of the random access unit RAU. In this way, it is possible to uniquely specify AUs to be decoded at the time of variable-speed playback by showing the ordinal numbers of AUs in a random access unit RAU. An access unit delimiter is surely placed at the top of an AU at the time of multiplexing an AVC stream by an MPEG-2 transport stream (TS). When obtaining AU data to be decoded at the time of variable-speed playback, the access unit delimiters are searched in sequence to know the AU borders. This way of searching processing eliminates the need to analyze the payload of NAL units such as slice data, and thus it is easier.

Note that it is possible to specify AUs to be decoded by determining that AUs to be referred to by other AUs such as AUs of an I picture and P pictures (such AUs to be referred to are called reference AUs) are decoded at the time of variable-speed playback and by specifying the ordinal numbers of reference AUs in a random access unit RAU. In the random access unit RAU of FIG. 12B, as shown in FIG. 12C, I0, -B14, P4, B2, P8, P6, P12, B10 are reference AUs. Also, at the time of double-speed playback, I0, -B14, P4, B2, P8, P6, P12, B10 are decoded, but when indicating these AUs in the order of reference AUs, they correspond to the first, second, third, fourth, fifth, sixth, seventh and eighth reference AUs as shown in FIG. 12F. Whether an AU is a reference AU or not can be judged by referring to a specific field in the header of the NAL unit in a slice. More specifically, in the case where the value of a nal_ref_idc field is not 0, the AU is a reference AU. Note that a reference AU to be decoded may be specified based on a frame number because it is possible to identify a reference AU based on a frame number.

Further, it is possible to specify AUs to be decoded by specifying the offset value equivalent to the byte length from the start position of the top AU of a random access unit RAU to the starting position of the AU to be decoded. For example, in FIGS. 12A to 12F, in the case where I0 is started with the position distant from the top of a stream by 10000 bytes and P4 is started with the position distant from P4 by 20000 bytes, the offset value to P4 is 10000 bytes obtained from the expression: 20000-10000. In the case where a multiplexed stream is used in an MPEG-2 TS, it is possible to specify an offset value including the overhead of the header of a TS packet or a PES packet (Packetized Elementary Stream), or it is possible to specify an offset value including this at the time of performing data padding by application. Also, it is possible to specify an AU by a frame number FN.

Note that, in the case of using a stream multiplexed in an MPEG-2 TS, it is possible to specify AUs based on the number of TS packets from (i) the TS packet for storing the index number and the address information for identifying a TS packet including the top data of AUs to be decoded, or the top data of the random access unit RAU to (ii) the current TS packet. Here, it is possible to use the information on Source Packet to be used for a recording format of a Blu-ray Disc (BD) instead of a TS packet. Source Packet is obtained by adding, to a TS packet, a 4-byte header including time information of the TS packet, copy control information and the like.

FIG. 13A is a syntax example of a table indicating the information for variable-speed playback. In the syntax, num_pic_in_RAU shows the number of AUs that constitute a random access unit RAU, num_speed shows the number of playback speeds at which AUs to be decoded, play_speed shows a playback speed, num_dec_pic shows the number of AUs to be decoded at the time of playing back at a playback speed shown in the play_speed, dec_pic shows the ordinal numbers of AUs to be decoded in the case of counting the AUs starting with the top AU in a random access unit RAU. FIG. 13B is an example in the case of storing information on AUs to be decoded in a random access unit RAU shown in FIGS. 9A to 9D at the time of double-speed playback and quadruple-speed playback. Note that num_pic_in_RAU is used at the time of calculating an exact playback speed based on the number of AUs to be decoded and the total number of AUs in a random access unit RAU or skipping on a basis of random access unit RAUs in sequence. However, num_pic_in_RAU may be omitted because the same information can be obtained by searching the top AUs of random access unit RAUs. Also, a field indicating the size of a table may be added to the table. Note that, in the syntax example of FIG. 13A, the ordinal number of an AU to be decoded, counting from the top of a random access unit RAU, is directly shown, but whether there is a need to decode each AU or not may be shown by turning on or off the bits corresponding to each AU. For example, a random access unit RAU is composed of 16 AUs in the example of FIGS. 9A to 9D, 16 bits are needed when assigning 1 bit to one AU. At the time of quadruple-speed playback, it is shown that the first, fifth, ninth and thirteenth AUs are decoded by assigning 16 bit information that is represented as 0b1000100010001000 (0b shows a binary number). Here, the top bit and the last bit correspond to the top AU and the last AU of a random access unit RAU respectively.

Note that the size of a table is variable in the syntax example of FIG. 13A. The maximum value of the table size is determined in the case where the maximum value of the number of AUs that constitute a random access unit RAU and the maximum value of num_speed are prescribed. Consequently, it is possible to fix the table size at the determined maximum value, and, in the case where the size of the information for variable-speed playback does not reach the maximum value, it is possible to perform padding. Fixing the table size in this way makes it possible to always obtain the data of a fixed size when obtaining the variable-speed playback information, which enables accelerating the information obtainment processing. Note that the table size or the size of a NAL unit for storing the table is shown as management information. Also, it is possible to predetermine the size of a NAL unit for storing trick-play information, and, in the case where the information cannot be stored in a single NAL unit, it is possible to store the information for variable-speed playback into plural NAL units separately. At this time, padding is performed on the payload of the last NAL unit so that the size of the NAL unit becomes the predetermined size. Also, some prescribed values are determined as the values of the table size, and the index number indicating a prescribed value of the table size may be shown in the table or using the management information of the application.

Also, it is possible to show differential information instead of listing all the AUs to be decoded at each playback speed. As the information at the time of M (<N) times-speed playback, only AUs need to be decoded are shown in addition to the AUs to be decoded at the time of N times-speed playback. In the example of FIG. 13B, as the second, sixth, tenth and fourteenth AUs, in addition to the AUs to be decoded at the time of quadruple-speed playback, are decoded at the time of double-speed playback, it is possible to show only the second, sixth, tenth and fourteenth AUs as the information for double-speed playback.

Note that, AUs need to be decoded at the time of variable-speed playback are shown in the above-description, but further, it is possible to show the information indicating the display order of AUs need to be decoded. For example, the information at the time of double-speed playback and quadruple-speed playback is shown in the example of FIGS. 9A to 9D, but here is an example of playing back this random access unit RAU at triple-speed. Displaying a part of AUs to be displayed at the time of double-speed playback, in addition to the AUs to be displayed at the time of quadruple-speed playback, enables realizing triple-speed playback. Here, when considering the case where one more AU is displayed between I0 and P4 that are to be displayed at the time of quadruple-speed playback, the information for double-speed playback shows that the candidates are -B14, B2, B6 and B10. However, the display order of these four AUs can be obtained only in the case where the header information of a slice is analyzed. Here, as the information on the display order shows that only -B14 is displayed between I0 and P4, it is possible to determine that -B14 is decoded. FIG. 14 is a syntax example indicating the information on the display order, and it is obtained by adding the information on the display order to the syntax of FIG. 13A. Here, pts_dts_flag shows whether or not the decoding order of AUs to be decoded at the playback speed matches the display order of the AUs, and only in the case where the decoding order does not match the display order, the information of display order is shown in a display_order field.

Note that, in the case of playback at a playback speed that is not shown by the information of variable-speed playback, it is possible to determine the AUs to be decoded and the AUs to be displayed based on the rule that is predetermined in the terminal. For example, in the case of playback at triple-speed in the example of FIG. 9, it is possible to display I0, B3, B6, B9 and P12 in addition to the AUs to be displayed at the time of quadruple-speed playback, instead of displaying a part of the AUs to be displayed at the time of double-speed playback. Here, as to B pictures, B pictures in reference AUs may be preferentially decoded or displayed.

Also, there is a case where trick-play such as variable-speed playback is realized by playing back only the AU of an I picture or only the AUs of an I picture and P pictures. Therefore, a list of an I picture and P pictures may be stored as trick-play information. FIG. 15A to 15C show another example. Here, pictures from I0 to B14 are included in a random access unit RAU as shown in FIG. 15B, and among those, AUs of an I picture and P pictures are I0, P3, P6, P9, P12 and P15 as shown in FIG. 15C. Therefore, the information for identifying I0, P3, P6, P9, P12 and P15 is stored. At this time, it is possible to add the information for distinguishing the AU of an I picture from the AU of a P picture. Also, it is possible to show the information for distinguishing the following pictures from each other, the pictures including: an I picture, P pictures, B pictures to be referred to (called reference B pictures hereafter), and B pictures not to be referred to (called non-reference B pictures hereafter).

Further, it is possible to store the priority information of the respective AUs as trick-play information, and to decode or display the AUs according to the priorities at the time of variable-speed playback. It is possible to use picture types as priority information. For example, the priorities of AUs can be assigned in the following listed order: (i) an I picture; (ii) P pictures; (iii) reference B pictures; and (iv) non-reference B pictures. Also, it is possible to set priority information in the following way: the longer the time between the time after an AU is decoded and the time the AU is displayed is, the higher the priority becomes. FIGS. 16A to 16C show an example of setting the priorities depending on the buffer detention time. FIG. 16A shows the prediction structure of AUs, and P3 is referred to by also B7 and P9. At this time, in the case where the random access unit RAU is composed of AUs from I0 to B11 (FIG. 16B), the buffer detention time of each AU is like shown in FIG. 16C. Here, the buffer detention time is shown based on the number of frames. For example, P3 is needed until P9 is decoded, and the buffer detention time must be equivalent to six pictures. Therefore, decoding of AUs whose buffer detention time is 3 or more means decoding of all the I picture and the P pictures, and triple-speed playback is realized. Here, the buffer detention time of P3 is longer than that of I0, but it is possible to add an offset value to the AU of the I picture in order to place the highest priority on the AU of the I picture. Also, it is possible to place high priorities on the AUs need to be decoded at the time of high-speed playback and to use, as priority information, N in the AUs need to be decoded at the time of N times-speed playback. Note that, in the case where an AU is referred to by other AUs after it is decoded or displayed, it is possible to show the time period during which the AU is referred to.

Note that the trick-play information may be stored in a SEI message (FIG. 8B). In this case, the type of a SEI message is defined for trick-play information, and the trick-play information is stored in the SEI message of the defined type. The SEI message for the trick-play information is stored in the SEI NAL unit solely or together with other SEI messages. Note that it is possible to store trick-play information in user_data_registered_itu_t_t35 SEI message or user_data_unregistered SEI message that are SEI messages for storing the information defined by a user. At the time of using these SEIs, it is possible to show that the trick-play information is stored or that the type of trick-play information in the payload part of a SEI by adding identification information of the information to be stored.

Note that it is possible to store trick-play information in AUs other than the top AU in a random access unit RAU. Also, it is possible to predetermine the values for identifying AUs need to be decoded at the time of playback at a specific playback speed and to add the values determined for each AU. For example, as to AUs to be decoded at a playback speed that is N times-speed or less, N is given as playback speed information. Also, it is possible to show the following in nal_ref_idc and the like of the NAL unit of a slice: the structure of the picture in an AU, the structure being a frame structure or a field structure, and further, in the case where the picture has a field structure, it is possible to show the field type, that is a top field or a bottom field. For example, as there is a need to alternately display top fields and bottom fields in the case of interlace display, it is desirable that whether the field to be decoded next is a top field or a bottom field can easily be judged at the time of decoding fields by skipping some fields at the time of high-speed playback. In the case where the field type can be judged from the header of a NAL unit, there is no need to analyze the slice header, and the processing amount needed for such judgment can be reduced.

Note that the information indicating whether each AU that constitutes a random access unit RAU is a field or a frame may be stored into the top AU of a random access unit RAU. Also, it is possible to easily determine the AUs to be decoded at the time of trick-play even in the case where a field structure and a frame structure coexist by storing such information into the top AU of the random access unit. FIGS. 17A and 17B are examples where the AUs having a frame structure and the AUs having a field structure coexist in the random access unit RAU, and they shows the display order of the AUs and the decoding order of the AUs respectively. The following pictures are coded as field pairs respectively: B2 and B3; I4 and P5; B9 and B10; B11 and B12; P13 and P14; B15 and B16; B17 and B18; and P19 and P20. Also, the other AUs are coded as the AUs having a frame structure. At this time, in the case of playing back only the AUs of an I picture and P pictures, the following can be decoded and played back in the following listed order: the field pair of I4 and P5; the frame of P8; the field pair of P13 and P14; and the field pair of P19 and P20. However, adding such information is effective because there is a need to judge whether each AU is one of the fields that constitute a field pair or each AU is a frame at the time of determining AUs to be decoded.

FIG. 17C is a syntax example of the first map (RAU_map1) indicating whether an AU in a random access unit RAU is a frame or a field. The number of AUs that constitute a random access unit is shown in num_AU_in_RAU, and the information on each AU is shown in the following loop in a decoding order. Here, frame_field_flag shows whether the picture to be stored in an AU is a frame or a field. Also, pic_type shows the information on the coding type of a picture. Coding types that can be shown include: an I picture; an IDR picture; a P picture; a reference B picture; a non-reference B picture; and the like. Therefore, it is possible to determine pictures to be decoded at the time of trick-play by referring to this map. Note that it is possible to indicate whether each I picture and each P picture are referred to or not. Further, it is possible to indicate the information for judging whether a predetermined requirement is applied as to prediction structures.

FIG. 17D shows RAU_map1 concerning a random access unit RAU of FIG. 17B. Here, pic_type of an I picture, P pictures, reference B pictures, and non-reference B pictures are 0, 1, 2 and 3 respectively. Here, it is possible to store the information indicating picture coding types on the above-listed bases because pictures are played back on a frame-by-frame basis, or on a field pair by field pair basis at the time of trick-play.

FIG. 17F is a syntax example of the second map (RAU_map2) indicating coding types of pictures on the frame-by-frame basis or on the field pair by field pair basis. Here, num_frame_in_RAU shows the number of frames that constitute a random access unit RAU and the number of field pairs. Also, frame_flag shows whether a picture is a frame or not, and in the case where it is a frame, 1 is set there. In the case where 1 is set in frame_flag, the information on the coding type of a frame is shown in frame_type. In the case where 0 is set in frame_flag, in other words, the picture is one of a field pair, the coding type of each field that constitutes the field pair is shown in field_pair_type.

FIG. 17E shows RAU_map2 as to the random access unit RAU of FIG. 17B. In FIG. 17E, values indicating frame_type of an I picture, P pictures, reference B pictures, and non-reference B pictures are 0, 1, 2 and 3 respectively. Also, field_pair_type shows the type of each field in a decoding order. Field types are as follows: I for an I picture; P for P pictures; Br for reference B pictures; and Bn for non-reference pictures. For example, it is shown as IP in the case where the first field is an I picture and the second field is a P picture, and it is shown as BnBn in the case where the first field and the second field are non-reference B pictures.

Here, values for indicating combinations of IP, PP, PI, BrBr, BnBn and the like are previously set. Note that the following information may be used as the information indicating the coding type of a field pair: information as to whether the field pair includes an I picture or one or more P pictures; information as to whether the field pair includes one or more reference B pictures; and information as to whether the field pair includes one or more non-reference B pictures.

For example, trick-play information may be the map of a random access unit RAU like a syntax shown in FIG. 18A. This map includes picture_structure indicating the structure of each of the pictures included in the random access unit RAU and picture_type indicating the picture type. As shown in FIG. 18B, picture_structure shows the structure of each picture, that is, a field structure or a frame structure, and the like. Also, as shown in FIG. 18C, picture_type shows the picture type of each picture, that is, an I picture, a reference B picture, a non-reference B picture, and a P picture. In this way, the moving picture decoding apparatus that received this map can easily identify AUs on which trick-play is performed by referring to this map. As an example, it is possible to decode and play back, in high-speed playback, only an I picture and P pictures or reference B pictures in addition to an I picture and P pictures.

Note that in the case where the information indicating the picture structure such as 3-2 pull down is included in an AU that constitutes a random access unit RAU, it is possible to include the information indicating the picture structure in the above-described first or second map. For example, it is possible to show whether each picture has display fields equivalent to three pictures or each picture has display fields equivalent to two pictures. Further, in the case where it has display fields equivalent to three pictures, it is possible to show the information indicating whether the first field is displayed repeatedly or the information indicating whether the first field is a top field. Also, in the case where it has display fields equivalent to two pictures, it is possible to show the information whether the first field is a top field. Here, in the MPEG-4 AVC, whether a picture has a picture structure such as 3-2 pull down can be shown by using (i) pic_struct_present_flag of a Sequence Parameter Set (SPS) or (ii) picture_to_display_conversion_flag and the like in the AVC timing and HRD descriptor that is defined in the MPEG-2 system standard. Further, the structure of each picture is shown by a pic_struct field of a Picture Timing SEI. Therefore, it is possible to show the picture structure by setting a flag only in the case where a pic_struct field has a specific value, for example, a picture has display fields equivalent to three pictures. In other words, indicating the following three types of information as to each picture is effective (i) in the case where jump-in playback is performed in the middle of a random access unit RAU and (ii) at the time of determining the field to be displayed at specific time or the frame in which a field is stored. The same can be said in the case of determining pictures to be displayed during variable-speed playback. The three types of information are:

(i) field (ii) frame (which is used at the time of not using 3-2 pull down, or which is also used at the time of using 3-2 pull down. In the latter case, the frame has display fields equivalent to two pictures.)

(iii) frame having a display field equivalent to three pictures at the time of using 3-2 pull down.

Note that these types of information can be indicated in picture_structure of a RAU map shown in FIG. 18A.

Indicating list information of picture types of the respective pictures that constitute a RAU in this way makes it possible to easily determine pictures to be decoded or displayed at the time of performing trick-play such as variable-speed playback, jump-in playback and reverse playback. This is especially effective in the following cases:

(i) where only an I picture and P pictures are played back;

(ii) where high-speed playback in which an I picture, P pictures and reference B pictures is performed; and (iii) where pictures on which requirements as to prediction structures are placed are identified based on picture types, the pictures need to be decoded at the time of trick-play are selected, and the selected pictures are played back in trick-play.

Further, it is possible to store a default value of trick-play information in a region, which is different from the AVC stream, such as management information at application level, and to include trick-play information in a random access unit RAU only in the case where trick-play information is different from the trick-play information shown by the default value.

Trick-play information as to variable-speed playback has been described above, but it is possible to use similar information as supplemental information at the time of reverse playback. It is possible to complete decoding at a time at the time of reverse playback in the case where all the pictures to be displayed can be stored in a memory, the processing load needed for decoding can be reduced. Considering a case of performing reverse playback in the listed order of P12, P8, P4 and I0 in the example of FIGS. 9A to 9D, on condition that all the decoding results of these four AUs are stored, it is possible to decode I0, P4, P8 and P12 in this order at a time and to perform reverse playback. Therefore, it is possible to judge whether or not all the decoded data of the AUs can be stored based on the number of AUs to be decoded or displayed at the time of N times-speed playback, and to determine the AUs to be displayed at the time of performing reverse playback based on the judgment result.

Likewise, trick-play information can be used as supplemental information at the time of jump-in playback. Here, jump-in playback means fast-forwarding of a moving picture and performing normal playback of the moving picture starting with the position determined at random. Determining pictures to be fast-forwarded using such supplemental information even at the time of jump-in playback makes it possible to determine the picture at which jump-in playback is started.

Note that the AU to be referred to of each AU that constitutes a random access unit may be directly shown in trick-play information. In the case where there are plural reference AUs, all of them are shown. Here, in the case where a reference AU belongs to a random access unit different from the random access unit including an AU that refers to the reference AU, the AU may be indicated in the following specific way: the $M^{th}$ AU of the random access unit that is placed before or after N numbers of random access units, or the AU may be indicated in the following simple way: the AU belonging to the random access unit that is placed before or after N numbers of random access units. Note that it is possible to show the ordinal number, in the decoding order, of the reference AU in the case of counting from the AU that refers to the reference AU. At this time, AUs are counted on the basis of one of the following: all AUs; reference AUs; AUs of a specific picture type such as I, P and B. Also, it is possible to show that each AU may refer to only AUs up to N numbers of AUs before and after in a decoding order. Note that, in the case of referring to an AU that is not included in the AUs up to N numbers of AUs before and after in the decoding order, it is possible to add the information indicating the fact.

Note that it is possible to use the above-described trick-play information in a similar way also in a multiplexing format such as the MP4 where the size of a NAL unit is used instead of using a start code prefix as the border information of a NAL unit.

Note that, at the time of receiving and recording a coded stream that is packetized using an MPEG-2 TS (Transport Stream) packet or an RTP (Real Time Transmission Protocol), a packet loss occurs. In this way, in the case of recording the data received in an environment where a packet loss occurs, it is possible to store, into a coded stream as supplemental information, or as management information, the information indicating that data in a stream is lost because of a packet loss. It is possible to show a data loss because of a packet loss by inserting the flag information indicating whether the data of the stream is lost or not or a special error notification code for notifying the lost part. Note that, in the case of performing error concealment processing when the data is lost, it is possible to store identification information indicating the presence/absence or the method of error concealment processing.

Figure 19:
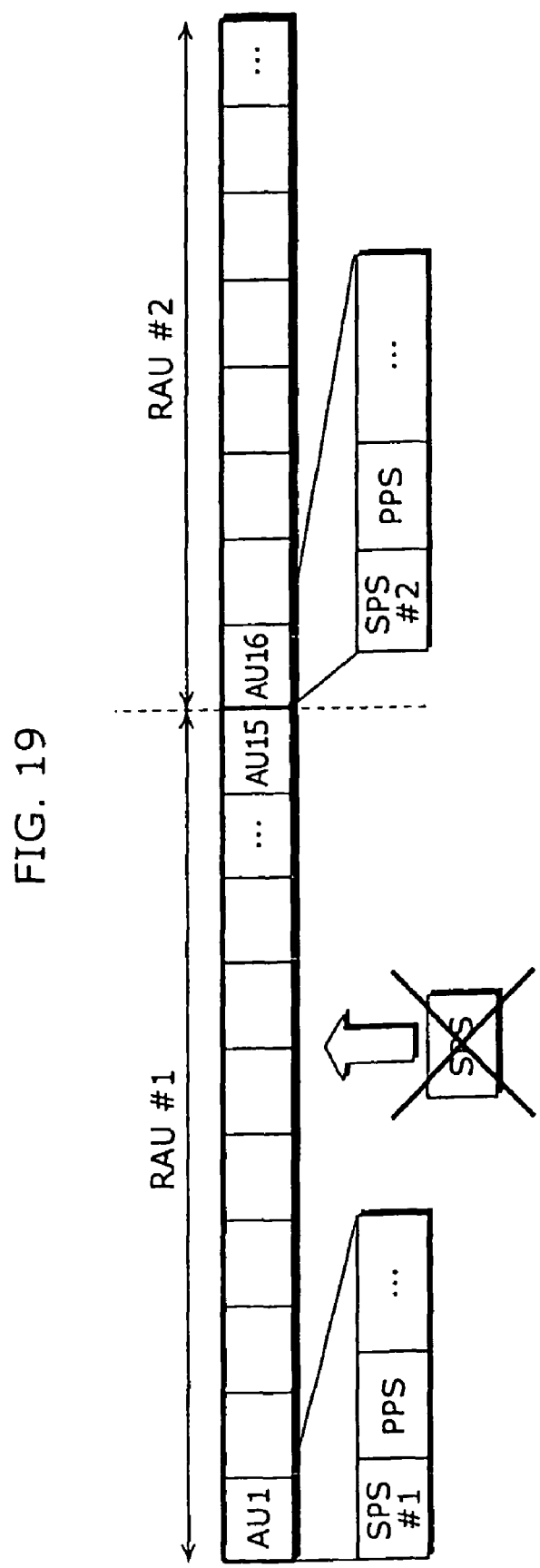
FIG. 19 is a diagram of the method for indicating the border information in a random access unit RAU.

Trick-play information for determining AUs to be decoded or displayed at the time of trick-play has been described up to this point. Here, the data structure for enabling the detection of the border of random access unit RAUs will be described with reference to FIG. 19.

In the top AU of a random access unit RAU, the NAL unit of an SPS to be referred to by an AU that constitutes a random access unit RAU is always stored. On the other hand, in the MPEG-4 AVC standard, it is possible to store the NAL unit of the SPS to be referred to by the $N^{th}$ AU in a decoding order into an AU that is arbitrarily selected from among the $N^{th}$ AU or the AUs placed before the $N^{th}$ AU in a decoding order. Such NAL unit is stored so that the NAL unit of an SPS can be repeatedly transmitted, in preparation for the case where the NAL unit of an SPS is lost because of a packet loss at the time of transmitting a stream in communication or broadcasting. However, the following rule is effective for the use of the storage applications. Only a single NAL unit of the SPS to be referred to by all the AUs of the random access unit RAU is stored into the top AU of a random access unit RAU, and the NAL unit of the SPS is not stored into the following AUs in the random access unit. Doing this makes it possible to guarantee that the AU is the top AU of the random access unit RAU if it includes the NAL unit of an SPS. The start of the random access unit RAU can be found by searching the NAL unit of the SPS. The management information of a stream such as a time map does not guarantee to provide access information as to all the random access unit RAUs. Therefore, it is especially effective that the start position of each random access unit RAU can be obtained by searching the NAL unit of an SPS in a stream in the case of, for example, performing jump-in playback on the picture placed in the middle of the random access unit RAU whose access information is not provided.

Here, in the case where the top AU of the random access unit RAU is the AU of an IDR picture, the AU of the random access unit RAU does not refer to the AU in the random access unit RAU that is placed earlier in a decoding order. This type of random access unit RAU is called closed-type random access unit RAU. On the other hand, in the case where the top AU of a random access unit RAU is the AU of an I picture that is not an IDR picture, the AU of the random access unit RAU can refer to the AU in the random access unit RAU that is placed earlier in a decoding order. This type of random access unit RAU is called open-type random access unit RAU. At the time when angles are switched during playback in an optical disc or the like, switching is performed from a closed-type random access unit RAU. Therefore, it is effective that the judgment as to whether a random access unit RAU is an open type or a closed type can be made in the top part of the random access unit RAU. For example, it is possible to show the flag information for judging the type, that is, an open type or a closed type, in a nal_ref_idc field of the NAL unit of an SPS. As it is defined that the value of nal_ref_idc is 1 or more in the NAL unit of an SPS, the high-order bit is always set at 1 and flag information is shown by the low-order bit. Note that, an AU in a random access unit RAU may not refer to an AU in a random access unit RAU that is placed earlier in a decoding order even in the case where the top AU is the AU of an I picture that is not an IDR. This type of random access unit RAU may be considered as a closed-type random access unit RAU. Note that flag information may be shown using a field other than nal_ref_idc.

Note that it is possible to specify the start position of a random access unit RAU based on the NAL unit other than an SPS to be stored only in the top AU of a random access unit RAU. Also, it is possible to show the type, that is, the open type or the closed type, of each of the random access unit RAUs using the nal_ref_idc field of each random access unit RAU.

Lastly, FIGS. 20A and 20B show examples of prediction structures of AUs that constitute a random access unit RAU. FIG. 20A shows the positions of AUs in a display order, and FIG. 20B shows the positions of the AUs in the decoding order. As shown in the figures, B1 and B2 that are shown before I3 that is the top AU of a random access unit RAU can refer to AUs to be displayed after I3. In the figure, B1 refers to P6. Here, in order to guarantee that the AUs of I3 and the following pictures in the display order can be correctly decoded, it is prohibited that AUs of I3 and the following pictures in the display order refer to the AUs before I3 in the display order.

(Moving Picture Coding Apparatus)

Figure 4:
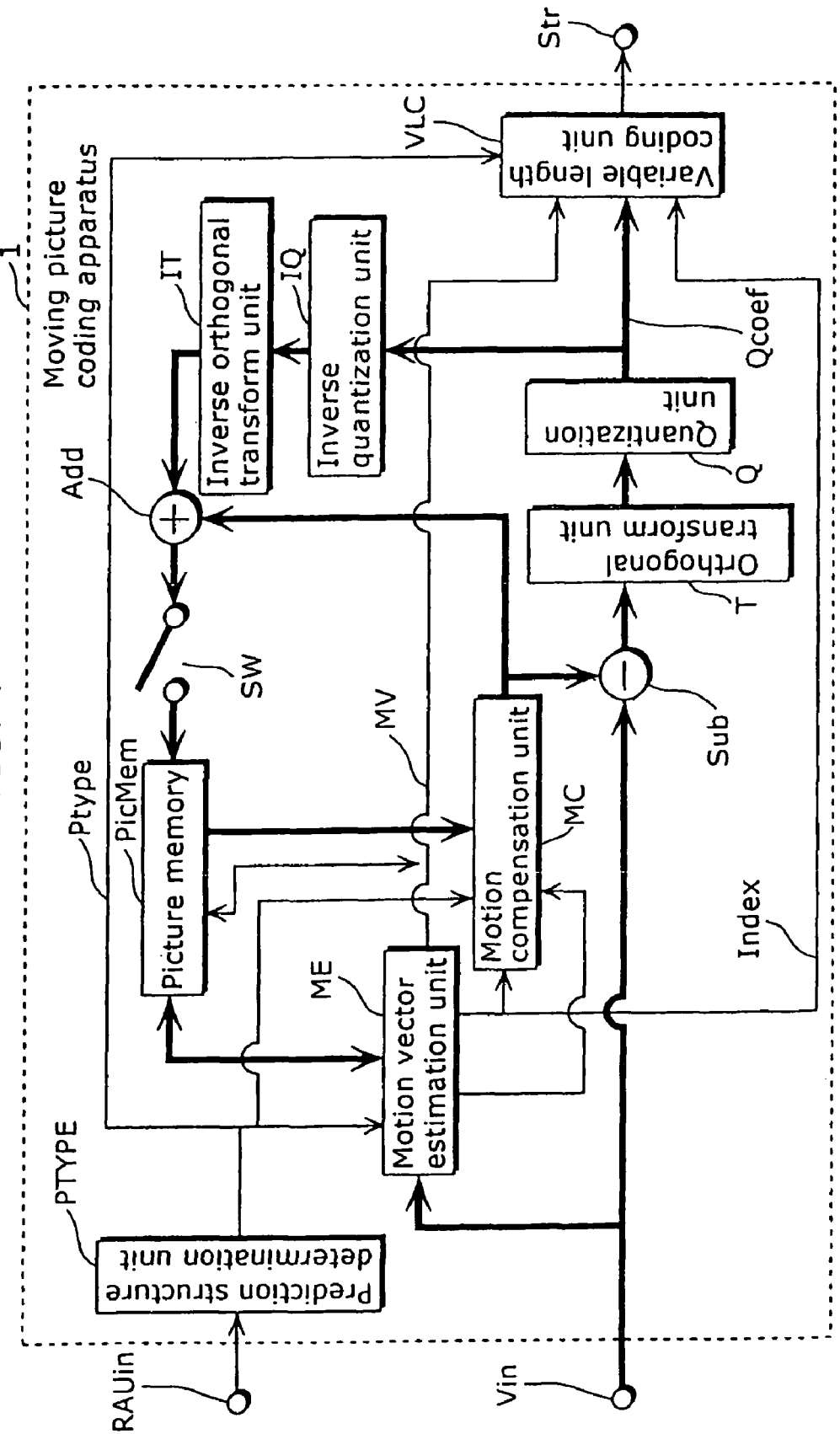
FIG. 4 is a block diagram showing the structure of a conventional coding apparatus.
Figure 21:
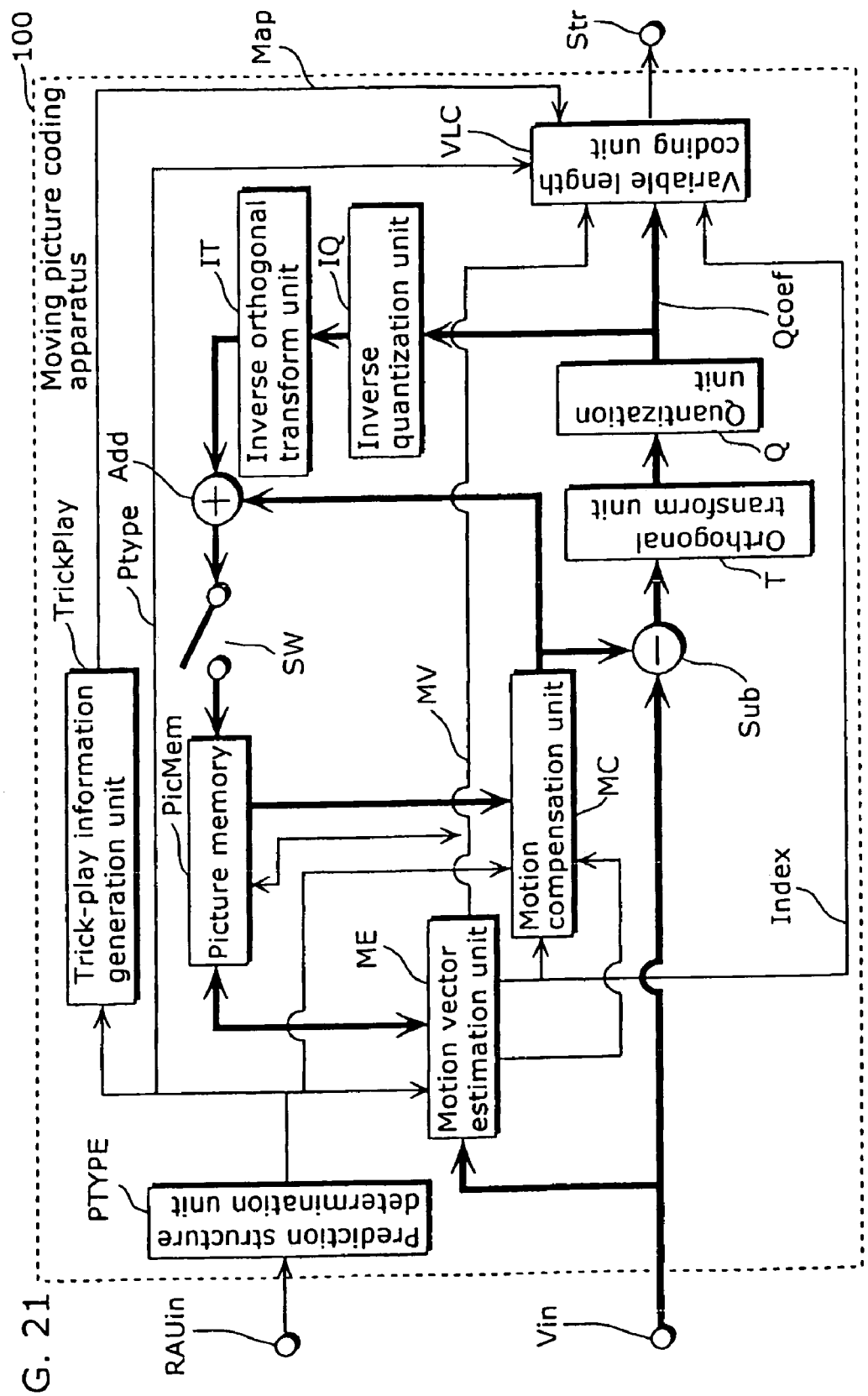
FIG. 21 is a block diagram showing the structure of a moving picture coding apparatus of the present invention.

FIG. 21 is a block diagram of the moving picture coding apparatus 100 that realizes the moving picture coding method of the present invention. This moving picture coding apparatus 100 generates a coded stream, shown in FIG. 8 to FIG. 20, of a moving picture that can be played back using a trick-play such as jump-in playback, variable-speed playback, and reverse playback. The moving picture coding apparatus 100 includes a trick-play information generation unit TrickPlay, in addition to the units of a conventional moving picture coding apparatus 1 shown in FIG. 4. Note that the processing units that perform the same operations as the processing units of a conventional moving picture coding apparatus shown in the block diagram of FIG. 4 are assigned the same reference numbers in the figure, and descriptions of them will be omitted.

The trick-play information generation unit TrickPlay is an example of a unit that generates, on the basis of a random access unit including one or more pictures, supplemental information to be referred to at the time of playing back the random access units. The trick-play information generation unit TrickPlay generates trick-play information based on picture types Ptype, and notifies the trick-play information to the variable length coding unit VLC.

The variable length coding unit VLC is an example of a stream generation unit that generates a stream including supplemental information and pictures by adding the generated supplemental information to each corresponding random access unit. The variable length coding unit VLC codes and places the NAL unit for storing trick-play information in the top AU of a random access unit RAU.

Figure 22:
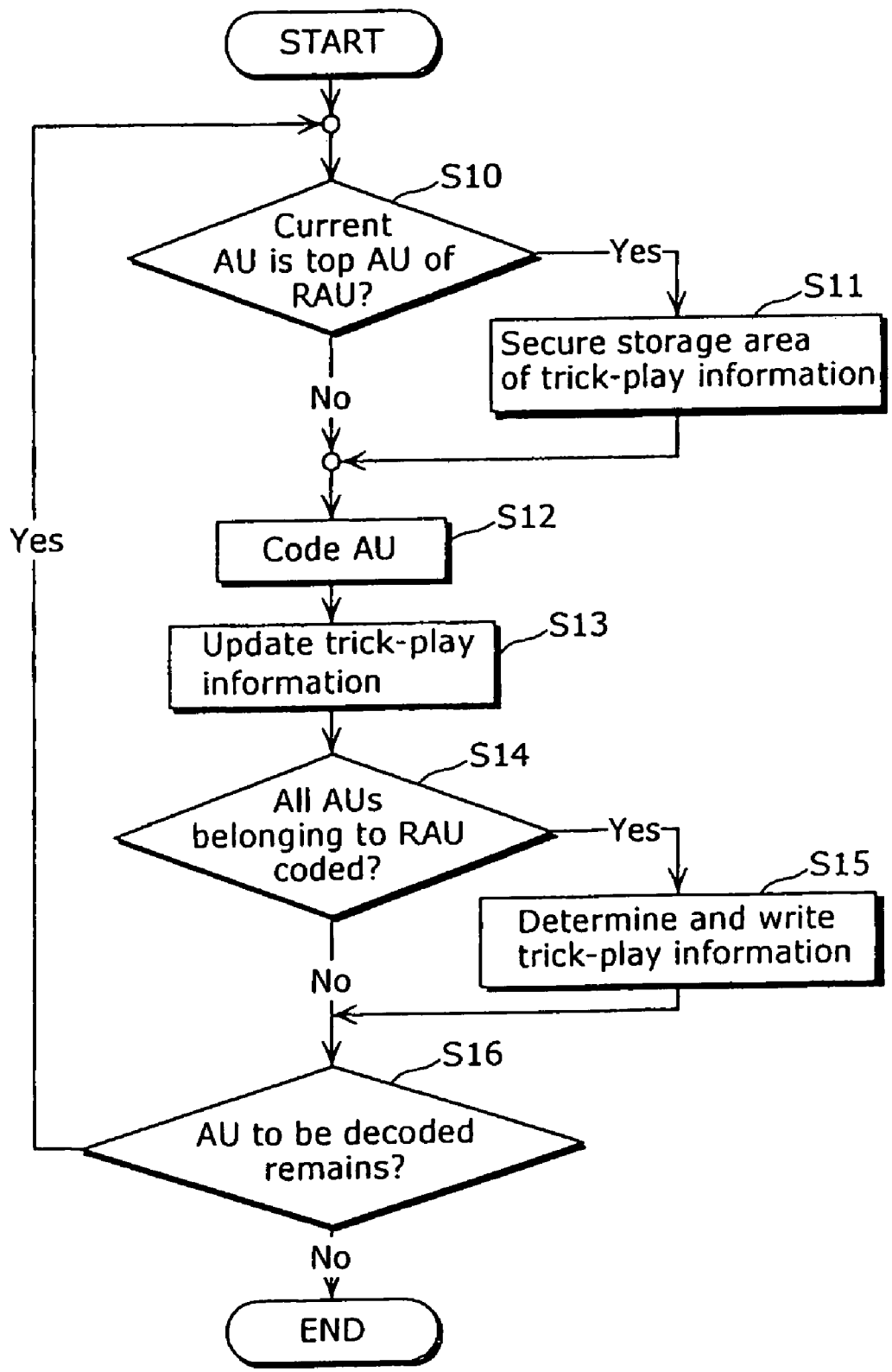
FIG. 22 is a flow chart of a moving picture coding method.

FIG. 22 is a flow chart of how the moving picture coding apparatus 100 (mainly the trick-play information generation unit TrickPlay) shown in FIG. 21 performs the generation procedure of a coded stream including trick-play information, that is, the flow chart of the moving picture coding method of the present invention.

First, in Step 10, the moving picture coding apparatus 100 judges whether or not the AU to be coded is the top AU of a random access unit RAU. In the case where it is the top AU, it goes on to Step 11, while in the case where it is not the top AU, it goes on to Step 12. In Step 11, the moving picture coding apparatus 100 performs the initial processing for generating trick-play information of the random access unit RAU, and also, it secures the area for storing the trick-play information into the top AU of the random access unit RAU. In Step 12, the moving picture coding apparatus 100 codes AU data, and then goes on to Step 13. In Step 13, the moving picture coding apparatus 100 obtains the information needed at the time of generating trick-play information. Such information is: the picture types of the AU, that is, an I picture, a P picture, a reference B picture, or a non-reference B picture; or whether there is a need to decode the AU at the time of performing N times-speed playback. After that, the moving picture coding apparatus 100 goes on to Step 14. In Step 14, the moving picture coding apparatus 100 judges whether the AU is the last AU of the random access unit RAU. In the case where it is the last AU, the moving picture coding apparatus 100 goes on to Step 15, while in the case where it is not the last AU, it goes on to Step 16. In Step 15, the moving picture coding apparatus 100 determines trick-play information, generates the NAL unit for storing the trick-play information, and stores the generated NAL unit into the area secured in Step 11. After completing the processing of Step 15, the moving picture coding apparatus 100 goes on to Step 16. In Step 16, the moving picture coding apparatus 100 judges whether or not there is an AU to be coded next. In the case where there is an AU to be coded, it repeats Step 10 and the following steps, while in the case where there is no AU to be coded, it completes the processing. Here, in the case where the moving picture coding apparatus 100 judges that there is no AUs to be coded in Step 16, it stores trick-play information of the last random access unit RAU, and then it completes the processing.

For example, when the moving picture coding apparatus 100 generates trick-play information shown in FIG. 18A, it obtains the following in Step 13: the picture type; whether the picture has a field structure or the picture has a frame structure; or/and the information indicating whether the display field of the picture is equivalent to two pictures or equivalent to three pictures in the case where the information as to 3-2 pull down is included in the coded stream. In Step 15, the moving picture coding apparatus 100 sets picture_structure and picture_type of all the pictures in the random access unit RAU in a decoding order.

Note that, in the case where the size of the NAL unit for storing trick-play information is not known at the time of starting the coding of the top AU of a random access unit RAU, the processing for securing the area for storing the trick-play information will be omitted in Step 11. In this case, the generated NAL unit for storing trick-play information is inserted into the top AU in Step 15.

Also, storing or not storing the trick-play information may be switched on a coded stream basis. Especially in the case where the prediction structure between AUs that constitute a random access unit is prescribed by application, it is possible to determine that trick-play information is not stored. For example, in the case where a coded stream has the same prediction structure as in the case of an MPEG-2 stream, there is no need to store trick-play information. This is because it is possible to determine AUs need to be decoded at the time of trick-play without trick-play information. Note that such switching may be performed on the basis of a random access unit RAU.

(Moving Picture Multiplexing Apparatus)

Figure 23:
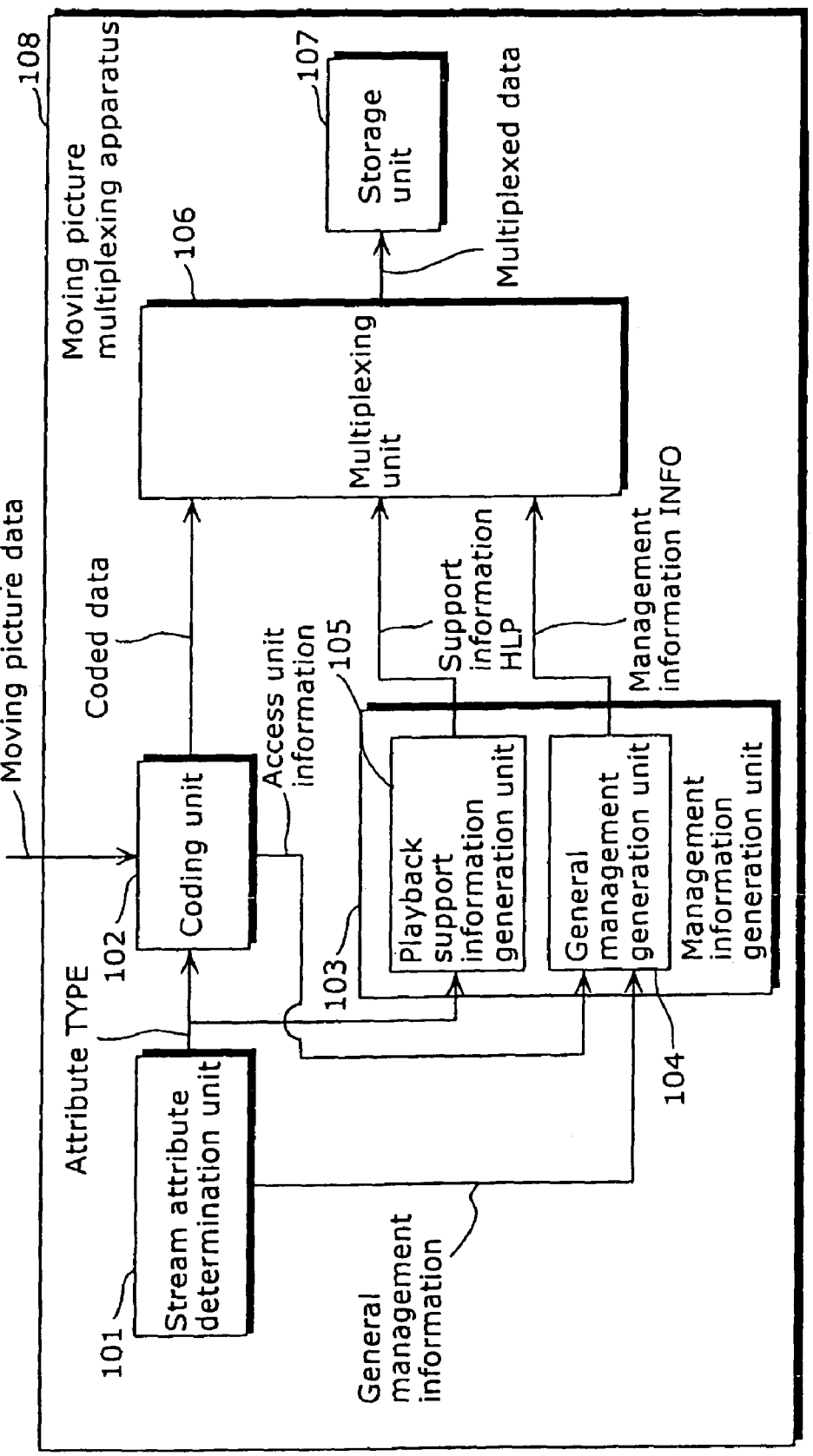
FIG. 23 is a block diagram showing the structure of a moving picture multiplexing apparatus of the present invention.

FIG. 23 is a block diagram showing the structure of the moving picture multiplexing apparatus 108 of the present invention. This moving picture multiplexing apparatus 108 inputs moving picture data, codes the moving picture data to make an MPEG-4 AVC stream, multiplexes the stream with the access information to the AUs that constitute the stream and the management information including the supplemental information for determining the operations performed at the time of trick-play, and records the multiplexed stream. The moving picture multiplexing apparatus 108 includes a stream attribute determination unit 101, a coding unit 102, a management information generation unit 103, a multiplexing unit 106 and a storage unit 107. Here, the coding unit 102 has a function for adding trick-play information in the moving picture coding apparatus 100 shown in FIG. 21.

The stream attribute determination unit 101 determines requirements concerning trick-play performed at the time of coding an MPEG-4 AVC stream, and outputs them to the coding unit 102 and the playback support information generation unit 105 as attribute information TYPE. Here, the requirements concerning trick-play include information indicating: whether or not the requirement for constituting a random access unit is applied to an MPEG-4 AVC stream; whether the information indicating the AUs to be decoded or displayed at the time of variable-speed playback or reverse playback is included in the stream; or whether or not a requirement on the prediction structure between AUs is set. The stream attribute determination unit 101 further outputs, to the general management information generation unit 104, the general management information that is the information needed for generating management information such as a compression format or a resolution. The coding unit 102 codes the inputted video data into the MPEG-4 AVC stream based on the attribute information TYPE, outputs the coded data to the multiplexing unit 106, and outputs the access information in the stream to the general management information generation unit 104. Here, in the case where the attribute information TYPE shows that the information indicating the AUs to be decoded or displayed at the time of variable-speed playback or reverse playback is not included in the stream, trick-play information is not included in the coded stream. Note that the access information indicates the information of an access unit that is the basic unit in accessing the stream, and includes the start address, the display time and the like of the top AU in an access unit. The general management information generation unit 104 generates the table data to be referred to at the time of accessing a stream and the table data storing attribute information such as a compression format based on the access information and the general management information, and outputs the table data to the multiplexing unit 106 as the management information INFO. The playback support information generation unit 105 generates support information HLP indicating whether the stream has a random access structure based on the inputted attribute information TYPE, and outputs the support information HLP to the multiplexing unit 106. The multiplexing unit 106 generates coded data inputted through the coding unit 102, the management information INFO, and the multiplexing data by multiplexing the support information HLP, and then outputs them to the storage unit 107. The storage unit 107 records the multiplexing data inputted through the multiplexing unit 106 in a recording medium such as an optical disc, a hard disc and a memory. Note that the coding unit 102 may packetize the MPEG-4 AVC stream into, for example, an MPEG-2 TSs (transport streams) or an MPEG-2 PSs (program streams), and then outputs the packetized MPEG-2 TSs or PSs. Also, the coding unit 102 may packetize the stream using a format prescribed by application such as a BD.

Note that the contents of the management information need not to depend on whether the trick-play information is stored in the coded stream or not. At this time, support information HLP may be omitted. Also, the moving picture multiplexing apparatus 108 may have the structure without a playback support information generation unit 105.

Figure 24A:
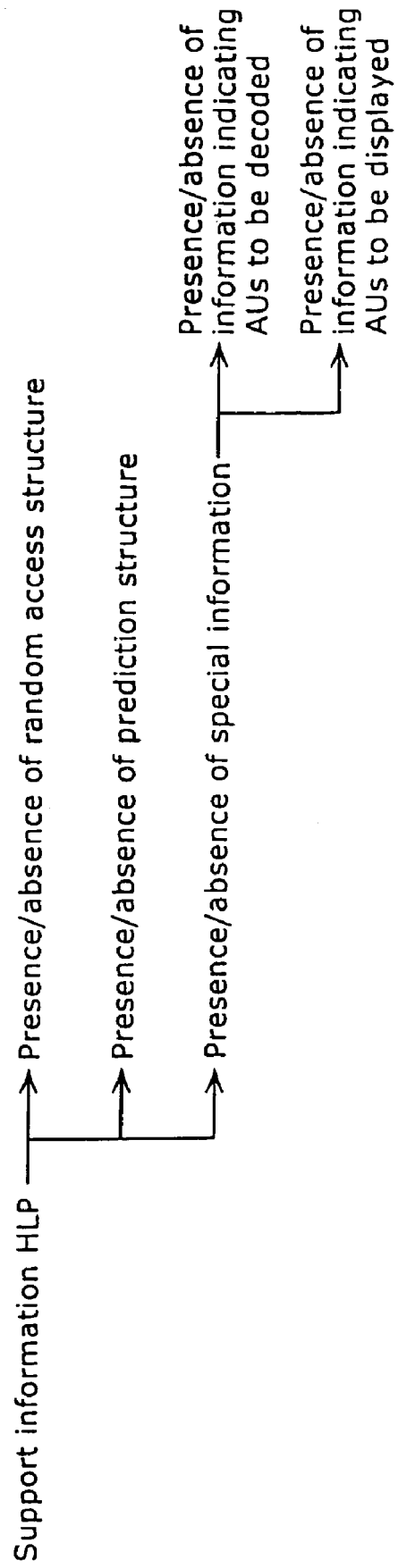
FIG. 24A and FIG. 24B are diagrams showing example contents of support information HLP.
Figure 24B:
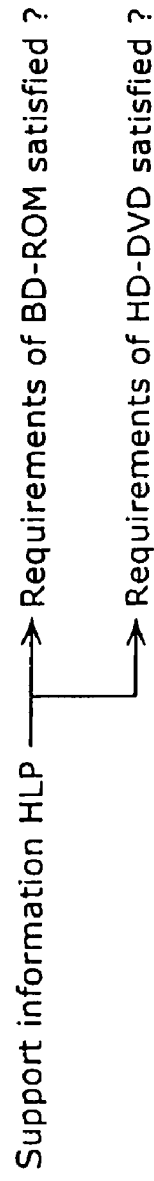

FIGS. 24A and 24B show examples of the information shown by the support information HLP. The support information HLP includes the method directly indicating the information of a stream as shown in FIG. 24A, and the method indicating whether the stream satisfies the requirement prescribed by a specific application standard, as shown in FIG. 24B.

FIG. 24A shows the following as information concerning a stream: information as to whether the stream has a random access structure; information as to whether there is a requirement on the prediction structure between pictures stored in an AU; and information as to whether there is information indicating the AUs to be decoded or displayed at the time of trick-play.

Here, the information concerning the AUs to be decoded or displayed at the time of trick-play may directly indicate AUs to be decoded or displayed or indicate the priorities at the time of decoding or display. For example, it can be indicated that the information indicating that AUs to be decoded or displayed on an random access unit basis is stored in a NAL unit having a special NAL unit type prescribed by application, a SEI message or the like. Note that it is possible to indicate whether there is information indicating the prediction structure between AUs that constitute a random access unit. Also, the information concerning AUs to be decoded or displayed at the time of trick-play may be added on the basis of one or more random access units or to each of the AUs that constitutes the random access unit.

Figure 25:
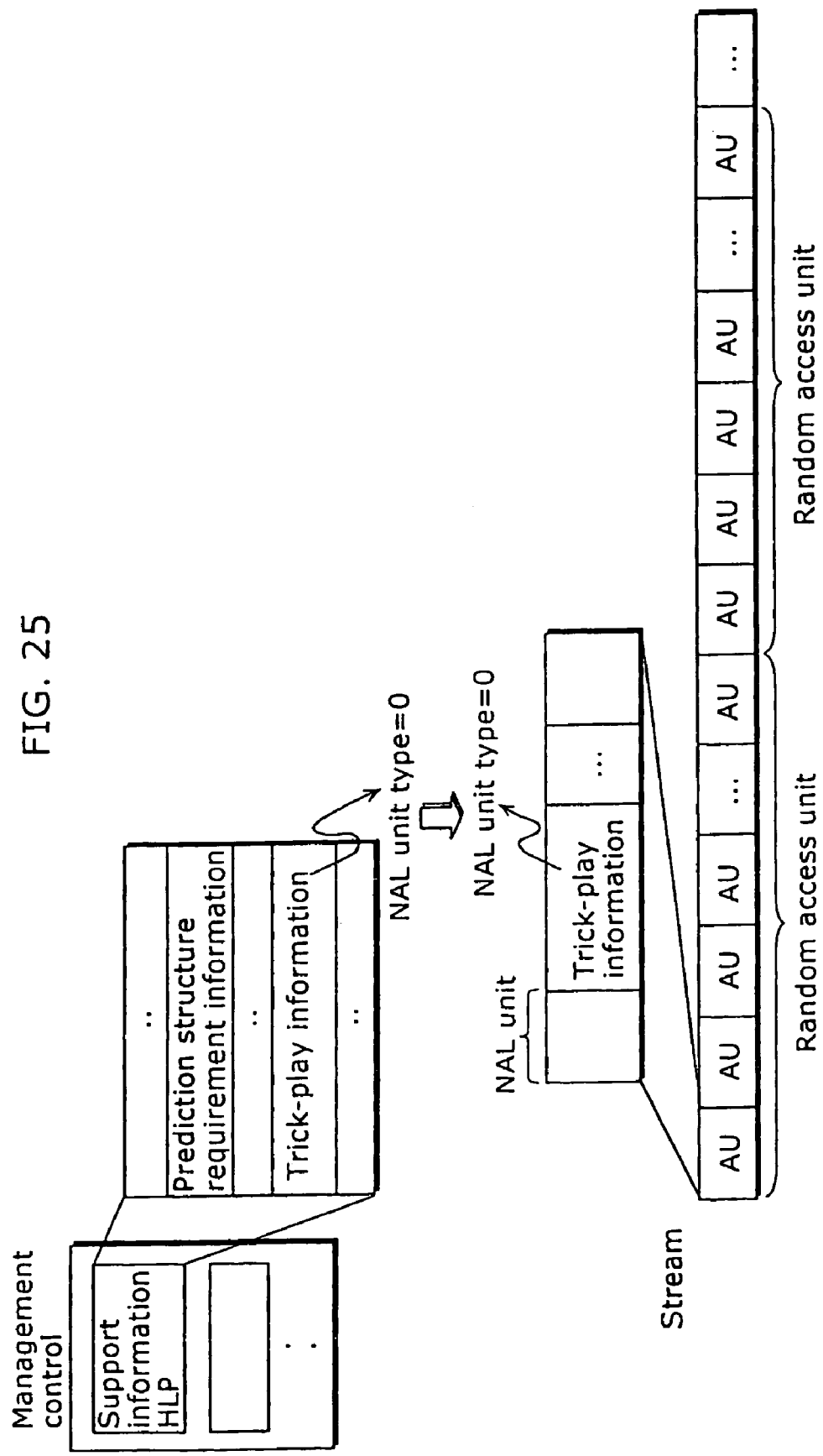
FIG. 25 is a diagram showing an example of a NAL unit in which trick-play information is stored in the support information HLP.

Further, in the case where the information indicating the AUs to be decoded or displayed is stored into the NAL unit having a special type, it is possible to show the NAL unit type of the NAL unit. In the example of FIG. 25, in the support information HLP, the information concerning the AUs to be decoded or displayed at the time of trick-play is included in the NAL unit whose NAL unit type is 0. At this time, it is possible to obtain the information concerning the trick-play by demultiplexing the NAL unit whose NAL unit type is 0 from the AU data of the stream. In the case where the information concerning trick-play is stored using a SEI message, it is possible to indicate the information for identifying the SEI message.

Also, as to requirements on the prediction structures, it is possible to indicate whether one or more predetermined requirements are satisfied, or it is possible to indicate the following respective requirements are satisfied independently:

(i) As to the AUs of an I picture and P pictures, the decoding order should match the display order;

(ii) the AU of a P picture cannot not refer to the AU of a B picture;

(iii) the AUs after the top AU in a display order in a random access unit can refer only the AUs included in the random access unit; and (iv) Each AU can refer to only AUs placed up to N numbers before and after in the decoding order. In this case, all AUs are counted altogether or AUs are counted on a reference AU basis, and the value of N may be shown in the support information HLP.

Note that, in the MPEG-4 AVC, it is possible to use, as reference pictures, pictures on which filtering processing (deblocking) for removing block distortion is performed after decoding in order to improve picture quality, and it is possible to use, as pictures for display, pictures before the deblocking. In this case, the moving picture decoding apparatus needs to hold the picture data before and after the deblocking. Therefore, it is possible to store, into the support information HLP, the information indicating whether there is a need to hold the pictures before the deblocking for the use of display. The MPEG-4 AVC standard defines the maximum size of a buffer (DPB: Decoded Picture Buffer) needed for storing the reference pictures or the pictures to be displayed as the decoding results. Therefore, with a DPB buffer having the maximum size or a buffer having the maximum size prescribed by application, it is possible to indicate whether decoding processing can be performed without failure even in the case of storing the pictures for display of the reference pictures. Note that, in order to store the pictures before the deblocking of the reference pictures, it is possible to indicate the buffer size needs to be secured, in addition to the size needed as a DPB, using the number of bytes or the number of frames. Here, whether deblocking is performed on each picture or not can be obtained from the information in the stream or the information outside the stream such as management information. In the case of obtaining the information in the stream, for example, it can be obtained from a SEI. Further, in the case of decoding an MPEG-4 AVC stream, it is possible to judge whether the pictures before deblocking of the reference pictures can be used for display or not may be judged based on the buffer size that can be used in the decoding unit and the above-described information, and then it is possible to determine how to display the pictures.

Note that all the information or a part of the information may be included as support information HLP. Also, it is possible to include necessary information based on a predetermined condition, for example, to include information as to the presence or absence of trick-play information only in the case where there is no requirement concerning the prediction structure. Also, the information other than the above-described information may be included in the support information HLP.

FIG. 24B does not directly indicate the information concerning the structure of a stream, but indicate whether a stream satisfies the requirements on the stream structures prescribed by the Blu-ray Disc (BD-ROM) standard or the High Definition (HD) DVD standard that is the standard for storing high-definition pictures in a DVD. Also, in the case where plural modes are defined as the requirements of a stream in an application standard such as the BD-ROM standard or the like, the information indicating the applied mode may be stored. For example, the following modes are used: mode 1 indicating that there is no requirement; mode 2 indicating that the stream has a random access structure and includes the information for specifying AUs to be decoded at the time of trick-play; and the like. Note that it is possible to indicate whether the stream satisfies the requirements prescribed in the communication service such as download or streaming, or a broadcasting standard.

Note that it is possible to indicate both the information shown in FIG. 24A and the information shown in FIG. 24B. Also, in the case where it is known that the stream satisfies the requirements in a specific application standard, it is possible to store the requirements in the application standard by converting the stream structure into the format for direct description as shown in FIG. 24A, instead of indicating whether the stream satisfies the application standard.

Note that it is possible to store the information indicating the AUs to be decoded or displayed at the time of trick-play as management information. Also, in the case where the contents of the support information HLP is switched in a stream, support information HLP may be indicated on a section-by-section basis.

Figure 26:
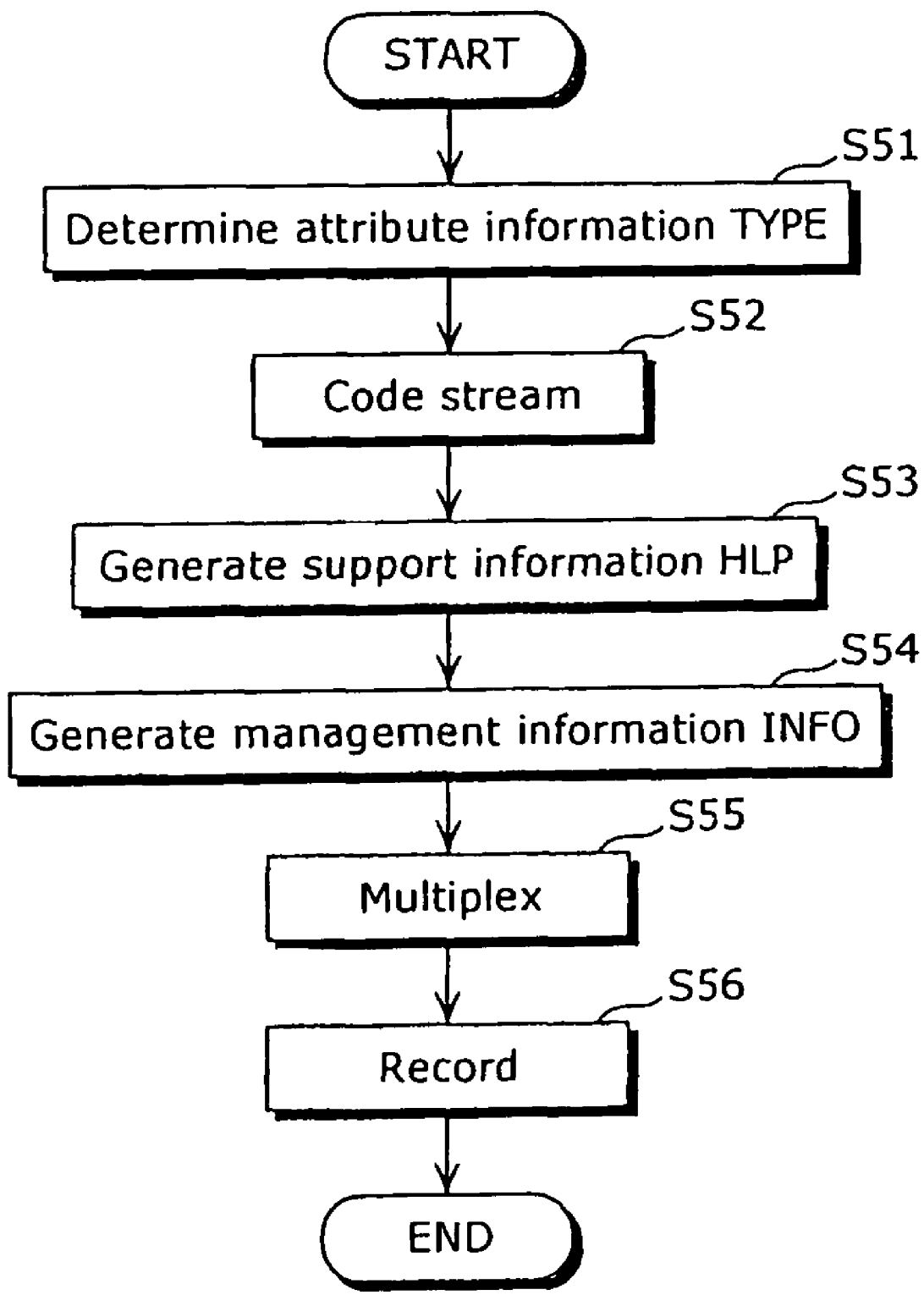
FIG. 26 is a flow chart showing the operation of a moving picture multiplexing apparatus.

FIG. 26 is a flow chart showing the operations of the moving picture multiplexing apparatus 108. In Step 51, the stream attribute determination unit 101 determines the attribute information TYPE based on the user settings or predetermined conditions. In Step 52, the coding unit 102 codes a stream based on the attribute information TYPE. In Step 53, the playback support information generation unit 105 generates the support information HLP based on the attribute information TYPE. Consequently, in Step 54, the coding unit 102 generates the access information on the basis of an access unit of the coded stream, and the general management information generation unit 104 generates the management information INFO by adding the access information to the other necessary information (general management information). In Step 55, the multiplexing unit 106 multiplexes a stream, the support information HLP and the management information INFO. In Step 56, the storage unit 107 records the multiplexed data. Note that Step 53 may be performed before Step 52, or after Step 54.

Note that the coding unit 102 may store the information shown in the support information HLP into a stream. In this case, the information shown in the support information HLP is stored into the NAL unit for storing trick-play. For example, in the case where P pictures do not refer to B pictures, it is possible to decode only an I picture and P pictures at the time of variable-speed playback. Therefore, flag information indicating whether only an I picture and P pictures can be decoded and displayed is stored. Also, there is a case where some AUs to be decoded at the time of variable-speed playback cannot obtain an SPS or a PPS from the AUs that should be referred to by the respective AUs. It is the case where the PPS referred to by a P picture is stored only in the AU of a B picture in the case of decoding only an I picture and P pictures. In this case, there is a need to obtain the PPS needed for decoding the P picture from the AU of a B picture. Therefore, it is possible to include flag information indicating whether the SPS or the PPS referred to by each AU to be decoded at the time of variable-speed playback can be surely obtained from one of the other AUs to be decoded at the time of variable-speed playback. Doing this makes it possible to perform the operation such as detecting an SPS or a PPS also from the AU of a picture not to be decoded at the time of variable-speed playback only in the case where a flag is not set. Also, at the time when it is shown that only an I picture and P pictures can be decoded and displayed, it is possible to adjust the playback speed by decoding also B pictures, especially reference B pictures that are referred to by other pictures.

Also, it is possible to store the flag information into the header of another NAL unit such as an SPS, a PPS or a slice, instead of using any NAL unit for storing trick-play. For example, in the case where an SPS referred to by an AU that constitutes a random access unit RAU is stored into the top AU in the random access unit RAU, the nal_ref_idc field of the NAL unit of an SPS can indicate the flag information. As it is defined that the value of nal_ref_idc is 1 or more in the NAL unit of an SPS, it is possible to always set the high-order bit at 1 and to indicate flag information by the low-order bit.

Note that, contents of the support information HLP may be stored into either a stream or management information, or both of them. For example, the contents may be shown in management information in the case where the contents of the support information HLP is fixed in a stream, while the contents may be shown in a stream in the case where the contents is variable. Also, it is possible to store the flag information indicating whether the support information HLP is fixed or not in management information. Also, in the case where support information HLP is predetermined in an application standard such as a BD-ROM or a RAM, or in the case where support information HLP is separately provided by communication or broadcasting, support information HLP may not be stored.

(Moving Picture Decoding Apparatus)

Figure 5:
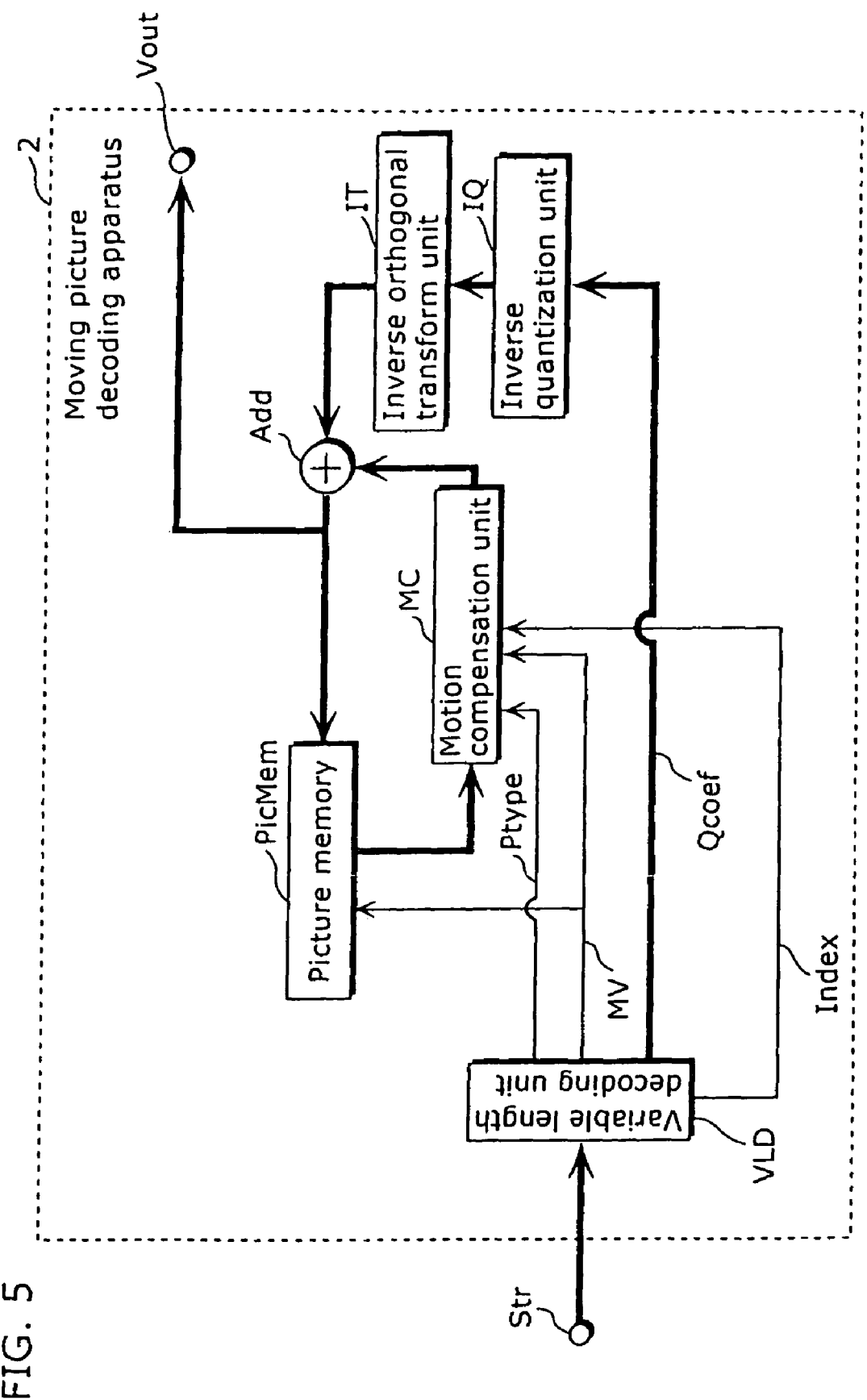
FIG. 5 is a block diagram showing the structure of a conventional decoding apparatus.
Figure 7:
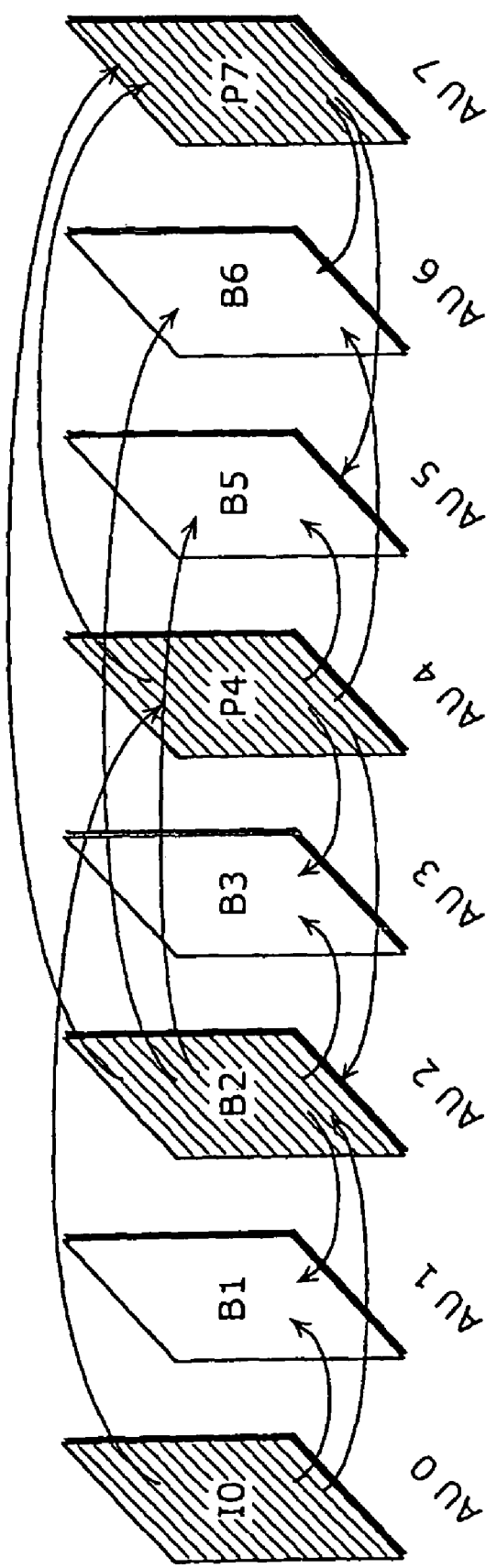
FIG. 7 is a diagram showing another example of the prediction structure in a conventional MPEG-4 AVC stream.
Figure 9A:
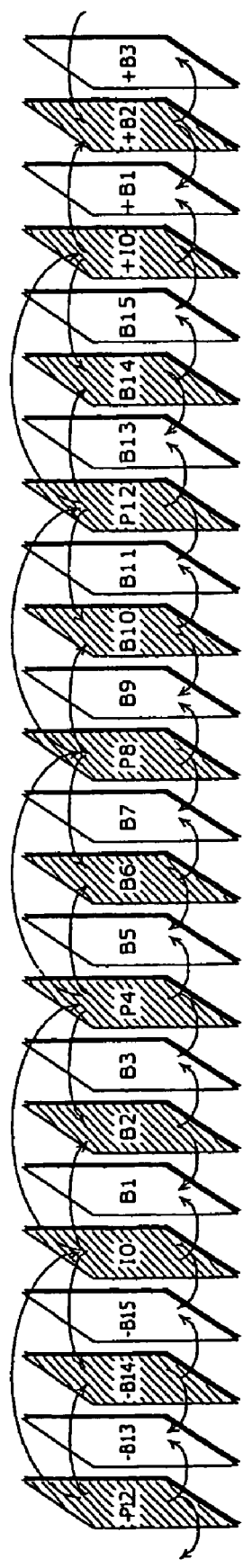
FIGS. 9A to 9D are diagrams of a first example showing AUs to be decoded in a random access unit RAU.
Figure 9B:
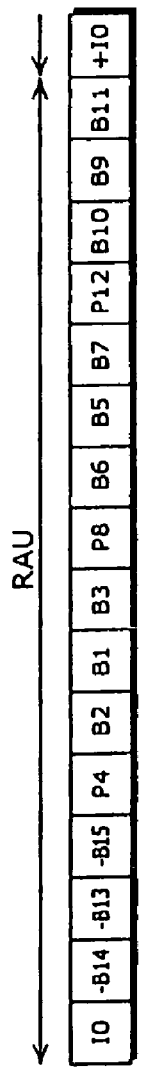
Figure 9C:
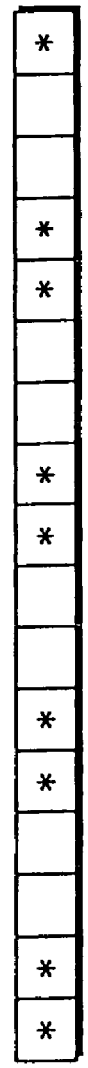
Figure 9D:
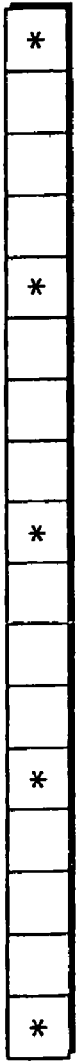
Figure 27:
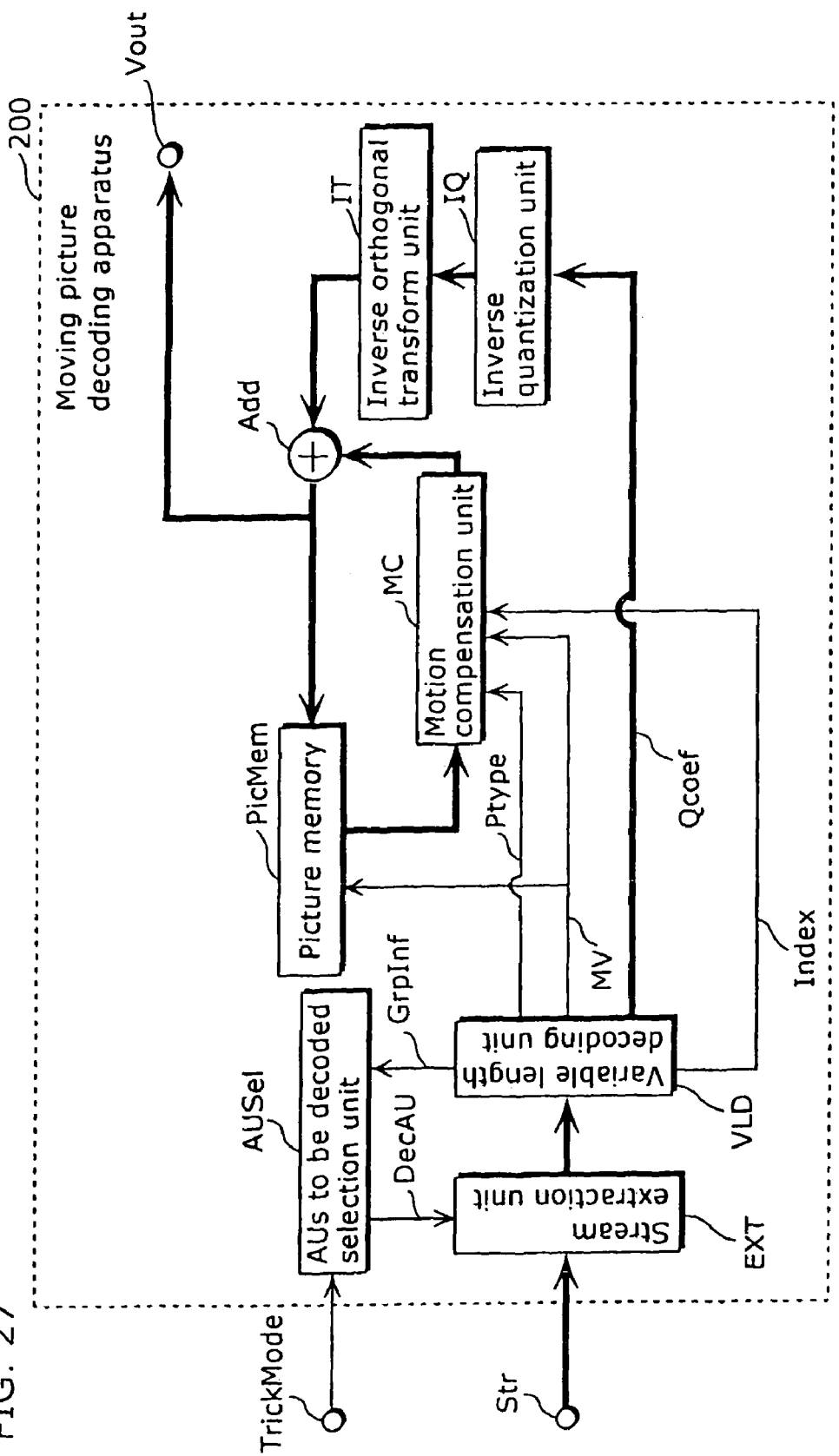
FIG. 27 is a block diagram showing the structure of a moving picture decoding apparatus of the present invention.

FIG. 27 is a block diagram of the moving picture decoding apparatus 200 that realizes the moving picture decoding method of the present invention. This moving picture decoding apparatus 200 plays back a coded stream shown in FIGS. 8A and 8B to FIG. 20. It can perform riot only normal playback but also trick-play such as jump-in playback, variable-speed playback and reverse playback. The moving picture decoding apparatus 200 further includes a stream extraction unit EXT and an AUs to be decoded selection unit AUsel, in addition to the units of a conventional decoding apparatus 2 shown in FIG. 5. Note that the processing units that perform the same operations as the respective processing units of the conventional decoding apparatus 2 shown in the block diagram of FIG. 5 are assigned the same reference numbers and the descriptions of them will be omitted.

The AUs to be decoded selection unit AUsel determines the AUs need to be decoded based on the trick-play information GrpInf decoded in the variable length decoding unit VLD, according to a trick-play instruction inputted from outside. Here, trick-play instruction indicating trick-play is inputted from the AUs to be decoded selection unit AUSel. Further, the AUs to be decoded selection unit AUsel notifies the stream extraction unit EXT of DecAU that is the information indicating the AUs determined as the AUs need to be decoded. The stream extraction unit EXT extracts only the stream corresponding to the AUs that are judged as the AUs need to be decoded by the AUs to be decoded selection unit AUsel, and then transmits the stream to the variable length decoding unit VLD.

Figure 28:
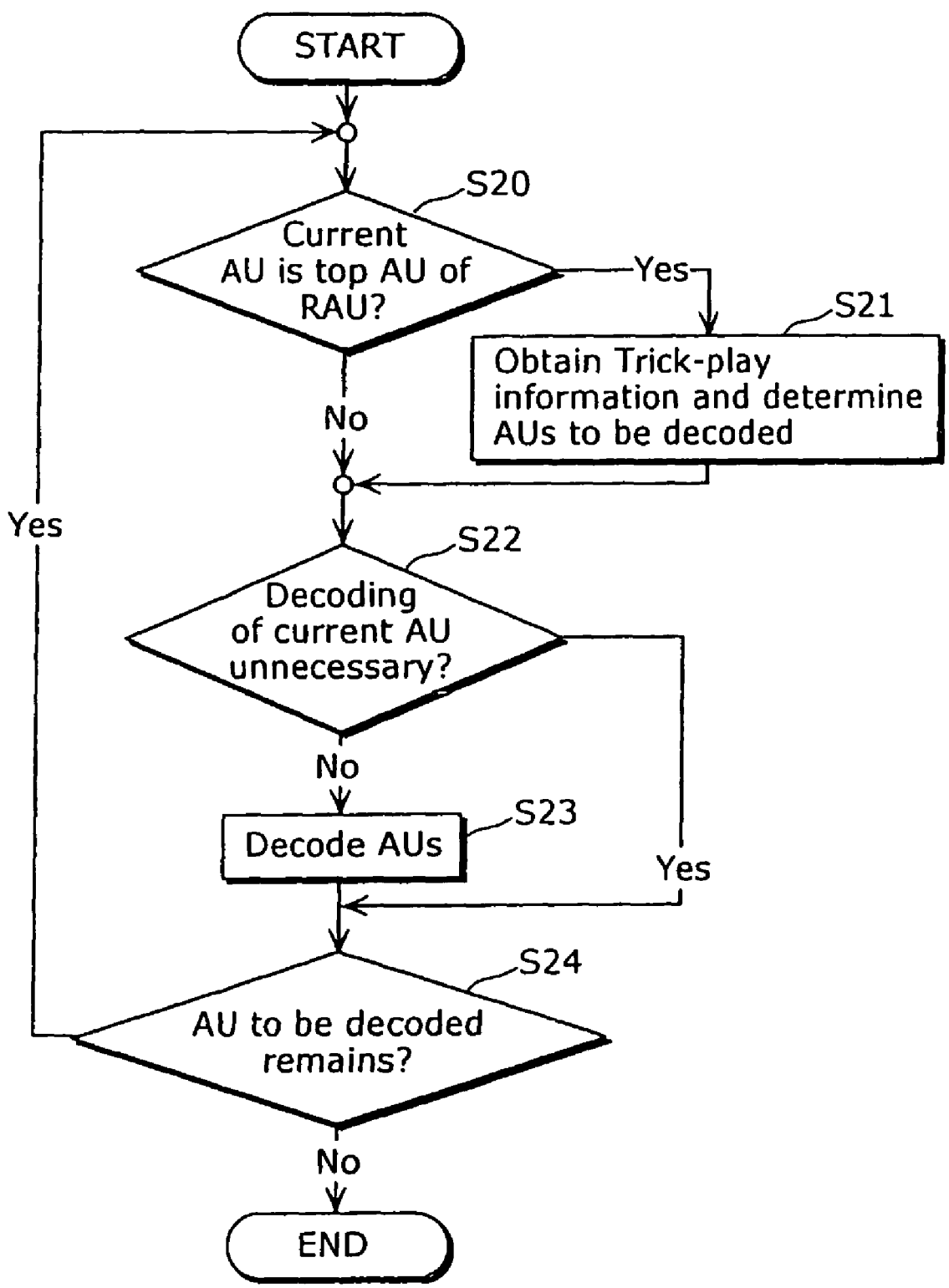
FIG. 28 is a flow chart of a conventional picture decoding method.

FIG. 28 is a flow chart of how the moving picture decoding apparatus 200 (mainly the AUs to be decoded selection unit-AUsel) shown in FIG. 27 performs the decoding procedure of a stream including trick-play information at the time of performing trick-play, that is, the flow chart of the moving picture decoding method of the present invention.

First, in Step 20, the AUs to be decoded selection unit AUsel judges whether the AU is the top AU of a random access unit RAU by detecting an SPS or the like in the stream. In the case where the AU is the top AU, it goes on to Step 21, while in the case where the AU is not the top AU, it goes onto Step 22. Here, the start position of the random access unit RAU may be obtained from the management information such as a time map. Especially in the case where the playback start position at the time of jump-in playback is determined, or only the top picture of the random access unit RAU is selected and high-speed playback is performed on the selected top picture, it is possible to determine the start position of the random access unit RAU referring to the time map. In Step 21, the AUs to be decoded selection unit AUsel obtains the trick-play information from the AU data, analyzes the AU data and determines the AUs to be decoded before going onto Step 22. In Step 22, the AUs to be decoded selection unit AUsel judges whether the AU is the AU that is determined in Step 21 as the AU to be decoded. In the case where it is the determined AU, the moving picture decoding apparatus 200 decodes the AU in Step 23, while in the case where it is not the determined AU, it goes on to Step 24. In Step 24, the moving picture decoding apparatus 200 judges whether there remains any AU to be decoded. In the case where there is an AU, the moving picture decoding apparatus 200 repeats the processing of Step 20 and the following steps, while in the case where there is no AU, it completes the processing. Note that it is possible to omit the processing of Step 21 and Step 22, or omit the determination processing in Step 21, and to output the information indicating that all the AUs are decoded at the time of normal playback where all the AUs are decoded and displayed in order.

Figure 29:
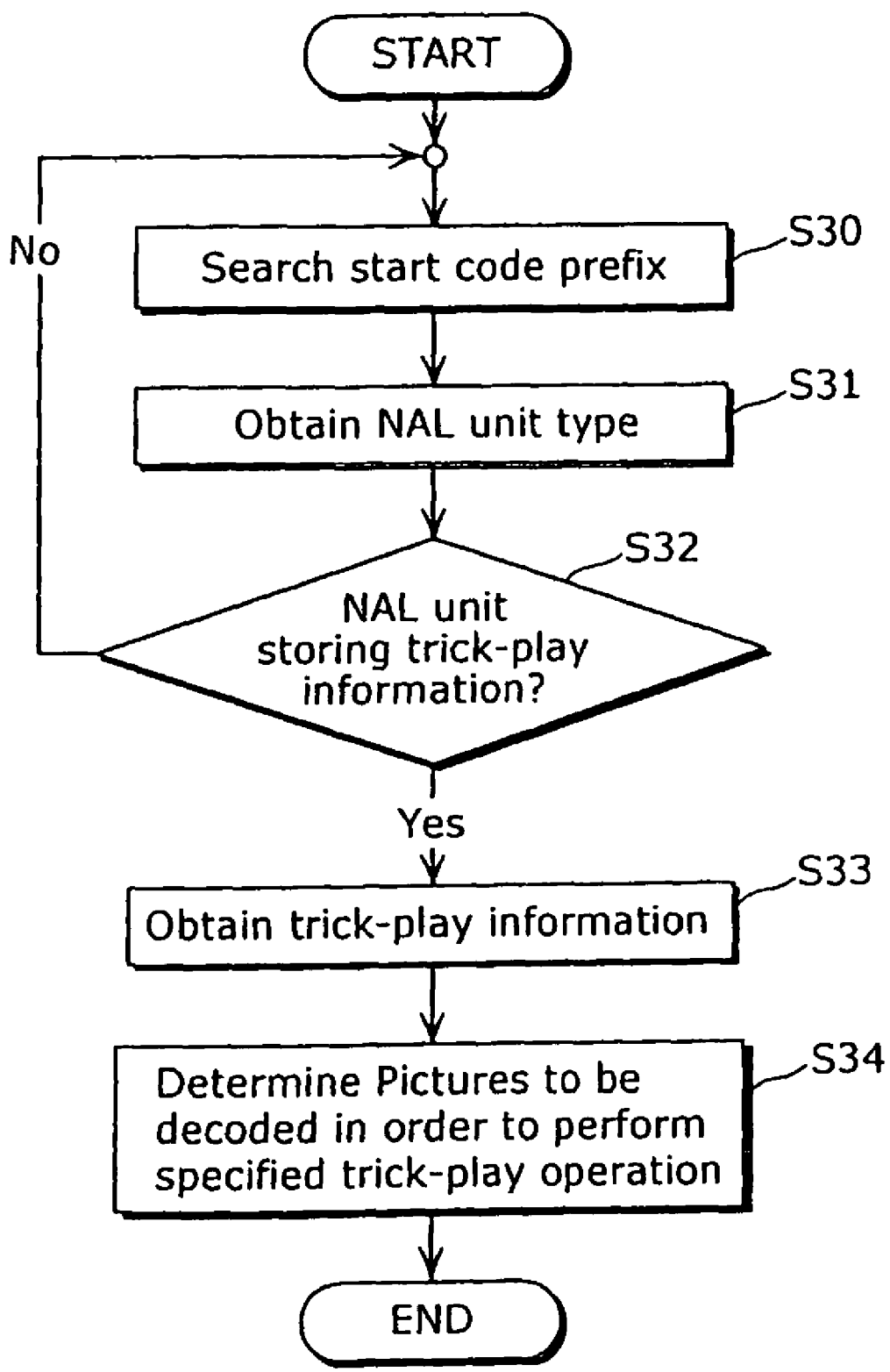
FIG. 29 is a flow chart of determining AUs to be decoded in the moving picture decoding method of the present invention.

FIG. 29 is a flow chart indicating the processing (the processing by the AUs to be decoded selection unit AUSel) in Step 21. First, the AUs to be decoded selection unit AUSel detects the start position of a NAL unit that constitutes an AU by searching the AU data for a start code prefix, starting with the top byte in Step 30, and goes on to Step 31. Note that it may search a start code prefix starting with not the top byte of the AU data but another position such as the end position of an Access Unit Delimiter. In Step 31, the AUs to be decoded selection unit AUSel obtains the NAL unit type of a NAL unit, and goes on to Step 32. In Step 32, the AUs to be decoded selection unit AUSel judges whether the NAL unit type obtained in Step 31 is the NAL unit type for storing trick-play information. In the case where trick-play information is stored, it goes on to Step 33, while in the case where trick-play information is not stored, it repeats the processing of Step 30 and the following steps. Here, in the case where trick-play information is stored in a SEI message, the AUs to be decoded selection unit AUSel obtains the NAL unit of a SEI first, and further, it judges whether the SEI message for storing the trick-play information is included in the NAL unit or not. In Step 33, the AUs to be decoded selection unit AUSel obtains trick-play information, and it goes on to Step 34. In Step 34, the AUs to be decoded selection unit AUSel determines the pictures need to be decoded at the time of performing a specified trick-play operation. For example, provided that double-speed playback is specified. In the case where trick-play information indicates that it is possible to realize double-speed playback by decoding and playing back only an I picture, P pictures and reference B pictures, it is determined that these three types of pictures are decoded and played back. Note that, in the case where trick-play information is not detected in the top picture of the random access unit RAU in the processing from Step 30 to Step 32, the pictures need to be decoded in order to perform the specified trick-play operation are determined according to a predetermined method. As an example, it is possible to judge whether the picture is a reference picture or not by referring to the field indicating the picture type of a picture in an Access Unit Delimiter, or by checking nal_ref_idc of the header of the NAL unit. For example, it is possible to distinguish reference B pictures from non-reference B pictures by referring to both of the field indicating the picture types and nal_ref_idc.

Figure 30:
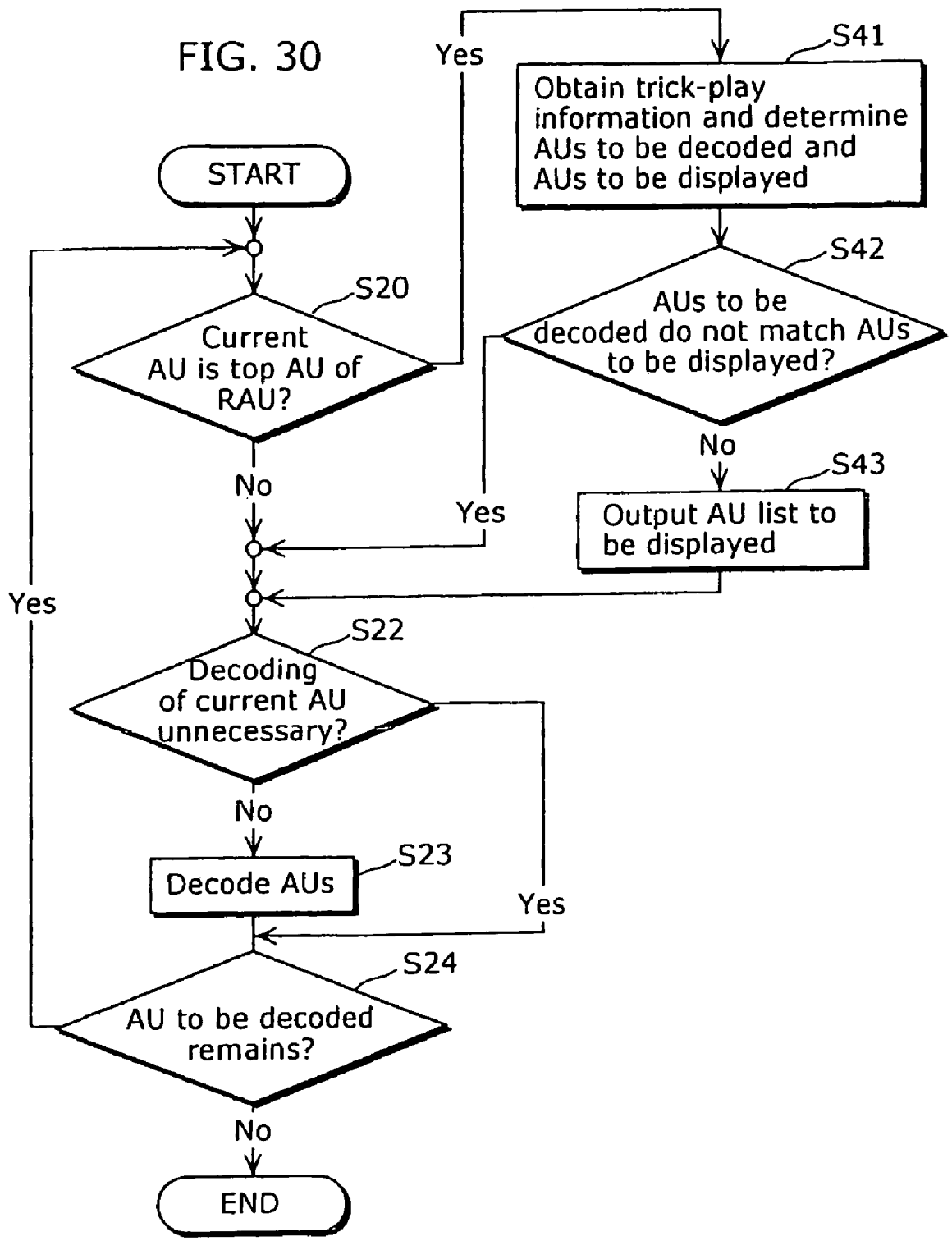
FIG. 30 is a flow chart showing the processing performed in the case where AUs to be decoded does not match AUs to be displayed in the moving picture decoding method of the present invention.

FIG. 30 is a flow chart indicating the processing (the processing by the AUs to be decoded selection unit AUSel) in the case where all the AUs to be decoded are not always displayed. Steps for performing the same processing as the steps in the flow chart of FIG. 28 are assigned the same reference numbers, and the descriptions of them will be omitted. In Step 41, the AUs to be decoded selection unit AUSel obtains and analyzes trick-play information, determines the AUs to be decoded and the AUs to be displayed in a specified trick-play operation, and it goes on to Step 42. In Step 42, the AUs to be decoded selection unit AUSel judges whether the AUs to be decoded completely match the AUs to be displayed. In the case where there is a complete match, it goes on to Step 22, while in the case where there is no complete match, it goes on to Step 43. In Step 43, the AUs to be decoded selection unit AUSel outputs list information of AUs to be displayed, and it goes on to Step 22. The list information of the outputted AUs is used in a step (not shown in a figure) for determining AUs to be displayed from among the decoded AUs.

Note that, in the MPEG-4 AVC, it is possible to use, as reference pictures, pictures on which filtering processing (deblocking) for removing block distortion is performed after decoding in order to improve picture quality, and it is possible to use, as pictures for display, pictures before the deblocking. In this case, the moving picture decoding apparatus 200 needs to hold the picture data before and after the deblocking. Here, on condition that the moving picture decoding apparatus 200 has a memory that can store after-decoding data equivalent to four pictures, in the case where it stores the picture data before and after deblocking into the memory, the memory needs to store data equivalent to two pictures in order to hold pictures before deblocking of the reference pictures. However, as described above, it is desirable that as many as pictures can be held in a memory at the time of reverse playback. On condition that the moving picture decoding apparatus 200 uses the pictures after deblocking also for the use of display, it can hold data of four pictures in a memory because there is no need to store pictures before deblocking. Therefore, displaying pictures before deblocking in order to improve picture quality at the time of playback in a normal direction and displaying pictures after deblocking at the time of reverse playback makes it possible to hold more pictures in a memory, and reduce the processing amount at the time of reverse playback. For example, in the example of FIGS. 15A to 15C that show a list of AUs of an I picture and P pictures as trick-play information, all the data of four pictures can be held in a memory at the time of reverse playback, while the following sets of two pictures, which are arbitrary selected from among I0, P3, P6 and P9, can be held in the memory at the same time at the time of playback in a normal direction: I0 and P3; P3 and P6; and P6 and P9.

(Example of a Recording Format of Trick-Play in an Optical Disc)

A trick-play function is especially important in an optical disc apparatus that plays back a package media. Here, an example of recording trick-play information described above into a Blu-ray Disc (BD) that is a next generation optical disc will be described.

First, a recording format of a BD-ROM will be described.

Figure 31:
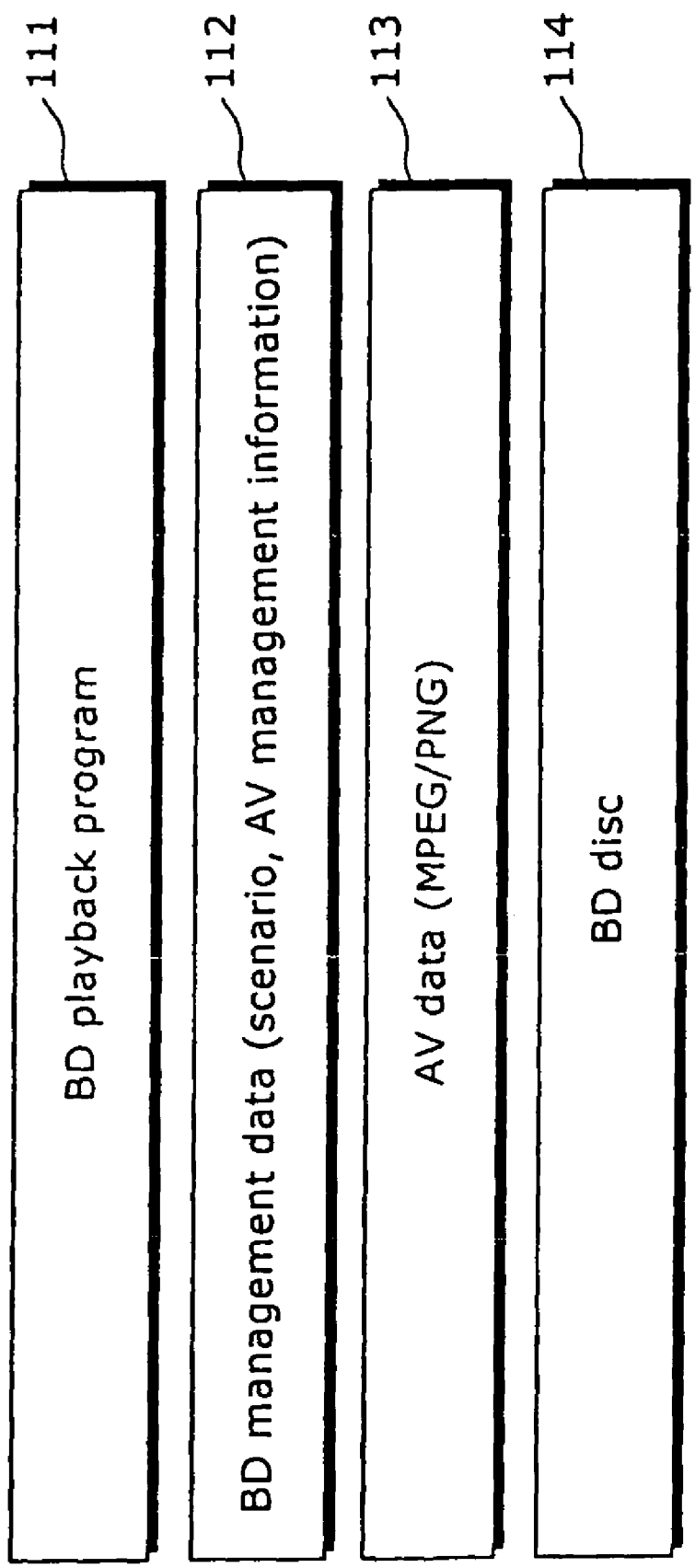
FIG. 31 is a diagram showing data hierarchy of an HD-DVD.

FIG. 31 is a diagram indicating the structure of the BD-ROM, especially the structures of a BD disc 114 that is a disc medium, and data 111, 112 and 113 stored in the disc. The data stored in the BD disc 114 includes AV data 113, BD management information 112 such as management information concerning the AV data and an AV playback sequence, and a BD playback program 111 that realizes interactivity. Here, as a matter of convenience, the description of the BD disc will be made focusing on the AV application for playing back audio and visual contents of movies, but similar description can be made focusing on another use.

Figure 32:
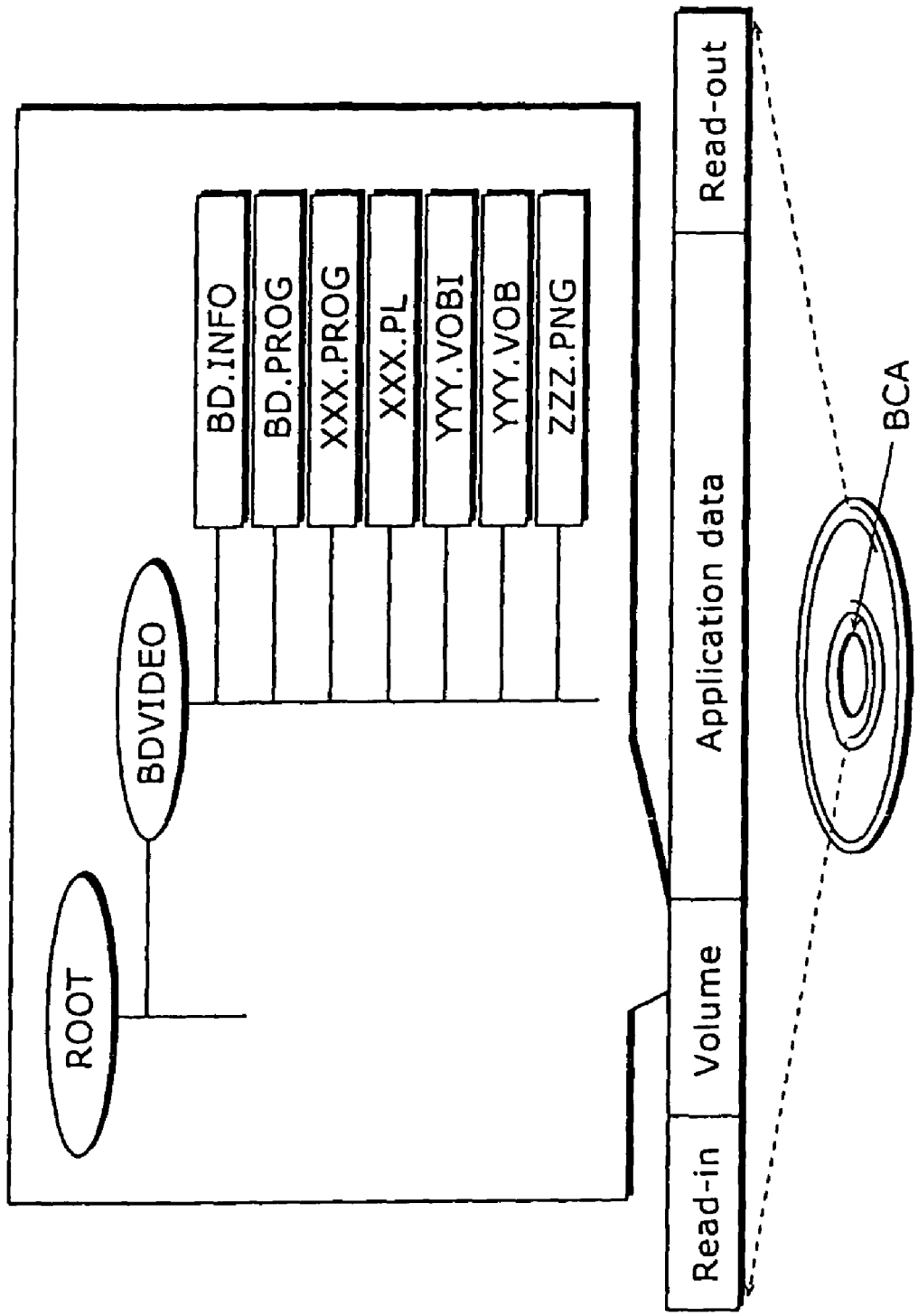
FIG. 32 is a structural diagram of logical space on an HD-DVD.

FIG. 32 is a diagram showing the structure of a directory file of logical data stored in the above-described BD disc. A BD disc has a recording area from its inner radius to its outer radius like, for example, a DVD, a CD and the like, and has logical address space for storing logical data between the read-in at the inner radius and the read-out at the outer radius. Also, inside the read-in, there is a special area that can be read out only by a drive called a Burst Cutting Area (BCA). As this area cannot be read out from application, it may be used for, for example, copy right protection technique.

File system information (volume) is stored in the top of the logical address space, and application data such as video data is also stored there. As described in the background art, a file system is, for example, the UDF or the ISO9660, and it enables reading out the logical data stored using a directory structure or a file structure like in the case of a normal PC.

In this embodiment, as the directory structure and the file structure on the BD disc, the BDVIDEO directory is placed immediately below a route directory (ROOT). This directory is a directory storing data such as AV contents or management information (101, 102 and 103 that are described in FIG. 32) that is handled in the BD.

Below the BDVIDEO directory, the following seven files are recorded.

(i) BD. INFO (the file name is fixed) which is one piece of "BD management information" and is a file storing the information concerning the whole BD disc. The BD player reads out this file first.

(ii) BD. PROG (the file name is fixed) which is one of "BD playback programs" and is a file storing the playback control information concerning the whole BD disc.

(iii) XXX. PL ("XXX" is variable, and the extension "PL" is fixed) which is one piece of "BD management information" and is a file storing the play list information that is a scenario (playback sequence). Each play list has a file.

(iv) XXX. PROG ("XXX" is variable, and the extension "PROG" is fixed) which is one of "BD playback programs" and is a file storing the playback control information prepared on the play list basis. The corresponding play list is identified based on a file body name (based on a matching of "XXX").

(v) YYY. VOB ("YYY" is variable, and the extension "VOB" is fixed) which is one of "AV data" and is a file storing the VOB (the same as the VOB described in the background art). Each VOB has a file.

(vi) YYY. VOBI ("YYY" is variable, and the extension "VOBI" is fixed) which is one piece of "BD management information" and is a file storing the stream management information concerning the VOB that is the AV data. The corresponding play list is identified based on a file body name (based on a matching of "YYY").

(vii) ZZZ. PNG ("ZZZ" is variable, and the extension "PNG" is fixed) which is one of "AV data" and is a file storing image data PNG (that is a picture format standardized by the W3C and called "ping") for constituting subtitles and menus. Each PNG image has a file.

The structure of BD navigation data (BD management information) will be described with reference to FIG. 33 to FIG. 38.

Figure 33:
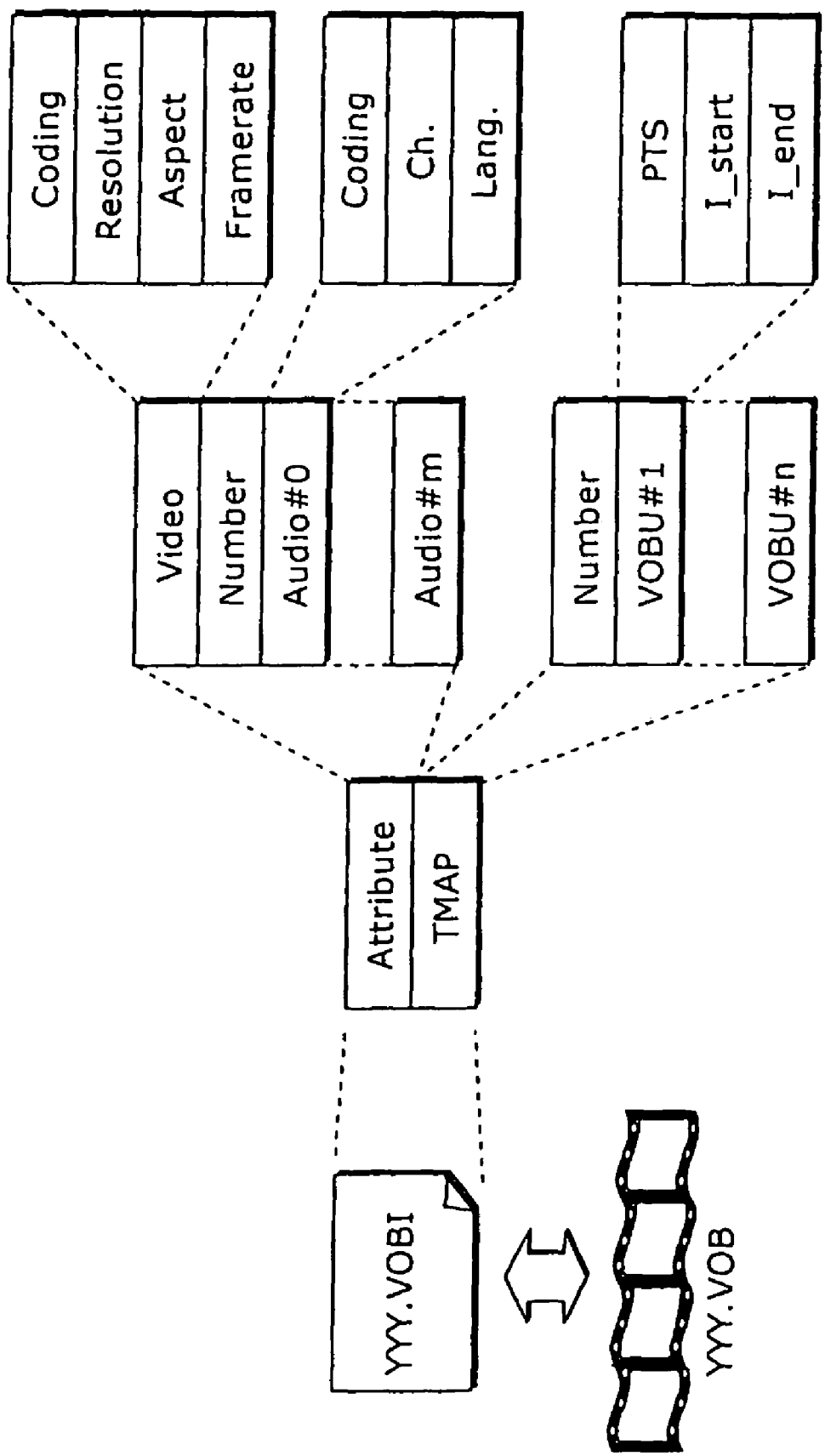
FIG. 33 is a structural diagram of a VOB information file.

FIG. 33 is a diagram showing the internal structure of a VOB management information file ("YYY. VOBI"). The VOB management information has the stream attribute information (Attribute) of the VOB and a time map (TMAP). The stream attribute has video attribute (Video) and audio attribute (Audio#0 to Audio#m) separately. Especially in the case of audio stream, as a VOB has plural audio streams at the same time, the presence or absence of a data field is indicated by the number (Number) of audio streams.

The following are video attributes (Video) stored in fields respectively and the values that the respective fields may have.

(i) compression format (Coding): MPEG-1; MPEG-2; MPEG-4; and MPEG-4 AVC (Advanced Video Coding).

(ii) resolution (Resolution): 1920×1080; 1440×1080; 1280×720; 720×480; and 720×565.

(iii) aspect ratio (Aspect): 4 to 3; and 16 to 9.

(iv) frame rate (Framerate): 60; 59.94 (60/1.001); 50; 30; 29.97 (30/1.001); 25; 24; and 23.976 (24/1.001).

The following are audio attributes (Audio) stored in fields respectively and the values that the respective fields may have.

(i) compression format (Coding): AC3; MPEG-1; MPEG-2; and LPCM.

(iii) the number of channels (Ch): 1 to 8

(iii) language attribute (Language):

The time map (TMAP) is a table for storing the information on a VOBU basis, and has the number of VOBUs that the VOB has and the respective pieces of VOBU information (VOBU#1 to VOBU#n). The respective pieces of VOBU information include I_start that is the address (the starting address of an I picture) of the top TS packet of a VOBU and an offset address (I_end) up to the end address of the I picture, and the playback starting time (PTS) of the I picture.

Figure 34:
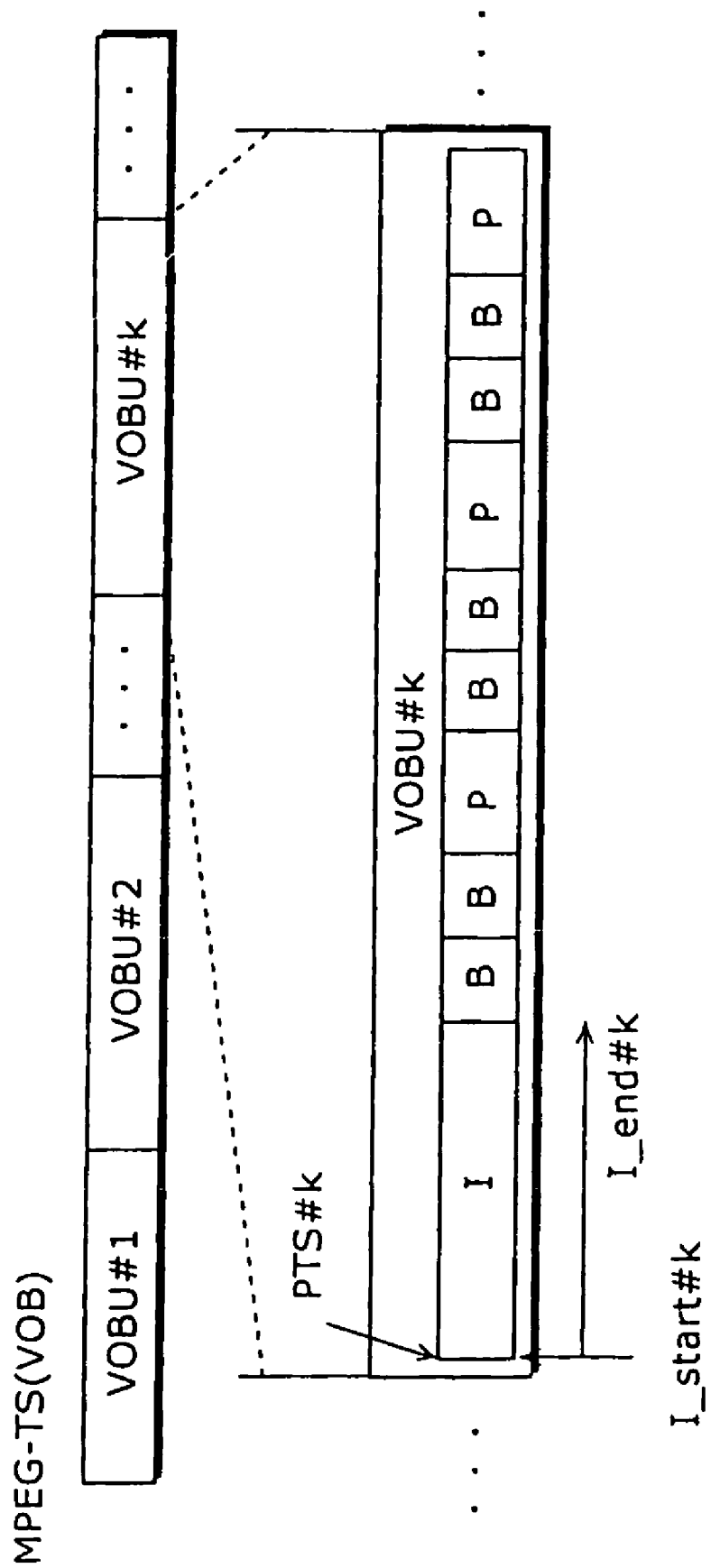
FIG. 34 is a diagram of a time map.
Figure 35:
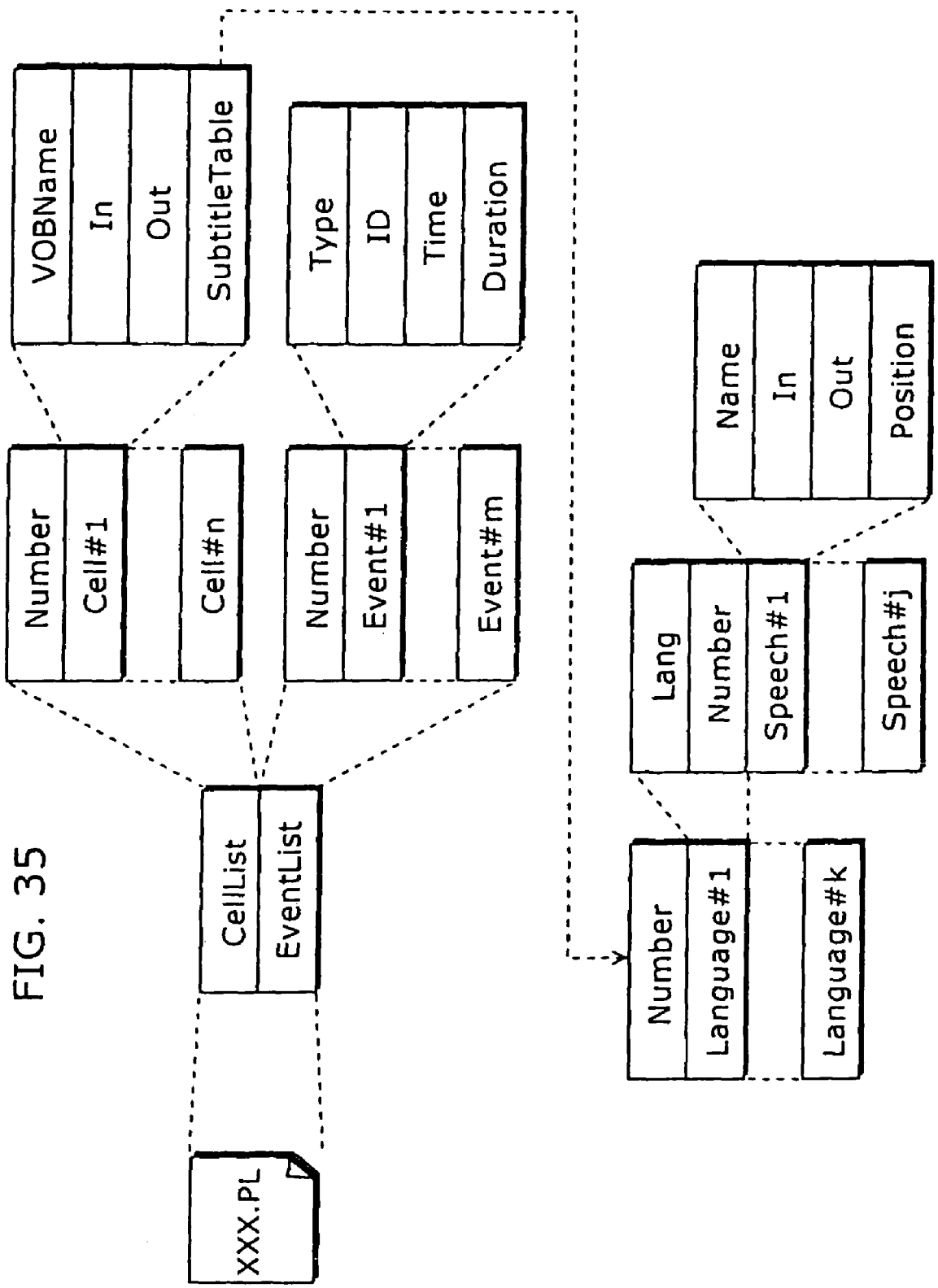
FIG. 35 is a structural diagram of a play list file.

FIG. 34 is a diagram illustrating the details of the VOBU information. As widely known, as variable bit rate compression may be performed on the MPEG video stream in order to record the video stream in high quality, there is no proportionality between the playback time and the data size. On the other hand, as a fixed bit rate compression is performed in the AC3 that is an audio compression standard, the relationship between the time and the address can be obtained from a primary expression. However, in the case of MPEG video data, each frame has a fixed display time, for example, a frame has display time of 1/29.97 seconds in the case of NTSC, but the data size after compressing each frame changes greatly depending on the image feature, or the picture type used in the compression, such as an I picture, a P picture or a B picture. Therefore, in the case of an MPEG video stream, it is impossible to represent the relationship between the time and the address using a primary expression.

As might be expected, it is impossible to represent the relationship between the time and the data size using a primary expression in an MPEG system stream where MPEG video data is multiplexed, that is, a VOB. Therefore, a time map (TMAP) associates the time with the address in a VOB.

In this way, in the case where time information is given, the VOBU to which the time belongs to is searched first (by following PTSs of VOBUs in order), the PTS immediately before the time is jumped into the VOBU that a TMAP has (the address specified by I_start), decoding is started with the top I picture of the VOBU, and display is started with the picture corresponding to the time.

Next, the internal structure of a play list information ("XXX. PL") will be described with reference to FIG. 35. The play list information includes a cell list (CellList) and an event list (EventList).

The cell list (CellList) is a playback cell sequence in the play list, and cells are played back in the description order indicated in this list. The contents of the cell list (CellList) is the number of cells (Number) and the information of each cell (Cell#1 to Cell#n).

The cell information (Cell#) has a VOB file name (VOB-Name), starting time (In) and end time (Out) in the VOB, and subtitles (SubtitleTable). The starting time (In) and the end time (Out) are represented as a frame number in each VOB. It is possible to obtain the address of the VOB data needed for playback by using the above-described time map (TMAP).

The subtitle table (SubtitleTable) is a table storing subtitle information that is played back synchronously with the VOB. Like in the case of audio, plural languages are included in subtitles. The first information of the subtitle table (SubtitleTable) includes the number of languages (Number) and the following tables (Language#1 to Language#k) prepared on a basis of a language.

Each language table (Language#) includes language information (Lang), the number (Number) of pieces of subtitle information of subtitles to be displayed separately, and subtitle information (Speech#1 to Speech#j) of subtitles to be displayed separately. The subtitle information (Speech#) includes an image data file name (Name), subtitle display starting time (In), subtitle display ending time (Out) and a subtitle display position (Position).

The event list (EventList) is a table defining each event that occurs in the play list. The event list includes the number of events (Number) and respective events (Event#1 to Event#m). Each event (Event#) includes an event type (Type), an event ID (ID), an event occurrence time (Time) and an event duration (Duration).

Figure 36:
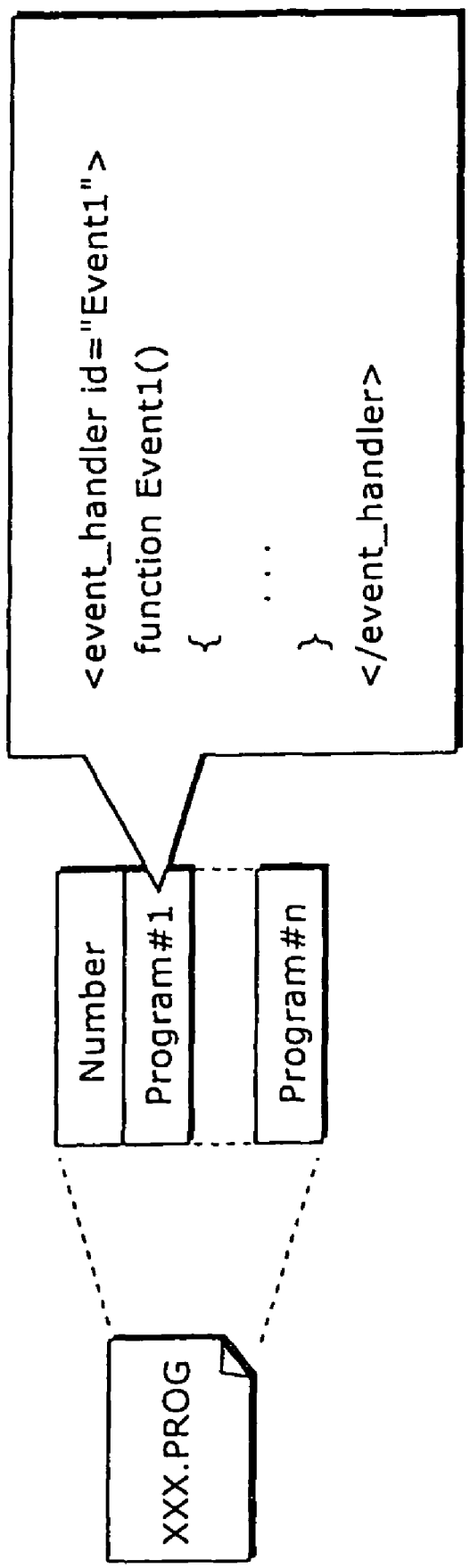
FIG. 36 is a structural diagram of a program file corresponding to the play list.
Figure 37:
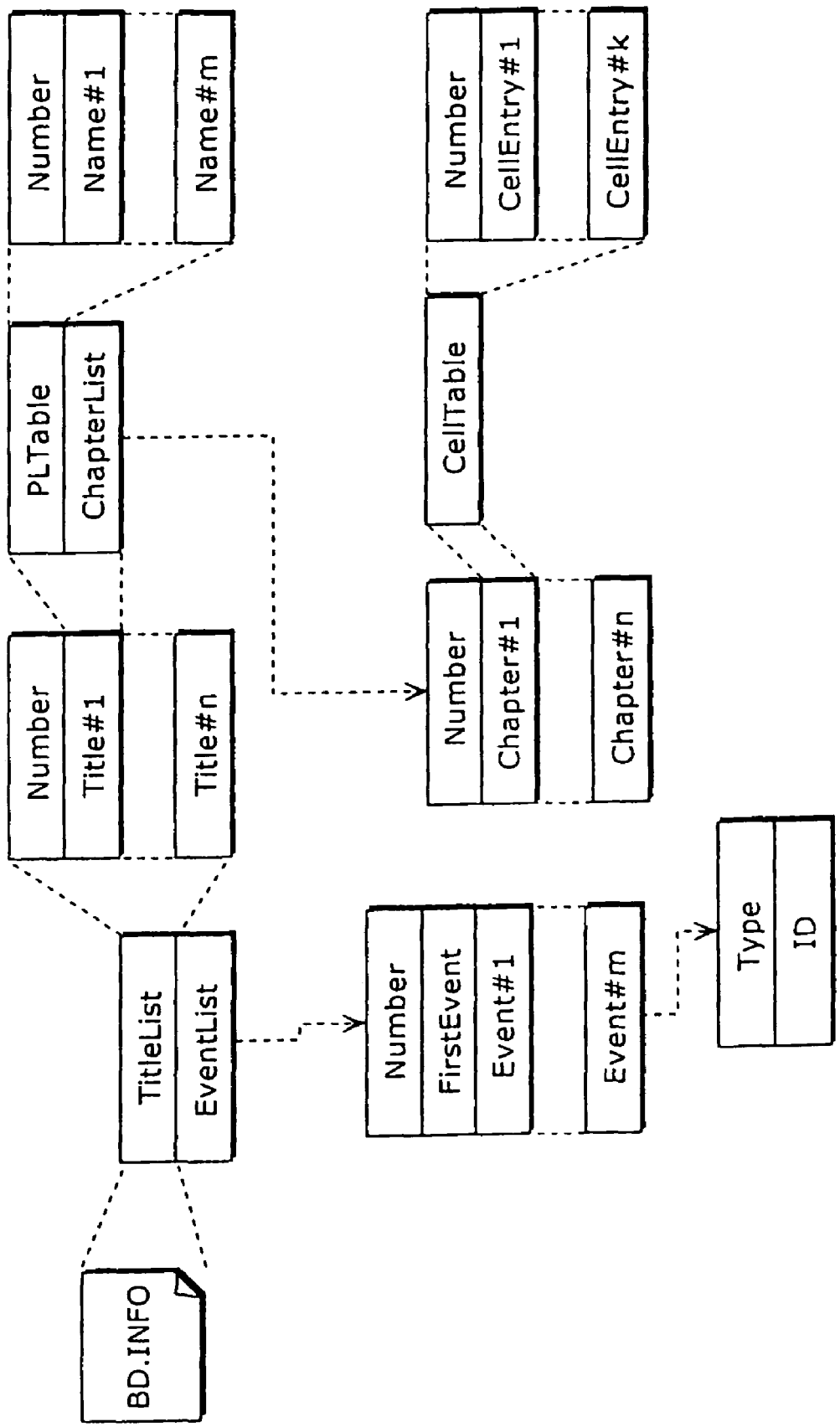
FIG. 37 is a structural diagram showing a file of management information of the whole BD disc.

FIG. 36 is an event handler table ("XXX. PROG") having an event handler (that is a time event and a user event for menu selection) prepared on a play list basis. The event handler table includes the number of defined event handlers/programs (Number) and the respective event handlers/programs (Program#1 to Program#n). The contents of each event hander/program (Program#) is the definition of the start of an event handler (<event_handler> tag) and the event hander ID (ID) that is paired with the earlier described event ID, and next to it, the program described in "{ }" that follows Function. The event (Event#1 to Event#m) stored in the event list (EventList) of the earlier-described "XXX. PL" is specified using an ID (ID) of the event handler of "XXX. PROG".

Next, the internal structure of the information concerning the whole BD disc ("BD. INFO") will be described with reference to FIG. 37. The information concerning the whole BD disc includes a title list (TitleList) and an event table for global event (EventList).

The title list (TitleList) includes the number of titles of a disc (Number) and pieces of title information (Title#1 to Title#n) that follows the number of titles. The respective pieces of title information (Title#) include a play list table included in the title (PLTable) and a chapter list in the title (ChapterList). The play list table (PLTable) includes the number of play lists in the title (Number) and play list names (Name) that are the file names of play lists.

The chapter list (ChapterList) includes the number of chapters included in the title (Number) and pieces of chapter information (Chapter#1 to Chapter#n). Each piece of chapter information (Chapter#) includes a cell table (CellTable) included in the chapter, and the cell table (CellTable) includes the number of cells (Number) and pieces of cell entry information (CellEntry#1 to CellEntry#k). The cell entry information (CellEntry#) includes the play list name including the cell and a cell number in the play list.

The event list (EventList) includes the number of global events (Number) and pieces of global event information. It should be noted that the global event to be defined first is called first event (FirstEvent), and is the event called first after the BD disc is inserted into a player. The event information for global event has only an event type (Type) and an event ID (ID).

Figure 38:
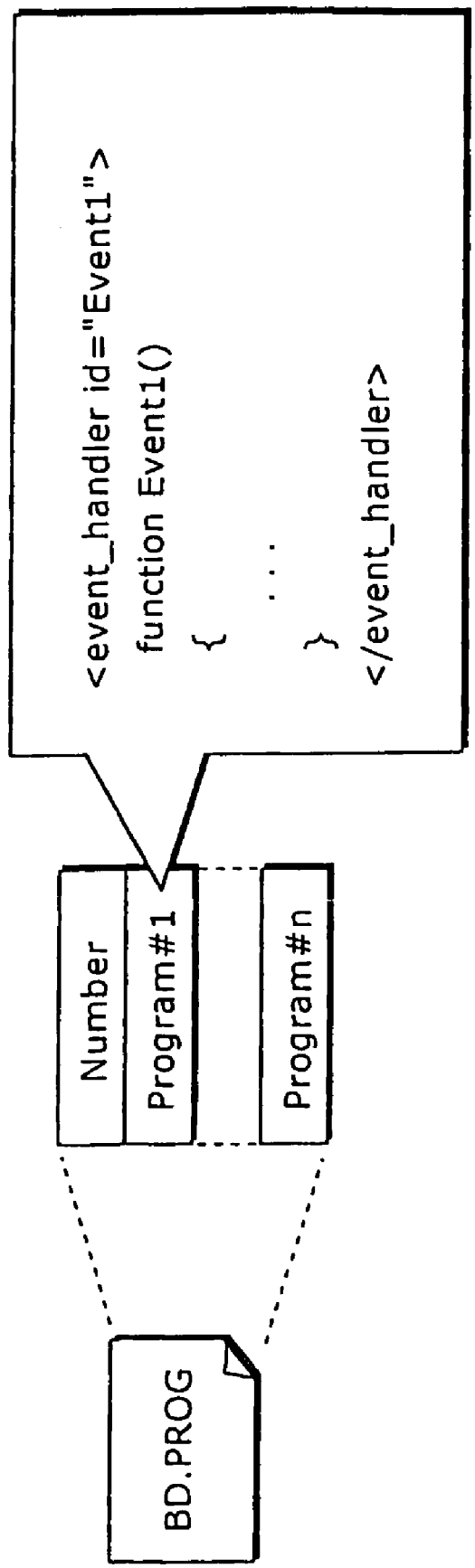
FIG. 38 is a structural diagram of a file for recording a global event handler.

FIG. 38 is a table ("BD. PROG") of a program of a global event handler. The contents of this table is the same as the contents of the event handler table described in FIG. 36.

In the case of storing the above-described trick-play information in the BD-ROM format described up to this point, it is considered that a VOBU includes one or more random access unit RAU, and trick-play information is included in the top AU of the VOBU. Note that, in the MPEG-4 AVC, a NAL unit where trick-play information is stored is included.

Note that trick-play information may be stored in the BD management information. For example, it is possible to store trick-play information prepared on a VOBU basis by extending the time map of the VOB management information. Also, it is possible to define a new map for storing the trick-play information.

Also, it is possible to store the trick-play information into either the VOBU or the BD management information.

Also, it is possible to store only the default vale of the trick-play information into the BD management information, and only in the case where the trick-play information as to the VOBU is different from the default value, it is possible to store the trick-play information into the VOBU.

Also, it is possible to store a set of one or more pieces of trick-play information into the BD management information as the information that is common among streams. The VOBU can refer to one piece of trick-play information among the pieces of trick-play information stored in the BD management information. In this case, the index information of the trick-play information referred to by the VOBU is stored into the management information of a VOBU unit or the VOBU.

(Player for Playing Back Optical Discs)

Figure 39:
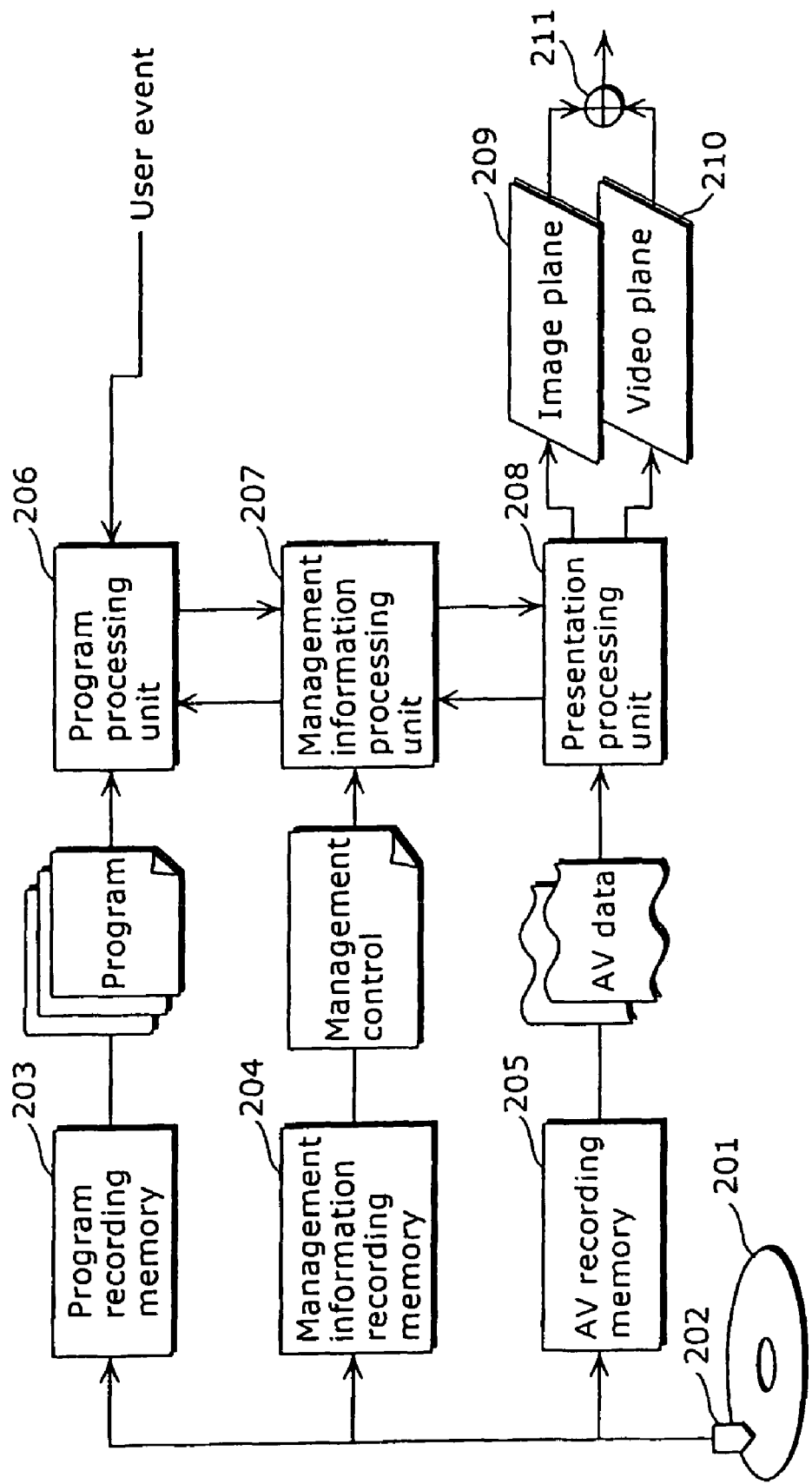
FIG. 39 is a block diagram showing the outline of an HD-DVD player.

FIG. 39 is a block diagram roughly showing the functional structure of a player that plays back a BD disc shown in FIG. 31 and the like. The data on the BD disc 201 is read out through an optical pick up 202. The read out data is transmitted to an exclusive memory depending on the types of the respective data. The BD playback program (the contents of "BD. PROG" or "XXX. PROG") is transmitted to a program memory 203. Also, The BD management information ("BD. INFO", "XXX. PL" or "YYY. VOBI") is transmitted to a management information memory 204. Also, the AV data ("YYY. VOB" or "ZZZ. PNG") is transmitted to an AV memory 205.

The BD playback program recorded in the program memory 203 is processed by a program processing unit 206. Also, the BD management information recorded in the management information memory 204 is processed by the management information processing unit 207. Also, the AV data recorded in the AV memory 205 is processed by a presentation processing unit 208.

The program processing unit 206 receives the information of play lists to be played back by the management information processing unit 207 and the event information such as the execution timing of the program and performs the processing of the program. Also, it is possible to dynamically change the play lists to be played back by the program. This can be realized by sending a playback instruction of the play lists to the management information processing unit 207. The program processing unit 206 receives an event from a user, in other words, receives a request through a remote controller, and in the case where there is a program corresponding to the user event, it executes the program.

The management information processing unit 207 receives an instruction from the program processing unit 206, analyzes the play lists and the management information of the VOBs corresponding to the play lists, and instructs the presentation processing unit 208 to play back the target AV data. Also, the management information processing unit 207 receives the standard time information from the presentation processing unit 208, instructs the presentation processing unit 208 to stop playing back the AV data based on the time information. Also, the management information processing unit 207 generates an event to notify the program processing unit 206 of the program execution timing.

The presentation processing unit 208 has a decoder that can process video, audio, subtitles/images (still pictures) respectively. It decodes and outputs the AV data according to an instruction from the management information processing unit 207. In the case of video data, and subtitles/images, they are decoded and then rendered in the respective exclusive planes, that is, the video plane 210 and the image plane 209. After that, the synthesis processing unit 211 performs the synthesis processing on the video, and outputs the video to a display device such as a TV.

At the time of trick-play such as jump-in playback, variable speed playback and reverse playback, the presentation processing unit 208 interprets the trick-play operation that is requested by the user, and notifies the management information processing unit 207 of the information such as playback speed. The management information processing unit 207 analyzes the trick-play information stored in the top AU of the VOBU and determines the AUs to be decoded and displayed so that the trick-play operation specified by the user can be surely performed. Note that the management information processing unit 207 can obtain the trick-play information, output it to the presentation processing unit 208 and determine the AUs to be decoded and the AUs to be displayed in the presentation processing unit 208.

Note that a stand-alone computer system can easily execute the processing shown in this embodiment by recording the program for realizing the moving picture coding method and the moving picture decoding method shown in this embodiment into a recording medium such as a flexible disc.

Figure 40A:
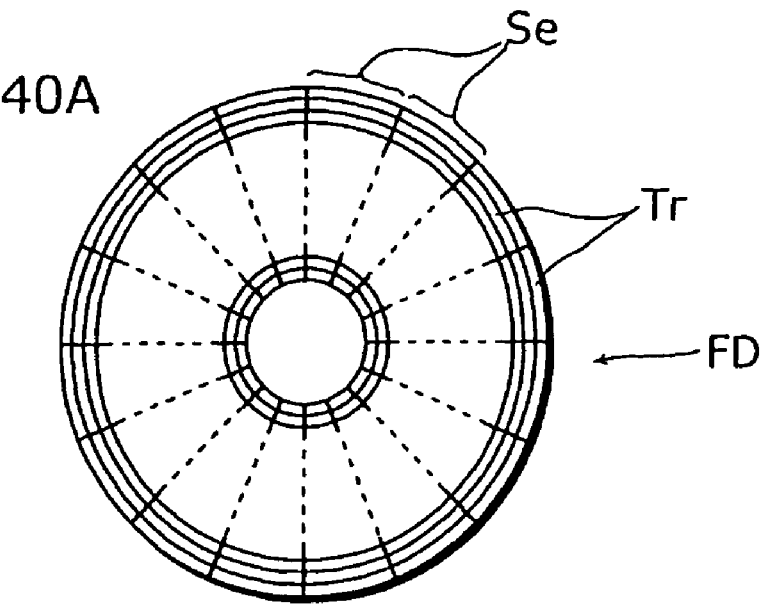
FIGS. 40A to 40C are diagrams showing a recording medium for storing the program for realizing the moving picture coding method and the moving picture decoding method of the present invention.
Figure 40B:
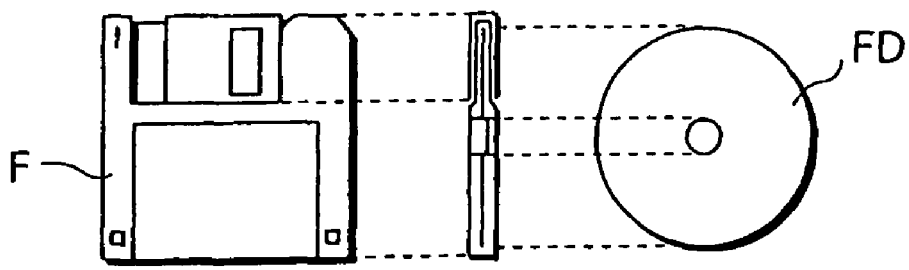
Figure 40C:
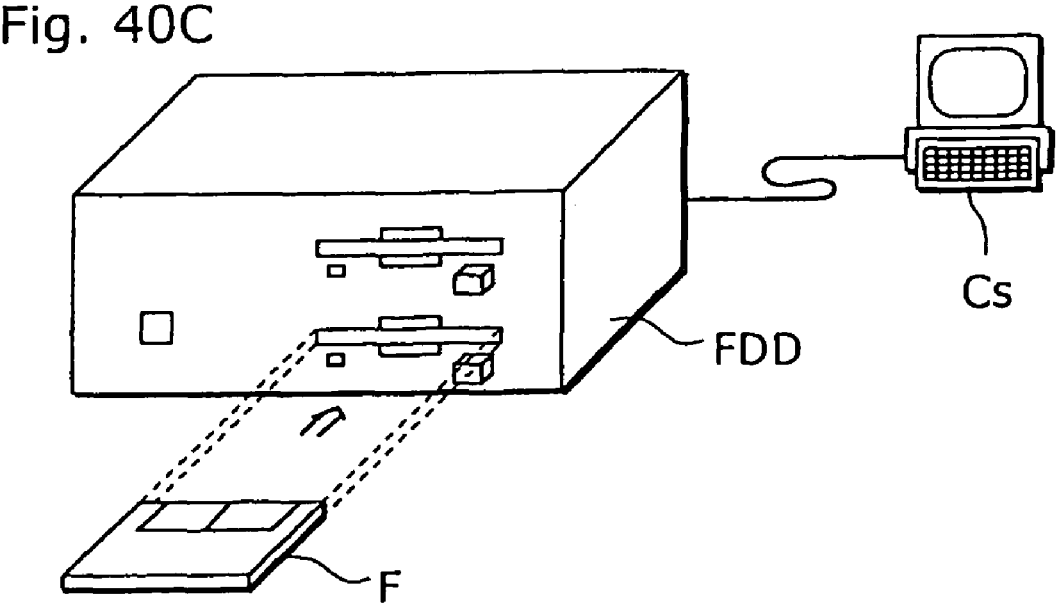

FIGS. 40A to 40C are illustrations of how the computer system executes the moving picture coding method and the moving picture decoding method of this embodiment using a program recorded in a recording medium such as a flexible disc.

FIG. 40A shows an example of a physical format of a flexible disc as a recording medium. FIG. 40B shows a flexible disc and the front view and the cross-sectional view of the appearance of the flexible disc. A flexible disc (FD) is contained in a case F, a plurality of tracks (Tr) are formed concentrically on the surface of the disc from the outer radius into the inner radius of the disc, and each track is divided into 16 sectors (Se) in the angular direction. Therefore, in the case of the flexible disc storing the above-described program, the program is recorded in an area allocated for it on the flexible disc (FD).

Also, FIG. 40C shows the structure for recording and playing back the program on the flexible disc. In the case of recoding the above program for realizing the moving picture coding method and the moving picture decoding method on the flexible disc FD, a computer system Cs writes the program on the flexible disc through a flexible disc drive. Also, in the case of constructing the above moving picture coding apparatus and the moving picture decoding apparatus for realizing the moving picture coding method and the moving picture decoding method using the program in the flexible disc, the program is read out from the flexible disc through the flexible disc drive, and it is transmitted to the computer system.

Note that the above description has been made using a flexible disc as a recording medium, but the program can be recorded on an optical disc. Also, a recording medium is not limited to this, another recording medium such as an IC card, a ROM cassette can be used as long as it can record the program.

Up to this point, the moving picture stream generation apparatus, the moving picture coding apparatus, the moving picture multiplexing apparatus and the moving picture decoding apparatus of the present invention have been described based on the embodiment, but the present invention is not limited to this embodiment. The present invention includes variations that a person skilled in the art would conceive based on this embodiment, and such variations are within the scope of the subject matter of the present invention.

For example, the present invention include the following in this embodiment: (i) a moving picture stream generation apparatus; an optical disc recording apparatus that has one of a moving picture coding apparatus and a moving picture decoding apparatus; a moving picture sending apparatus; a digital television broadcasting transmitting apparatus; a Web server; a communication apparatus; a mobile information terminal; and the like; and (ii) a moving picture receiving apparatus that has a moving picture decoding apparatus; a digital television broadcasting receiving apparatus; a communication apparatus; a mobile information terminal; and the like.

Note that the respective functional blocks shown in FIG. 21, FIG. 23, FIG. 27 and FIG. 39 are typically realized as an LSI that is a large scale integration circuit. Each of the functional blocks may be made into a single chip, or a part of or all of the functional blocks may be integrated into a single chip (for example, functional blocks except a memory may be made into a single chip). The integrated circuit is called LSI here, but it may be called IC, system LSI, super LSI, or ultra LSI, depending on the integration level. Also, the method of making them into an integrated circuit is not limited to the method of making them into an LSI, it may be realized by an exclusive circuit or a generic processor. Also, it is possible to use (i) a reconfigurable processor where the connection or the setting of circuit cells can be reconfigured or (ii) a programmable FPGA (Field Programmable Gate Array), after making them into an LSI. Further, in the case where technique of making them into an integrated circuit instead of making them into an LSI appears when the semiconductor technique is further developed or any derivative technique appears, in due course, functional blocks may be made into an integrated circuit using such new technique. Application of bio technique is likely. Also, among respective functional blocks a storage unit (a picture memory) in which the picture data to be coded or decoded is stored may be configured separately instead of being included in a single chip.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention is applicable as: a moving picture stream generation apparatus that generates a moving picture to be played back in trick-play; a moving picture coding apparatus that generates, by coding, a moving picture to be played back in trick-play; a moving picture multiplexing apparatus that generates, by packet multiplexing, a moving picture to be played back in trick-play; and a moving picture decoding apparatus that plays back the moving picture in trick-play, and especially, as an apparatus for constructing the system for playing back an MPEG-4 AVC stream using a trick-play mode such as variable speed playback and reverse playback, such an apparatus being, for example, an optical disc related apparatus as to which trick-play function is generally focused on.

The invention claimed is:

1. A moving picture stream generating apparatus which generates a stream including a picture including at least a pixel data storage unit for storing pixel data and a supplemental information storage unit for storing first supplemental information and second supplemental information, the first and second supplemental information being placed before the pixel data, said moving picture stream generating apparatus comprising:
    a first coding unit operable to code the first supplemental information in which picture type information of each of pictures included in a random access unit is arranged in decoding order of the pictures, the random access unit including pictures starting with a first I-picture which is a random access point and ending with a picture immediately before a second I-picture which is a random access point different from the random access point corresponding to the first I-picture;
    a second coding unit operable to code the second supplemental information in which picture structure information of each of the pictures included in the random access unit is arranged in the decoding order of the pictures; and
    a generating unit operable to generate a moving picture stream by storing the coded first and second supplemental information into the supplemental information storage unit in the first I-picture,
    wherein the picture type information of the respective pictures includes at least: an I-picture on which intra-coding is performed; a P-picture on which inter-coding is performed with reference to a picture per block which is a basic unit in coding; a first B-picture on which inter-coding is performed with reference to two pictures per block which is a basic unit in coding, and which can be referred to by a picture; and a second B-picture on which inter-coding is performed with reference to two pictures per block which is a basic unit in coding, and which cannot be referred to by any other pictures,
    wherein the picture structure information of the respective pictures includes information indicating whether the picture structure of each picture is a field structure, a first frame structure, or a second frame structure,
    wherein the first frame structure is for displaying the picture using two display fields, and
    wherein the second frame structure is for displaying the picture using three display fields by repeatedly displaying the first display field at the time of using 3-2 pull down.

2. A moving picture stream generating method for generating a stream including a picture including at least a pixel data storage unit for storing pixel data and a supplemental information storage unit for storing first supplemental information and second supplemental information, the first and second supplemental information being placed before the pixel data, said moving picture stream generating method comprising:
    a first coding step of coding the first supplemental information in which picture type information of each of pictures included in a random access unit is arranged in decoding order of the pictures, the random access unit including pictures starting with a first I-picture which is a random access point and ending with a picture immediately before a second I-picture which is a random access point different from the random access point corresponding to the first I-picture;
    a second coding step of coding the second supplemental information in which picture structure information of each of the pictures included in the random access unit is arranged in the decoding order of the pictures; and
    a generating step of generating a moving picture stream by storing the coded first and second supplemental information into the supplemental information storage unit in the first I-picture,
    wherein the picture type information of the respective pictures includes at least: an I-picture on which intra-coding is performed; a P-picture on which inter-coding is performed with reference to a picture per block which is a basic unit in coding; a first B-picture on which inter-coding is performed with reference to two pictures per block which is a basic unit in coding, and which can be referred to by a picture; and a second B-picture on which inter-coding is performed with reference to two pictures per block which is a basic unit in coding, and which cannot be referred to by any other pictures,
    wherein the picture structure information of the respective pictures includes information indicating whether the picture structure of each picture is a field structure, a first frame structure, or a second frame structure,
    wherein the first frame structure is for displaying the picture using two display fields, and
    wherein the second frame structure is for displaying the picture using three display fields by repeatedly displaying the first display field at the time of using 3-2 pull down.

3. A moving picture decoding apparatus which decodes and reproduces a stream including a picture including at least a pixel data storage unit for storing pixel data and a supplemental information storage unit for storing first supplemental information and second supplemental information, the first and second supplemental information being placed before the pixel data, said moving picture decoding apparatus comprising:
    an instruction obtaining unit operable to obtain an instruction instructing a special playback;
    an analyzing unit operable to separate the first supplemental information in which picture type information of each of pictures is arranged in decoding order of the pictures and the second supplemental information in which picture structure information of each of the pictures is arranged in the decoding order of the pictures which are included in each of random access units, from the supplemental information storage unit of a first I-picture on a random access unit basis, the random access unit including pictures starting with the first I-picture which is a random access point and ending with a picture immediately before a second I-picture which is a random access point different from the random access point corresponding to the first I-picture;

a reproduction picture identifying unit operable to identify a picture necessary for the special playback among the pictures included in the random access unit, based on the analysis performed by said analyzing unit; and a decoding unit operable to decode and reproduce the picture identified by said reproduction picture identifying unit, wherein the picture type information of the respective pictures includes at least: an I-picture on which intra-coding is performed; a P-picture on which inter-coding is performed with reference to a picture per block which is a basic unit in coding; a first B-picture on which inter-coding is performed with reference to two pictures per block which is a basic unit in coding, and which can be referred to by a picture; and a second B-picture on which inter-coding is performed with reference to two pictures per block which is a basic unit in coding, and which cannot be referred to by any other pictures, wherein the picture structure information of the respective pictures includes information indicating whether the picture structure of each picture is a field structure, a first frame structure, or a second frame structure, wherein the first frame structure is for displaying the picture using two display fields, and wherein the second frame structure is for displaying the picture using three display fields by repeatedly displaying the first display field at the time of using 3-2 pull down.

4. A moving picture decoding method for decoding and reproducing a stream including a picture including at least a pixel data storage unit for storing pixel data and a supplemental information storage unit for storing first supplemental information and second supplemental information, the first and second supplemental information being placed before the pixel data, said moving picture decoding method comprising:

an instruction obtaining step of obtaining an instruction instructing a special playback;

an analyzing step of separating the first supplemental information in which picture type information of each of pictures is arranged in decoding order of the pictures and the second supplemental information in which picture structure information of each of the pictures is arranged in the decoding order of the pictures which are included in each of random access units, from the supplemental information storage unit of a first I-picture on a random access unit basis, the random access unit including pictures starting with the first I-picture which is a random access point and ending with a picture immediately before a second I-picture which is a random access point different from the random access point corresponding to the first I-picture;

a reproduction picture identifying step of identifying a picture necessary for the special playback indicated by the instruction obtained in said instruction obtaining step among the pictures included in the random access unit, based on the analysis performed by said analyzing unit; and a decoding step of decoding and reproducing the picture identified by said reproduction picture identifying unit, wherein the picture type information of the respective pictures includes at least: an I-picture on which intra-coding is performed; a P-picture on which inter-coding is performed with reference to a picture per block which is a basic unit in coding; a first B-picture on which inter-coding is performed with reference to two pictures per block which is a basic unit in coding, and which can be referred to by a picture; and a second B-picture on which inter-coding is performed with reference to two pictures per block which is a basic unit in coding, and which cannot be referred to by any other pictures, wherein the picture structure information of the respective pictures includes information indicating whether the picture structure of each picture is a field structure, a first frame structure, or a second frame structure, wherein the first frame structure is for displaying the picture using two display fields, and wherein the second frame structure is for displaying the picture using three display fields by repeatedly displaying the first display field at the time of using 3-2 pull down.

5. A method for recording, onto a computer-readable recording medium, a stream including a picture including at least a pixel data storage unit for storing pixel data and a supplemental information storage unit for storing first supplemental information and second supplemental information, the first and second supplemental information being placed before the pixel data, said method comprising:

a first coding step of coding the first supplemental information in which picture type information of each of pictures included in a random access unit is arranged in decoding order of the pictures, the random access unit including pictures starting with a first I-picture which is a random access point and ending with a picture immediately before a second I-picture which is a random access point different from the random access point corresponding to the first I-picture;

a second coding step of coding the second supplemental information in which picture structure information of each of the pictures included in the random access unit is arranged in the decoding order of the pictures; and a generating step of generating a moving picture stream by storing the coded first and second supplemental information into the supplemental information storage unit in the first I-picture; and a recording step of recording the moving picture stream onto the recording medium, wherein the picture type information of the respective pictures includes at least: an I-picture on which intra-coding is performed; a P-picture on which inter-coding is performed with reference to a picture per block which is a basic unit in coding; a first B-picture on which inter-coding is performed with reference to two pictures per block which is a basic unit in coding, and which can be referred to by a picture; and a second B-picture on which inter-coding is performed with reference to two pictures per block which is a basic unit in coding, and which cannot be referred to by any other pictures, wherein the picture structure information of the respective pictures includes information indicating whether the picture structure of each picture is a field structure, a first frame structure, or a second frame structure, wherein the first frame structure is for displaying the picture using two display fields, and wherein the second frame structure is for displaying the picture using three display fields by repeatedly displaying the first display field at the time of using 3-2 pull down.

6. A non-transitory recording medium having a program stored thereon for causing a computer to perform a method for generating a stream including a picture including at least a pixel data storage unit for storing pixel data and a supplemental information storage unit for storing first supplemental information and second supplemental information, the first and second supplemental information being placed before the pixel data, the method comprising:

- a first coding step of coding the first supplemental information in which picture type information of each of pictures included in a random access unit is arranged in decoding order of the pictures, the random access unit including pictures starting with a first I-picture which is a random access point and ending with a picture immediately before a second I-picture which is a random access point different from the random access point corresponding to the first I-picture;
- a second coding step of coding the second supplemental information in which picture structure information of each of the pictures included in the random access unit is arranged in the decoding order of the pictures; and
- a generating step of generating a moving picture stream by storing the coded first and second supplemental information into the supplemental information storage unit in the first I-picture, wherein the picture type information of the respective pictures includes at least: an I-picture on which intra-coding is performed; a P-picture on which inter-coding is performed with reference to a picture per block which is a basic unit in coding; a first B-picture on which inter-coding is performed with reference to two pictures per block which is a basic unit in coding, and which can be referred to by a picture; and a second B-picture on which inter-coding is performed with reference to two pictures per block which is a basic unit in coding, and which cannot be referred to by any other pictures, wherein the picture structure information of the respective pictures includes information indicating whether the picture structure of each picture is a field structure, a first frame structure, or a second frame structure, wherein the first frame structure is for displaying the picture using two display fields, and wherein the second frame structure is for displaying the picture using three display fields by repeatedly displaying the first display field at the time of using 3-2 pull down.

* * * * *